(12) United States Patent
Kirsch et al.

(10) Patent No.: US 8,129,002 B2
(45) Date of Patent: Mar. 6, 2012

(54) COMPOUNDS FOR USE IN LIQUID CRYSTAL MEDIA

(75) Inventors: Peer Kirsch, Kanagawa (JP); Elvira Montenegro, Weinheim (DE); Louise Diane Farrand, Dorset (GB); Detlef Pauluth, Ober-Ramstadt (DE); Michael Heckmeier, Hemsbach (DE)

(73) Assignee: Merck Patent GmbH, Darmstadt (DE)

( * ) Notice: Subject to any disclaimer, the term of this patent is extended or adjusted under 35 U.S.C. 154(b) by 421 days.

(21) Appl. No.: 10/569,462

(22) PCT Filed: Jul. 28, 2004

(86) PCT No.: PCT/EP2004/008439
§ 371 (c)(1),
(2), (4) Date: Feb. 24, 2006

(87) PCT Pub. No.: WO2005/019377
PCT Pub. Date: Mar. 3, 2005

(65) Prior Publication Data
US 2006/0263542 A1      Nov. 23, 2006

(30) Foreign Application Priority Data

Aug. 25, 2003  (EP) .................................. 03018708

(51) Int. Cl.
| | |
|---|---|
| C09K 19/52 | (2006.01) |
| C09K 19/30 | (2006.01) |
| C09K 19/32 | (2006.01) |
| C09K 19/34 | (2006.01) |
| C09K 19/12 | (2006.01) |
| C09K 19/20 | (2006.01) |

(52) U.S. Cl. ............... 428/1.1; 252/299.01; 252/299.61; 252/299.62; 252/299.63; 252/299.66; 252/299.67

(58) Field of Classification Search ............. 252/299.61, 252/299.62, 299.63, 299.66, 299.67, 299.01; 428/1.1

See application file for complete search history.

(56) References Cited

U.S. PATENT DOCUMENTS

| | | | |
|---|---|---|---|
| 5,352,381 A | 10/1994 | McDonnell et al. | |
| 5,358,663 A | 10/1994 | Gray et al. | |
| 5,536,442 A | 7/1996 | Reiffenrath et al. | |

(Continued)

FOREIGN PATENT DOCUMENTS

GB        2 367 057 A        3/2002

(Continued)

OTHER PUBLICATIONS

Bezborodov et al: "Synthesis and Properties of Some Laterally Substituted Liquid Crystals" Liquid Crystals, Taylor and Francis Ltd, London, GB, vol. 21, No. 6, Dec. 1, 1996, pp. 801-806, XP000639773; ISSN: 0267- 8292.
Patent Abstracts of Japan; vol. 1996, No. 10, Oct. 31, 1996.

*Primary Examiner* — Shean Wu
(74) *Attorney, Agent, or Firm* — Millen, White, Zelano & Branigan, P.C.

(57) ABSTRACT

The present invention is related to compounds for use in liquid crystal media, liquid crystal media comprising said compounds, the use of said media in electro-optical devices, said electro-optical devices, and the use of said compounds in mesogenic media for use in electro-optical devices that may be operated in an optically isotropic state.

30 Claims, No Drawings

U.S. PATENT DOCUMENTS

| | | | |
|---|---|---|---|
| 6,060,133 A | 5/2000 | Lacey et al. | |
| 6,177,154 B1 | 1/2001 | Matsui et al. | |
| 7,419,706 B2 * | 9/2008 | Heckmeier et al. | 428/1.1 |
| 7,531,106 B2 * | 5/2009 | Kirsch et al. | 252/299.01 |
| 2003/0216554 A1 | 11/2003 | Kirsch et al. | |

FOREIGN PATENT DOCUMENTS

| | | |
|---|---|---|
| GB | 2 379 442 A | 3/2003 |
| JP | 08 143498 A | 6/1996 |
| WO | WO 86/06372 A | 11/1986 |
| WO | WO 96/31576 A | 10/1996 |

* cited by examiner

COMPOUNDS FOR USE IN LIQUID CRYSTAL MEDIA

The present invention is related to compounds for use in liquid crystal media, liquid crystal media comprising said compounds, the use of said media in electro-optical devices, said electro-optical devices, and the use of said compounds in mesogenic media for use in electro-optical devices that may be operated in an optically isotropic state.

Liquid crystals are used generally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (superbirefringence effect) cells and OMI (optical mode interference) cells. The most common display devices are based on the Schadt-Helfrich effect and have a twisted nematic structure.

The liquid crystal materials must have good chemical and thermal stability and good stability to electric fields and electromagnetic radiation. Furthermore, the liquid crystal materials should have low viscosity and produce short addressing times, low threshold voltages and high contrast in the cells.

They should furthermore have a suitable mesophase, for example a nematic or cholesteric mesophase for the above-mentioned cells, at the usual operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, have to satisfy various requirements depending on the cell type and area of application. For example, materials for cells having a twisted nematic structure should have positive dielectric anisotropy and low electrical conductivity.

For example, for matrix liquid crystal displays with integrated non-linear elements for switching individual pixels (MLC displays), media having large positive dielectric anisotropy, broad nematic phases, relatively low bire-fringence, very high specific resistance, good UV and temperature stability and low vapour pressure are desired.

Matrix liquid crystal displays of this type are known. Non-linear elements which can be used for individual switching of the individual pixels are, for example, active elements (i.e. transistors). The term "active matrix" is then used, where a distinction can be made between two types:
1. MOS (metal oxide semiconductor) or other diodes on a silicon wafer as substrate.
2. Thin-film transistors (TFTs) on a glass plate as substrate.

The use of single-crystal silicon as substrate material restricts the display size, since even modular assembly of various part-displays results in problems at the joins.

In the case of the more promising type 2, which is preferred, the electro-optical effect used is usually the TN effect. A distinction is made between two technologies: TFTs comprising compound semiconductors, such as, for example, CdSe, or TFTs based on polycrystalline or amorphous silicon. Intensive work is being carried out world-wide on the latter technology.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The TFT displays usually operate as TN cells with crossed polarisers in transmission and are illuminated from the back.

The term MLC displays here covers any matrix display with integrated non-linear elements, i.e., besides the active matrix, also displays with passive elements, such as varistors or diodes (e.g. MIM diodes=metal-insulator-metal).

MLC displays of this type are particularly suitable for TV applications (for example pocket TVs) or for high-information displays for computer applications (laptops) and in automobile or aircraft construction. Besides problems regarding the angle dependence of the contrast and the response times, difficulties also arise in MLC displays due to insufficiently high specific resistance of the liquid crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. With decreasing resistance, the contrast of an MLC display deteriorates, and the problem of after-image elimination may occur. Since the specific resistance of the liquid crystal mixture generally drops over the life of an MLC display owing to interaction with the interior surfaces of the display, a high (initial) resistance is very important in order to obtain acceptable service lives. In particular in the case of low-volt mixtures, it was hitherto impossible to achieve very high specific resistance values. It is furthermore important that the specific resistance exhibits the smallest possible increase with increasing temperature and after heating and/or UV exposure. The low-temperature properties of the mixtures from the prior art are also particularly disadvantageous. It is demanded that no crystallisation and/or smectic phases occur, even at low temperatures. Furthermore, in order to achieve an appropriate image quality high values of the voltage holding ratio (VHR) as well as a low dependence on temperature of the VHR are required. (The VHR reflects the decrease of a voltage applied to a display pixel as a function of time; a high VHR value indicates an only slight decrease of the voltage applied.) The MLC displays from the prior art thus do not meet today's requirements.

There thus continues to be a great demand for MLC displays having very high specific resistance at the same time as a large working-temperature range, short response times even at low temperatures, low threshold voltage, high VHR values with a low temperature dependence which do not have these disadvantages, or only do so to a lesser extent.

In TN (Schadt-Helfrich) cells, media are desired which facilitate the following advantages in the cells:
extended nematic phase range (in particular down to low temperatures)
the ability to switch at extremely low temperatures (outdoor use, auto-mobile, avionics)
increased resistance to UV radiation (longer service life)
high $\Delta\epsilon$ for low threshold voltages.

The media available from the prior art do not allow these advantages to be achieved while simultaneously retaining the other parameters.

In the case of supertwisted (STN) cells, media are desired which enable greater multiplexability and/or lower threshold voltages and/or broader nematic phase ranges (in particular at low temperatures). To this end, a further widening of the available parameter latitude (clearing point, smectic-nematic transition or melting point, viscosity, dielectric parameters, elastic parameters) is urgently desired. This applies as well to in-plane switching (IPS) cells, where the electrical field in the cell is not vertically aligned, like in TN or STN cells, but horizontally aligned.

It is therefore an object of the present invention to provide compounds for use in liquid crystal media which do not have the above-mentioned disadvantages or only to a reduced extent and which preferably provides said media with advantageous properties such as low threshold voltages, high values of VHR and low temperature dependence of the VHR.

It has now been found that this object surprisingly can be achieved by compounds according to the present invention.

The invention thus relates to compounds of general formula I:

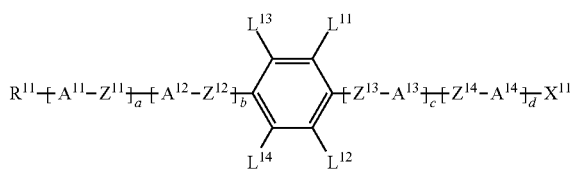

wherein a, b, c and d are independently of each other 0, 1 or 2, whereby $a+b+c+d \leq 4$;

$R^{11}$ is hydrogen, an alkyl or alkoxy radical having from 1 to 15 carbon atoms, wherein one or more methylene groups of said alkyl or alkoxy radical may be replaced independently of each other by —O—, —S—, —SiR$^x$R$^y$—, —CH=CH—, —C≡C—, —CO—O— and/or —O—CO— such that oxygen and/or sulfur atoms are not linked directly to each other, said alkyl or alkoxy radical being unsubstituted or mono-substituted with a —CN group or mono- or poly-substituted with halogen; or aryl, aryloxy, alkylaryl, alkylaryloxy, alkylarylalkyl, alkylarylalkoxy, cycloalkyl, cycloalkyloxy, cycloalkylalkenyloxy, alkylcycloalkyl, alkylcycloalkyloxy or alkylcycloalkylalkenyloxy, each with up to 15 carbon atoms, wherein said in radicals being unsubstituted or mono-substituted with a —CN group or mono- or poly-substituted with halogen one ore more =CH— groups may be replaced independently of each other by =N— and/or one more CH$_2$— groups may be replaced independently of each other by —O—, —S—, —SiR$^x$R$^y$—, —CH=CH—, —C≡C—, —CO—O— and/or —O—CO— such that nitrogen and oxygen and/or sulfur atoms are not linked directly to each other;

$L^{11}$, $L^{12}$, $L^{13}$ and $L^{14}$ are independently of each other hydrogen, halogen, a CN group, an alkyl or alkoxy radical having from 1 to 15 carbon atoms wherein one or more methylene groups of said alkyl or alkoxy radical may be replaced independently of each other by —O—, —S—, —SiR$^x$R$^y$—, —CH=CH—, —C≡C—, —CO—O— and/or —O—CO— such that oxygen and/or sulfur atoms are not linked directly to each other, said alkyl or alkoxy radical being unsubstituted or mono-substituted with a —CN group or mono- or poly-substituted with halogen; or aryl, aryloxy, alkylaryl, alkylaryloxy, alkylarylalkyl, alkylarylalkoxy, cycloalkyl, cycloalkyloxy, cycloalkylalkenyloxy, alkylcycloalkyl, alkylcycloalkyloxy or alkylcycloalkylalkenyloxy, each with up to 15 carbon atoms, wherein said in radicals being unsubstituted or mono-substituted with a —CN group or mono- or poly-substituted with halogen one ore more =CH— groups may be replaced independently of each other by =N— and/or one more —CH$_2$— groups may be replaced independently of each other by —O—, —S—, —SiR$^x$R$^y$—, —CH=CH—, —C≡C—, —CO—O— and/or —O—CO— such that nitrogen and oxygen and/or sulfur atoms are not linked directly to each other, whereby $L^{13}$ and $L^{14}$ are hydrogen, if at least one of $L^{11}$ and $L^{12}$ is not hydrogen; $L^{11}$ and $L^{12}$ are hydrogen, if at least one of $L^{13}$ and $L^{14}$ is not hydrogen; at least one of $L^{11}$, $L^{12}$, $L^{13}$ and $L^{14}$ is not hydrogen; and $L^{11}$ and $L^{12}$ are not halogen at the same time;

$X^{11}$ is H, halogen, —CN, —NCS, —SF$_5$, —S—R$^z$, —SO$_2$—R$^z$, an alkyl or alkoxy radical having from 1 to 15 carbon atoms, wherein one or more methylene groups of said alkyl or alkoxy radical may be replaced independently of each other by —O—, —S—, —SiR$^x$R$^y$—, —CH=CH—, —C≡C—, —CO—O— and/or —O—CO— such that oxygen and/or sulfur atoms are not linked directly to each other, said alkyl or alkoxy radical being unsubstituted or mono-substituted with a —CN group or mono- or poly-substituted with halogen;

$R^x$ and $R^y$ are independently of each other hydrogen or an alkyl radical having from 1 to 7 carbon atoms;

$R^z$ is an alkyl radical having from 1 to 7 carbon atoms, said alkyl radical being unsubstituted or mono- or poly-substituted with halogen;

$A^{11}$, $A^{12}$, $A^{13}$ and $A^{14}$ are independently of each other a ring of one of the following formulas:

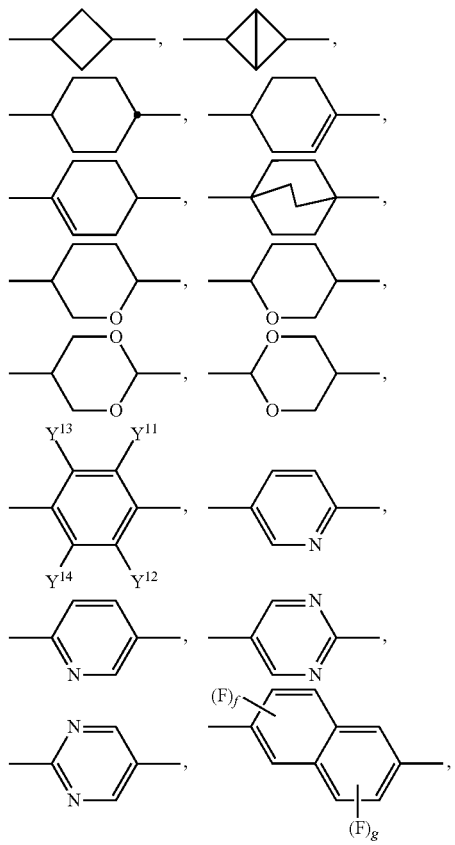

-continued

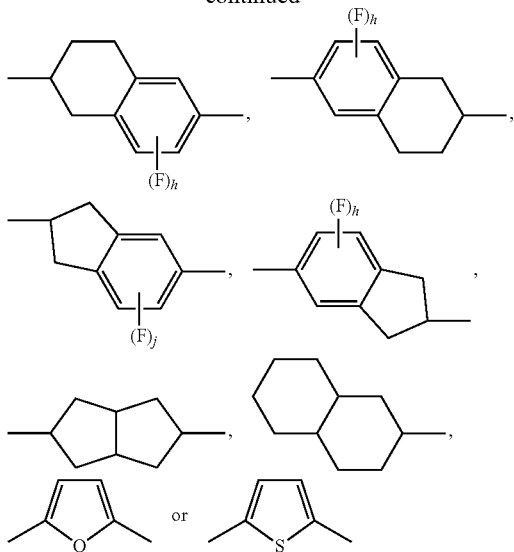

whereby each of $A^{11}$, $A^{12}$, $A^{13}$ and $A^{14}$ may be the same ring or two different rings if present more than once;

$Y^{11}$, $Y^{12}$, $Y^{13}$ and $Y^{14}$ are independently of each other hydrogen, halogen, an alkyl or alkoxy radical having from 1 to 15 carbon atoms wherein one or more methylene groups of said alkyl or alkoxy radical may be replaced independently of each other by —O—, —S—, —SiR$^x$R$^y$—, —CH=CH—, —C≡C—, —CO—O— and/or —O—CO— such that oxygen and/or sulfur atoms are not linked directly to each other, said alkyl or alkoxy radical being unsubstituted or mono- or poly-substituted with halogen; or aryl, aryloxy, alkylaryl, alkylaryloxy, alkylarylalkyl, alkylarylalkoxy, cycloalkyl, cycloalkyloxy, cycloalkylalkenyloxy, alkylcycloalkyl, alkylcycloalkyloxy or alkylcycloalkylalkenyloxy, each with up to 15 carbon atoms, wherein said in radicals being unsubstituted or mono-substituted with a —CN group or mono- or poly-substituted with halogen one ore more =CH— groups may be replaced independently of each other by =N— and/or one more —CH$_2$— groups may be replaced independently of each other by —O—, —S—, —SiR$^x$R$^y$—, —CH=CH—, —C≡C—, —CO—O— and/or —O—CO— such that nitrogen and oxygen and/or sulfur atoms are not linked directly to each other, f, g, h and j are independently of each other 0, 1, 2 or 3;

$Z^{11}$, $Z^{12}$, $Z^{13}$ and $Z^{14}$ are independently of each other a single bond, —CH$_2$CH$_2$—, (—CH$_2$CH$_2$—)$_2$, —CF$_2$—CF$_2$—, —CF$_2$—CH$_2$, —CH$_2$—CF$_2$—, —CH=CH—, —CF=CF—, —CF=CH—, —CH=CF—, —C≡C—, —CH$_2$O—, —OCH$_2$—, —CF$_2$O—, —OCF$_2$—, —CO—O— or —O—CO— whereby each of $Z^{11}$, $Z^{12}$, $Z^{13}$ and $Z^{14}$ may have the same or a different meaning if present more than once;

whereby $R^{11}$ is not an alkyl or alkoxy radical having from 1 to 10 carbon atoms, wherein one or more methylene groups of said alkyl or alkoxy radical may be replaced independently of each other by a moiety or moieties exclusively selected from the group of biradicals —O—, —S—, —SiH$_2$—, —CH=CH— and/or —C≡C— such that oxygen and/or sulfur atoms are not linked directly to each other, but alkyl or alkoxy radicals wherein one or more methylene groups are replaced independently of each other by —O—, —S—, —SiH$_2$—, —CH=CH— and/or —C≡C— and simultaneously one or more methylene groups are replaced independently of each other by —SiR$^x$R$^y$— (with R$^x$ and R$^y$ both not being H), —CO—O— and/or —O—CO— such that oxygen and/or sulfur atoms are not linked directly to each other such as e.g. groups of the formula —OCOCH=CH$_2$ are not excluded, and said alkyl or alkoxy radical being unsubstituted or mono-substituted with a —CN group or mono- or poly-substituted with halogen;

if, at the same time, a+b+c+d≦3; and $L^{11}$ is an alkoxy radical having from 1 to 10 carbon atoms wherein one or more methylene groups of said alkoxy radical may be replaced independently of each other by —O—, —S—, —SiH$_2$—, —CH=CH— and/or —C≡C— such that oxygen and/or sulfur atoms are not linked directly to each other, said alkoxy radical being unsubstituted or mono- or poly-substituted with halogen; and $L^{12}$ is halogen or an alkoxy radical having from 1 to 10 carbon atoms wherein one or more methylene groups of said alkoxy radical may be replaced independently of each other by —O—, —S—, —SiH$_2$—, —CH=CH— and/or —C≡C— such that oxygen and/or sulfur atoms are not linked directly to each other, said alkoxy radical being unsubstituted or mono- or poly-substituted with halogen; and $A^{11}$, $A^{12}$, $A^{13}$ and $A^{14}$ are all independently of each other a ring selected from one of the following formulas:

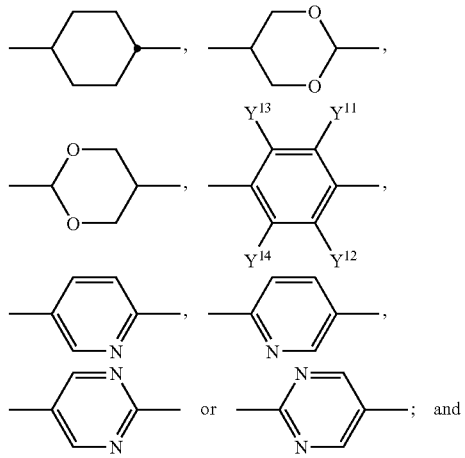

$Y^{11}$, $Y^{12}$, $Y^{13}$ and $Y^{14}$ are all independently of each other selected from H or F; and $Z^{11}$, $Z^{12}$, $Z^{13}$ and $Z^{14}$ are all independently of each other selected from —CH$_2$CH$_2$—, (—CH$_2$CH$_2$—)$_2$, —CH=CH—, —C≡C—, —CH$_2$O—, —OCH$_2$, —CF$_2$O—, —OCF$_2$—, —CO—O— or —O—CO—; and $X^{11}$ is halogen, —CN, an alkyl or alkoxy having 1 to 10 carbon atoms, wherein one or more methylene groups of said alkyl or alkoxy radical independently of each other may be replaced by —O—, —S—, —SiH$_2$—, —CH=CH— and/or —C≡C— such that oxygen and/or sulfur atoms are not linked directly to each other, said alkyl or alkoxy radical being unsubstituted or mono-substituted with a —CN group or mono- or poly-substituted with halogen.

In a preferred embodiment of the present invention at least one of the groups $R^{11}$, $L^{11}$, $L^{12}$, $L^{13}$, $L^{14}$, $Y^{11}$, $Y^{12}$, $Y^{13}$, $Y^{14}$ and $X^{11}$, which are present in the compounds of formula I, is a chiral group, which preferably is a group of formula I*

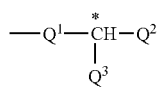

wherein $Q^1$ is an alkylene or alkylene-oxy group with 1 to 9 C atoms or a single bond, $Q^2$ is an alkyl or alkoxy group with 1 to 10 C atoms which may be unsubstituted, mono- or polysubstituted by F, Cl, Br or CN, it being also possible for one or more non-adjacent $CH_2$ groups to be replaced, in each case independently from one another, by —C≡C—, —O—, —S—, —NH—, —N(CH$_3$)—, —CO—, —COO—, —OCO—, —OCO—O—, —S—CO— or —CO—S— in such a manner that oxygen atoms are not linked directly to one another, $Q^3$ is F, Cl, Br, CN or an alkyl or alkoxy group as defined for $Q^2$ but being different from $Q^2$.

In case $Q^1$ in formula I* is an alkylene-oxy group, the O atom is preferably adjacent to the chiral C atom.

Preferred chiral groups of formula I* are 2-alkyl, 2-alkoxy, 2-methylalkyl, 2-methylalkoxy, 2-fluoroalkyl, 2-fluoro-alkoxy, 2-(2-ethin)-alkyl, 2-(2-ethin)-alkoxy, 1,1,1-trifluoro-2-alkyl and 1,1,1-trifluoro-2-alkoxy.

Particularly preferred chiral groups I* are 2-butyl (=1-methylpropyl), 2-methylbutyl, 2-methylpentyl, 3-methylpentyl, 2-ethylhexyl, 2-propylpentyl, in particular 2-methyl-butyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-hexyl, 2-octyl, 2-nonyl, 2-decyl, 2-dodecyl, 6-methoxyoctoxy, 6-methyloctoxy, 6-methyloctanoyloxy, 5-methylheptyloxy-carbonyl, 2-methylbutyryloxy, 3-methylvaleroyloxy, 4-methylhexanoyloxy, 2-chlorpropionyloxy, 2-chloro-3-methyl-butyryloxy, 2-chloro-4-methylvaleryloxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy, 1,1,1-trifluoro-2-octyloxy, 1,1,1-trifluoro-2-octyl, 2-fluoromethyloctyloxy for example. Very preferred are 2-hexyl, 2-octyl, 2-octyloxy, 1,1,1-trifluoro-2-hexyl, 1,1,1-trifluoro-2-octyl and 1,1,1-trifluoro-2-octyloxy.

In addition, compounds containing an achiral branched alkyl group may occasionally be of importance, for example, due to a reduction in the tendency towards crystallization. Branched groups of this type generally do not contain more than one chain branch. Preferred achiral branched groups are isopropyl, isobutyl (=methylpropyl), isopentyl (=3-methylbutyl), isopropoxy, 2-methyl-propoxy and 3-methylbutoxy.

In a further preferred embodiment, which may be different or identical to the previously described embodiments, at least one and preferably one of the rings $A^{11}$, $A^{12}$, $A^{13}$ and $A^{14}$, which are present in the compound of formula 1 is a chiral moiety, preferably selected from the group of cholesterine-diyl, pinimenthol-diyl and tetrahydropyrane-diyl and most preferably tetrahydropyrane-diyl.

In a further preferred embodiment of the present invention, which may be different or identical to the previously described embodiments, at least one of the groups $R^{11}$, $L^{11}$, $L^{12}$, $L^{13}$, $L^{14}$, $Y^{11}$, $Y^{12}$, $Y^{13}$, $Y^{14}$ and $X^{11}$, which are present in the compounds of formula I, is PG-SG wherein SG is a spacer group and
PG is a polymerisable or reactive group.

The polymerisable or reactive group PG is preferably selected from $CH_2$=$CW^1$—COO—,

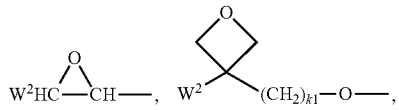

$CH_2$=$CW^2$—(O)$_{k1}$—, $CH_3$—CH=CH—O—, $(CH_2$=CH$)_2$CH—OCO—, $(CH_2$=CH—$CH_2)_2$CH—OCO—, $(CH_2$=CH$)_2$CH—O—, $(CH_2$=CH—$CH_2)_2$N—, HO—$CW^2W^3$—, HS—$CW^2W^3$—, H$W^2$N—, HO—$CW^2W^3$—NH—, $CH_2$=$CW^1$—CO—NH—, $CH_2$=CH—(COO)$_{k1}$-Phe-(O)$_{k2}$, Phe-CH=CH—, HOOC—, OCN—, and $W^4W^5W^6$Si—, with $W^1$ being H, Cl, CN, phenyl or alkyl with 1 to 5 C-atoms, in particular H, Cl or $CH_3$, $W^2$ and $W^3$ being independently of each other H or alkyl with 1 to 5 C-atoms, in particular methyl, ethyl or n-propyl, $W^4$, $W^5$ and $W^6$ being independently of each other Cl, oxaalkyl or oxacarbonylalkyl with 1 to 5 C-atoms, Phe being 1,4-phenylene and $k_1$ and $k_2$ being independently of each other 0 or 1.

Especially preferably PG is a vinyl group, an acrylate group, a methacrylate group, an oxetane group or an epoxy group, especially preferably an acrylate or methacrylate group.

As for the spacer group SG all groups can be used that are known for this purpose to those skilled in the art. The spacer group SG is preferably of formula SG'-X, such that PG-SG- is PG-SG'-X—, wherein SG' is alkylene with up to 20 C atoms which may be unsubstituted, mono- or poly-substituted by F, Cl, Br, I or CN, it being also possible for one or more non-adjacent $CH_2$ groups to be replaced, in each case independently from one another, by —O—, —S—, —NH—, —$NR^{01}$—, —Si$R^{01}R^{02}$—, —CO—, —COO—, —OCO—, —OCO—O—, —S—, —CO—, —CO—S—, —CH=CH— or —C≡C— in such a manner that O and/or S atoms are not linked directly to one another, X is —O—, —S—, —CO—, —COO—, —OCO—, —O—COO—, —CO—$NR^{01}$—, —$NR^{01}$—CO—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=C$R^{01}$—, —C$Y^{01}$=C$Y^{02}$—, —C≡C—, —CH=CH—COO—, —OCO—, —CH=CH— or a single bond, and $R^{01}$, $R^{02}$, $Y^{01}$ and $Y^{02}$ have one of the respective meanings given above.

X is preferably —O—, —S—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$—, —CH=N—, —N=CH—, —N=N—, —CH=C$R^0$—, —C$Y^{02}$=C$Y^{02}$—, —C≡C— or a single bond, in particular —O—, —S—, —C≡C—, —C$Y^{01}$=C$Y^{02}$— or a single bond, very preferably a group that is able to from a conjugated system, such as —C≡C— or —C$Y^{01}$=C$Y^{02}$—, or a single bond.

Typical groups SG' are, for example, —(CH$_2$)$_p$—, —(CH$_2$CH$_2$O)$_q$—CH$_2$CH$_2$—, —CH$_2$CH$_2$—S—CH$_2$CH$_2$— or —CH$_2$CH$_2$—NH—CH$_2$CH$_2$— or —(Si$R^0R^{00}$—O)$_p$—, with p being an integer from 2 to 12, q being an integer from 1 to 3 and $R^0$, $R^{00}$ and the other parameters having the meanings given above.

Preferred groups SG' are ethylene, propylene, butylene, pentylene, hexylene, heptylene, octylene, nonylene, decylene, undecylene, dodecylene, octadecylene, ethyleneoxyethylene, methyleneoxybutylene, ethylene-thioethylene, ethylene-N-methyl-iminoethylene, 1-methylalkylene, ethenylene, propenylene and butenylene for example.

In another preferred embodiment SG' is a chiral group of formula I*':

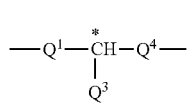

wherein
$Q^1$ and $Q^3$ have the meanings given in formula I*, and
$Q^4$ is an alkylene or alkylene-oxy group with 1 to 10 C atoms or a single bond, being different from $Q^1$,
with $Q^1$ being linked to the polymerisable group PG.

Further preferred are compounds with one or two groups PG-SG- wherein SG is a single bond.

In case of compounds with two groups PG-SG, each of the two polymerisable groups PG and the two spacer groups SG can be identical or different.

In a preferred embodiment of the instant are compounds of formula I wherein at one or more, preferably two, three or more, of the radicals
$R^{11}$, $L^{11}$, $L^{12}$, $L^{13}$, $L^{14}$, $Y^{11}$, $Y^{12}$, $Y^{13}$, $Y^{14}$ and $X^{11}$ present,
is/are aryl, aryloxy, alkylaryl, alkylaryloxy, alkylarylalkyl, alkylarylalkoxy, cycloalkyl, cycloalkyloxy, cycloalkylalkenyloxy, alkylcycloalkyl, alkylcycloalkyloxy or alkylcycloalkylalkenyloxy, preferably aryloxy, alkylaryloxy, cycloalkyloxy, cycloalkylalkenyloxy, alkylcycloalkyloxy or alkylcycloalkylalkenyloxy, each with up to 15 carbon atoms, wherein said in radicals being unsubstituted or mono-substituted with a —CN group or mono- or poly-substituted with halogen one ore more =CH— groups may be replaced independently of each other by =N— and/or one more —CH$_2$— groups may be replaced independently of each other by —O—, —S—, —SiR$^x$R$^y$—, —CH=CH—, —C≡C—, —CO—O— and/or —O—CO— such that nitrogen and oxygen and/or sulfur atoms are not linked directly to each other.

Preferably one or more, preferably two, three or more, of the radicals
$R^{11}$, $L^{11}$, $L^{12}$, $L^{13}$, $L^{14}$, $Y^{11}$, $Y^{12}$, $Y^{13}$, $Y^{14}$ and $X^{11}$ present,
is/are selected from the group of radicals:

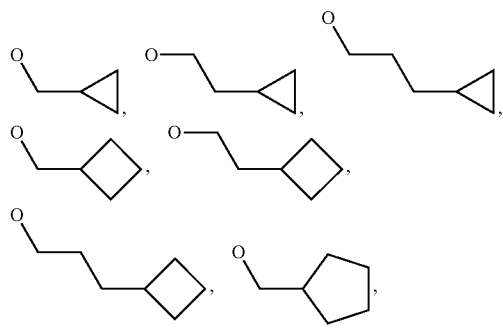

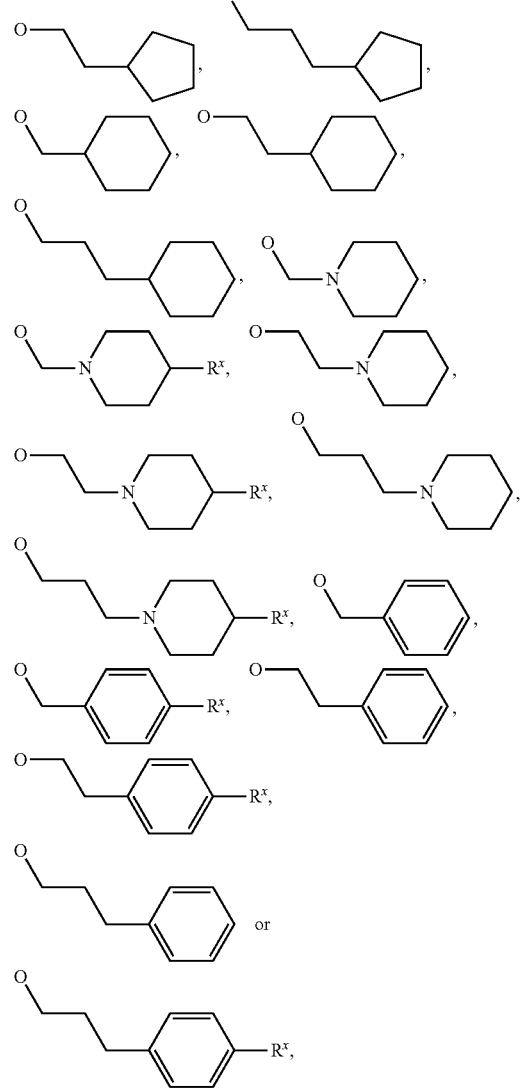

and wherein
$R^x$ has the meaning given above and preferably is n-alkyl and most preferably methyl.

The compounds according to the invention exhibit a very large positive dielectric anisotropy Δε and, when used in a liquid crystal medium even in small amounts, induce low threshold voltages and high values of the voltage holding ratio.

The compounds of the formula I have a broad range of applications. Depending on the choice of substituents, these compounds can serve as base materials of which liquid crystalline media are predominantly composed; however, it is also possible to add compounds of the formula I to liquid crystalline base materials from other classes of compound in order, for example, to modify the dielectric and/or optical anisotropy of a dielectric of this type and/or in order to optimize its threshold voltage and/or its viscosity.

In the pure state, the compounds of the formula I are colourless and are stable chemically, thermally and to light.

Preferably, the compounds according to general formula I do not comprise more than four rings in total, i.e. a+b+c+d≦3. It is even more preferred that a+b+c+d is at least 1 and not more than 3. Most preferred are compounds according to the invention with a+b+c+d being 2 or 3.

It is also preferred that in general formula I a is 1 and b is zero so that there is only one further ring $A^{11}$ on the left-hand side of the central ring of the compounds according to general formula I.

With regard to the right-hand side of the central ring of the compounds according to general formula I, it is preferred that at least one ring $A^{14}$ is present, i.e. d=1. In one preferred embodiment of the invention d=1 and c=0. In another preferred embodiment of the invention both c and d are equal to 1, and hence there are two rings $A^{13}$ and $A^{14}$ present on the right-hand side of the central ring of formula I. In certain preferred embodiments a=b=0 while c=d=1.

In formula I, $R^{11}$ is preferably an alkyl or alkoxy radical having from 1 to 10 carbon atoms, wherein one or more methylene groups of said alkyl or alkoxy radical may be replaced independently of each other by —O—, —SiR$^x$R$^y$—, with R$^x$ and R$^y$ being independently of each other straight-chain alkyl radicals with 1 to 5 carbon atoms, and/or —CH=CH— such that oxygen atoms are not linked directly to each other, said alkyl or alkoxy radical being unsubstituted or mono- or poly-substituted with fluorine. It is even more preferred that $R^{11}$ is a straight-chain alkyl, alkenyl, alkoxy, alkenyloxy or —O-alkylene-O-alkyl radical or a —O-alkylene-Si(alkyl')$_2$-O—Si(alkyl')$_3$ radical with up to 10 carbon atoms in the main chain which radicals may be additionally substituted with fluorine whereby alkyl' is preferably a straight-chain alkanyl radical with 1, 2, 3 or 4 carbon atoms. It is still more preferred that $R^{11}$ is one of the following radicals: $C_nH_{2n+1}$— or $C_nH_{2n+1}$—O— with n being 1, 2, 3, 4, 5, 6, 7 or 8; $C_mH_{2m-1}$— or $C_mH_{2m-1}$—O— with m being 2, 3, 4, 5, 6, 7 or 8; $C_pH_{2p+1}$—O—$C_qH_{2q}$O— with p being 1, 2, 3, 4 or 5 and q being 1, 2, 3, 4 or 5; $(C_tH_{2t+1})_3$Si—O—Si$(C_sH_{2s+1})_2$—$C_rH_{2r}$—O— with r being 1, 2, 3 or 4 and s and t being independently of each other 1, 2, 3 or 4. Especially, $R^{11}$ is $CH_3$, $C_2H_5$, $C_3H_7$, n-$C_4H_9$, n-$C_5H_{11}$, n-$C_6H_{13}$, n-$C_7H_{15}$, n-$C_8H_{17}$, —O—$CH_3$, —O—$C_2H_5$, —O—$C_3H_7$, —O-n-$C_4H_9$, —O-n-$C_5H_{11}$, O-n-$C_6H_{13}$, —$CH_2CH_2OCH_3$, —$CH_2CH_2CH$=$CH_2$, —O—$(CH_2)_2$—CH=$CH_2$, —O—$(CH_2)_3$—CH=$CH_2$, —O—$(CH_2)_4$—CH=$CH_2$, —O—$(CH_2)_2$—O—$CH_3$, —O—$(CH_2)_2$—O—$C_2H_5$, $(CH_3)_3$Si—O—Si$(CH_3)_2$—$(CH_2)_2$—O—, $(CH_3)_3$Si—O—Si$(CH_3)_2$—$(CH_2)_3$—O—.

In formula I, $L^{11}$ is preferably an alkyl or alkoxy radical having from 1 to 10 carbon atoms, wherein one or more methylene groups of said alkyl or alkoxy radical may be replaced independently of each other by —O—, —SiR$^x$R$^y$—, with R$^x$ and R$^y$ being independently of each other straight-chain alkyl radicals with 1 to 5 carbon atoms, and/or —CH=CH— such that oxygen atoms are not linked directly to each other, said alkyl or alkoxy radical being unsubstituted or mono- or poly-substituted with fluorine. It is even more preferred that $L^{11}$ is a straight-chain alkyl, alkenyl, alkoxy, alkenyloxy or —O-alkylene-O-alkyl radical or a —O-alkylene-Si(alkyl')$_2$—O—Si(alkyl')$_3$ radical with up to 10 carbon atoms which radicals may be additionally substituted with fluorine whereby alkyl' is preferably a straight-chain alkanyl radical with 1, 2, 3 or 4 carbon atoms. It is still more preferred that $L^{11}$ is one of the following radicals: perfluoroalkyl; $C_nH_{2n+1}$—O— with n being 1, 2, 3, 4, 5, 6, 7, 8, 9 or 10 whereby one or more of the H atoms may be replaced by F; $C_mH_{1m-1}$—O— with m being 2, 3, 4, 5, 6, 7 or 8 whereby one or more of the H atoms may be replaced by F; $C_pH_{2p+1}$—O—$C_qH_{2q}$—O— with p being 1, 2, 3, 4 or 5 and q being 1, 2, 3, 4 or 5; $(C_tH_{2t+1})_3$Si—O—Si$(C_sH_{2s-1})_2$—$C_rH_{2r}$—O— with r being 1, 2, 3 or 4 and s and t being independently of each other 1, 2, 3 or 4. Especially, $L^{11}$ is —$CF_3$; —O—$CH_3$, —O—$C_2H_5$, —O—$C_3H_7$, —O-n-$C_4H_9$, —O-n-$C_5H_{11}$, O-n-$C_6H_{13}$, —O-n-$C_7H_{15}$, —O-n-$C_8H_{17}$, —O—$CF_3$, —O—$CHF_2$, —O—$C_2F_5$, —O—$C_3F_7$, —O-n-$C_4F_9$, —O—$(CH_2)_2$—CH=$CH_2$, —O—$(CH_2)_3$—CH=$CH_2$, —O—$(CH_2)_4$—CH=$CH_2$, —O—$(CH_2)_2$—O—$CH_3$, —O—$(CH_2)_2$—O—$C_2H_5$, $(CH_3)_3$Si—O—Si$(CH_3)_2$—$(CH_2)_2$—O—, $(CH_3)_3$Si—O—Si$(CH_3)_2$—$(CH_2)_3$—O—.

In formula I, $L^{12}$ is preferably fluorine, an alkyl or alkoxy radical having from 1 to 10 carbon atoms, wherein one or more methylene groups of said alkyl or alkoxy radical may be replaced independently of each other by —O—, —SiR$^x$R$^y$—, with R$^x$ and R$^y$ being independently of each other straight-chain alkyl radicals with 1 to 5 carbon atoms, and/or —CH=CH— such that oxygen atoms are not linked directly to each other, said alkyl or alkoxy radical being unsubstituted or mono- or poly-substituted with fluorine. It is even more preferred that $L^{12}$ is F, a straight-chain alkyl, alkenyl, alkoxy, alkenyloxy or —O-alkylene-O-alkyl radical or a —O-alkylene-Si(alkyl')$_2$—O—Si(alkyl')$_3$ radical with up to 10 carbon atoms which radicals may be additionally substituted with fluorine whereby alkyl' is preferably a straight-chain alkyl radical with 1, 2, 3 or 4 carbon atoms. It is still more preferred that $L^{12}$ is either F or one of the following radicals: perfluoroalkyl; $C_nH_{2n+1}$—O— with n being 1, 2, 3, 4, 5, 6, 7 or 8 whereby one or more of the H atoms may be replaced by F; $C_mH_{2m-1}$—O— with m being 2, 3, 4, 5, 6, 7 or 8 whereby one or more of the H atoms may be replaced by F; $C_pH_{2p+1}$—O—$C_qH_{2q}$—O— with p being 1, 2, 3, 4 or 5 and q being 1, 2, 3, 4 or 5; $(C_tH_{2t+1})_3$Si—O—Si$(C_sH_{2s+1})_2$—$C_rH_{2r}$—O— with r being 1, 2, 3 or 4 and s and t being independently of each other 1, 2, 3 or 4. Especially, $L^{12}$ is —$CF_3$, —O—$CH_3$, —O—$C_2H_5$, —O—$C_3H_7$, —O-n-$C_4H_9$, —O-n-$C_5H_{11}$, O-n-$C_6H_{13}$, —O-n-$C_7H_{15}$, —O-n-$C_8H_{17}$, —O—$CF_3$, —O—$CHF_2$, —O—$C_2F_5$, —O—$C_3F_7$, —O-n-$C_4F_9$, —O—$(CH_2)_2$—CH=$CH_2$, —O—$(CH_2)_3$—CH=$CH_2$, —O—$(CH_2)_4$—CH=$CH_2$, —O—$(CH_2)_2$—O—$CH_3$, —O—$(CH_2)_2$—O—$C_2H_5$, $(CH_3)_3$Si—O—Si $(CH_3)_2$—$(CH_2)_2$—O—, $(CH_3)_3$Si—O—Si$(CH_3)_2$—$(CH_2)_3$—O—.

It is also preferred that $L^{11}$ and $L^{12}$ have the same meaning.

Further, if $L^{11}$ and $L^{12}$ are both hydrogen, it is preferred that $L^{13}$ and $L^4$ are both not hydrogen and have the same meaning as $L^1$ and $L^{12}$ in the case $L^{11}$ and $L^{12}$ are not hydrogen.

It is preferred that $X^{11}$ is a polar substituent. Hence, $X^{11}$ is preferably —NCS, —$SF_5$, —S—R$^z$, —$SO_2$—R$^z$— with R$^z$ being a straight-chain alkyl radical that is mono- or poly-substituted with fluorine—or —CN, F, Cl, an alkyl or alkoxy radical having from 1 to 10 carbon atoms, wherein one or more methylene groups of said alkyl or alkoxy radical may be replaced independently of each other by —O—, —S—, —SiR$^x$R$^y$—, with R$^x$ and R$^y$ are independently of each other straight-chain alkyl radicals with 1 to 5 carbon atoms, or —CH=CH— such that oxygen and/or sulfur atoms are not linked directly to each other, said alkyl radical being mono- or poly-substituted with fluorine and said alkoxy radical being unsubstituted or mono- or poly-substituted with fluorine. In one preferred embodiment of the invention, $X^{11}$ is —NCS, —$SF_5$, —S—R$^z$ or —$SO_2$—R$^z$, with R$^z$ being a straight-chain alkyl radical that is mono- or poly-substituted with fluorine, especially —$CF_3$, —$C_2F_5$ or n-$C_4F_9$. In another preferred embodiment of the invention, $X^{11}$ is also selected from F, Cl, CN, an alkyl, alkenyl or alkoxy radical having up to 8 carbon atoms said alkyl or alkenyl radical being mono- or poly-substituted with fluorine and said alkoxy radical being unsubstituted or mono- or poly-substituted with fluorine. It is even more preferred that $X^{11}$ is F, $CF_3$, $CHF_2$, $C_2F_5$, —CH=$CF_2$, —CF=$CF_2$, —O—$CH_3$, —O—$C_3H_7$, —O-n-$C_4H_9$, —O-n-$C_5H_{11}$, O-n-$C_6H_{13}$, —O—$CF_3$, —O—$CHF_2$, —O—$C_2F_5$, —O—$C_3F_7$, —O-n-$C_4F_9$.

$A^{11}$, $A^{12}$, $A^{13}$ and $A^{14}$ are independently of each other preferably selected from one of the following formulas:

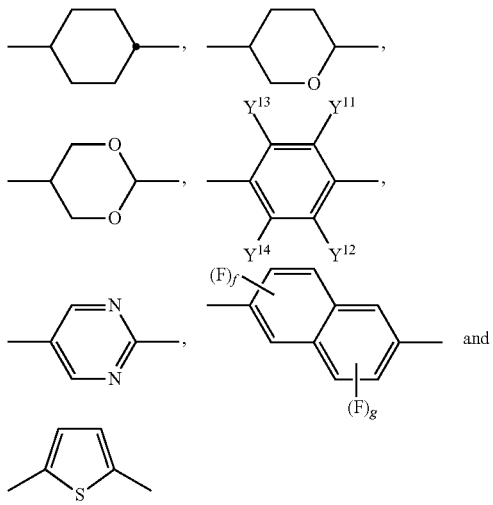

Preferably, $Y^{11}$ is H, F, an alkyl, alkoxy, alkenyloxy or —O-alkylene-O-alkyl radical or a —O-alkylene-Si(alkyl')$_2$—O—Si(alkyl')$_3$ radical with up to 10 carbon atoms which radicals may be additionally substituted with fluorine whereby alkyl' is preferably a straight-chain alkyl radical with 1, 2, 3 or 4 carbon atoms. It is still more preferred that $Y^{11}$ is one of the following radicals: H; F; perfluoroalkyl; $C_nH_{2n+1}$—O— with n being 1, 2, 3, 4, 5, 6, 7 or 8 whereby one or more of the H atoms may be replaced by F; $C_mH_{2m-1}$—O— with m being 2, 3, 4, 5, 6, 7 or 8 whereby one or more of the H atoms may be replaced by F; $C_pH_{p+1}$—O—$C_qH_{2q}$—O— with p being 1, 2, 3, 4 or 5 and q being 1, 2, 3, 4 or 5; $(C_tH_{2t-1})_3$Si—O—Si$(C_sH_{2s+1})_2$—$CH_r$—O— with r being 1, 2, 3 or 4 and s and t being independently of each other 1, 2, 3 or 4. Especially, $Y^{11}$ is F, $CF_3$, —O—$CH_3$, —O—$C_2H_5$, —O—$C_3H_7$, —O-n-$C_4H_9$, —O-n-$C_5H_{11}$, O-n-$C_6H_{13}$, —O—$CF_3$, —O—$CHF_2$, —O—$C_2F_5$, —O—$C_3F_7$, —O-n-$C_4F_9$, —O—$(CH_2)_2CH=CH_2$, —O—$(CH_2)_3$—$CH=CH_2$, —O—$(CH_2)_4$—$CH=CH_2$, —O—$(CH_2)_2$—O—$CH_3$, —O—$(CH_2)_2$—O—$C_2H_5$, $(CH_3)_3$Si—O—Si$(CH_3)_2$—$(CH_2)_2$—O—, $(CH_3)_3$Si—O—Si$(CH_3)_2$—$(CH_2)_3$—O—.

Preferably, $Y^{12}$ is hydrogen or has the same meaning as the preferred definitions of $Y^{11}$ above. Especially, $Y^{12}$ is H.

Furthermore, is also preferred that

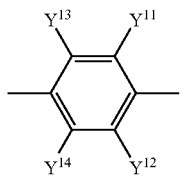

represents one or more of the following groups:

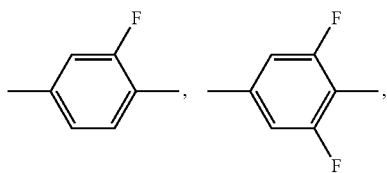

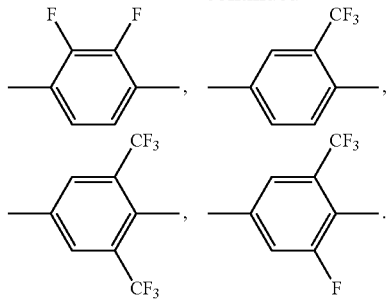

Further it is preferred that the compounds according to the invention comprise at least one tetrahydropyran-2,5-diyl, naphthyl-2,6-diyl and/or thien-2,5-diyl ring whereby said naphthyl moiety may be substituted with one or more fluorine atoms. It is even more preferred that one of $A^{11}$, $A^{12}$, $A^{13}$ and $A^{14}$ in formula I is

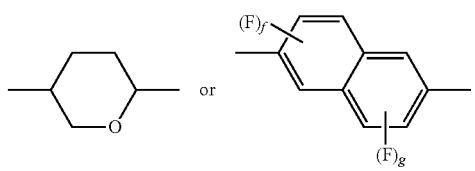

with f and g being independently of each other 0, 1, 2 or 3; especially, f is 1 and g is 2 or 3. It should be noted that compounds of formula I comprising a tetrahydropyranyl-2,5-diyl ring that bears two stereogenic centers on C-2 and C-5, respectively, may be obtained, if desired, in stereochemically pure form by way of, e.g., methods for separating stereoisomers that are well known to the skilled person, for instance, HPLC on a chiral phase.

In certain preferred embodiments of the invention at least one of $A^{11}$ and $A^{12}$ and especially $A^{11}$ is a tetrahydropyran-2,5-diyl ring. In other preferred embodiments of the invention at least one of $A^{13}$ and $A^{14}$ and particularly only one of $A^{13}$ and $A^{14}$ is of the formula

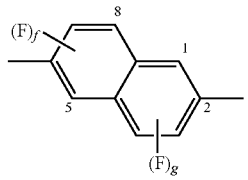

with f and g being independently of each other 0, 1, 2 or 3. It is highly preferred that f is 1 and g is 2 or 3 and the fluorine substituents are located in the 1-, 3-, 4- and 8-position, respectively, of the naphthyl moiety. In a particularly preferred embodiment one of $A^{11}$ and $A^{12}$ is a tetrahydropyran-2,5-diyl moiety and one of $A^{13}$ and $A^{14}$ is an optionally fluorinated naphthyl-2,6-diyl moiety.

In another preferred embodiment of the present invention $A^{14}$-$X^{11}$ is of one of the following formulas:

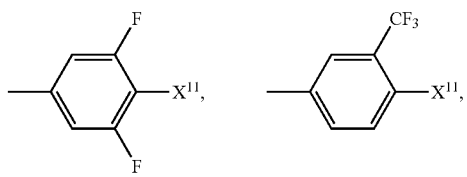

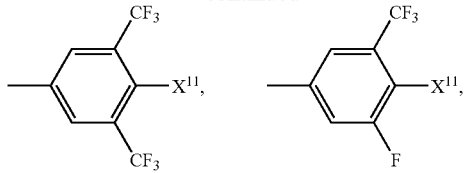

wherein $X^{11}$ is as defined above and preferably NCS, $SF_5$, —S—$CF_3$, —$SO_2$—$CF_3$, —$SO_2$—$C_2F_5$, —$SO_2$-n-$C_4F_9$, —CN, F, Cl, $CF_3$, $CHF_2$, $C_2F_5$, —CH=$CF_2$, —CF=$CF_2$, —O—$CH_3$, —O—$C_3H_7$, —O-n-$C_4H_9$, —O-n-$C_5H_{11}$, O-n-$C_6H_{13}$, —O—$CF_3$, —O—$CHF_2$, —O—$C_2F_5$, —O—$C_3F_7$, —O-n-$C_4F_9$, more preferably F, $OCF_3$, $CF_3$, CN, especially F. Most preferably, $A^{14}$-$X^{11}$ is of formula

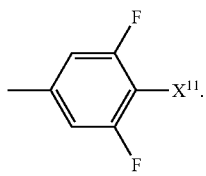

It is furthermore preferred that in formula I $Z^{11}$, $Z^{12}$, $Z^{13}$ and $Z^{14}$ are independently of each other a single bond, —$CF_2$—$CF_2$—, —$CF_2$—$CH_2$—, —$CH_2$—$CF_2$—, —CF=CF—, —CF=CH—, —CH=CF—, —C≡C—, —$CF_2$O— or —CO—O—. It is even more preferred that $Z^{11}$ and $Z^{12}$ are independently of each other a single bond or —CO—O—, especially a single bond, and that $Z^{13}$ and $Z^{14}$ are independently of each other a single bond, —$CF_2$O— or —CO—O—; especially one of $Z^{13}$ and $Z^{14}$ is —$CF_2$O—.

One preferred embodiment of the invention comprises compounds of formula IA:

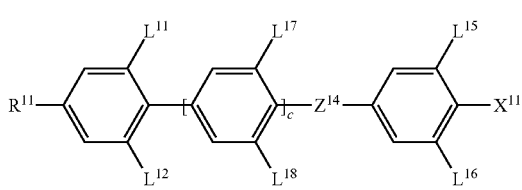

IA wherein
c is 0 or 1;
$R^{11}$ is H, an alkyl or alkoxy radical having from 1 to 15 carbon atoms or an alkenyl or alkenyloxy or —O-alkylene-O-alkyl radical having from 2 to 15 carbon atoms, wherein one or more methylene groups of each of said radicals may be replaced independently of each other by —S—, —$SiR^xR^y$—, —C≡C—, —CO—O— and/or —O—CO— such that oxygen and/or sulfur atoms are not linked directly to each other, said radicals being unsubstituted or mono-substituted with a —CN group or mono- or poly-substituted with halogen; preferably $R^{11}$ is a straight-chain alkyl, alkoxy, alkenyl, alkenyloxy or —O-alkylene-O-alkyl radical with up to 10 carbon atoms, said radicals being unsubstituted or mono- or poly-substituted with halogen;

$L^{11}$ is an alkyl or alkoxy radical having from 1 to 15 carbon atoms or an alkenyl or alkenyloxy or —O-alkylene-O-alkyl radical having from 2 to 15 carbon atoms, wherein one or more methylene groups of each of said radicals may be replaced independently of each other by —S—, —$SiR^xR^y$—, —C≡C—, —CO—O— and/or —O—CO— such that oxygen and/or sulfur atoms are not linked directly to each other, said radicals being unsubstituted or mono-substituted with a —CN group or mono- or poly-substituted with halogen; preferably $L^{11}$ is a straight-chain alkyl, alkoxy, alkenyl, alkenyloxy or —O-alkylene-O-alkyl radical with up to 10 carbon atoms, said radicals being unsubstituted or mono- or poly-substituted with halogen;

$L^{12}$ is hydrogen, halogen, an alkyl or alkoxy radical having from 1 to 15 carbon atoms or an alkenyl or alkenyloxy or —O-alkylene-O-alkyl radical having from 2 to 15 carbon atoms, wherein one or more methylene groups of each of said radicals may be replaced independently of each other by —S—, —$SiR^xR^y$—, —C≡C—, —CO—O— and/or —O—CO— such that oxygen and/or sulfur atoms are not linked directly to each other, said radicals being unsubstituted or mono-substituted with a —CN group or mono- or poly-substituted with halogen; preferably $L^{12}$ is H, F, a straight-chain alkyl, alkoxy, alkenyl, alkenyloxy or —O-alkylene-O-alkyl radical with up to 10 carbon atoms, said radicals being unsubstituted or mono- or poly-substituted with halogen;

$L^{15}$, $L^{16}$, $L^{17}$ and $L^{18}$ are independently of each other H, —$CF_3$ or F; preferably at least $L^{15}$ is F or —$CF_3$;

$Z^{14}$ is a single bond, —$CH_2CH_2$—, —($CH_2CH_2$)$_2$—, —$CF_2$—$CF_2$, —$CF_2$—$CH_2$—, —$CH_2$—$CF_2$—, —CH=CH—, —CF=CF—, —CF=CH—, —CH=CF—, —C≡C—, —$CH_2$O—, —$OCH_2$—, —$CF_2$O—, —$OCF_2$—, —CO—O— or —O—CO—; preferably $Z^{14}$ is a single bond, —C≡C—, —$CF_2$— or —$CO_2$—, in particular a single bond or —$CF_2$O—;

$X^{11}$ is —NCS, $CF_3$, —$SF_5$, —S—$R^z$ or —$SO_2$—$R^z$;

$R^x$ and $R^y$ are independently of each other hydrogen or an alkyl radical having from 1 to 7 carbon atoms; preferably $R^x$ and $R^y$ are both methyl, ethyl, propyl or butyl; and $R^z$ is an alkyl radical having from 1 to 7 carbon atoms, said alkyl radical being unsubstituted or mono- or poly-substituted with halogen; preferably $R^z$ is $CF_3$, $C_2F_5$ or n-$C_4F_9$.

One preferred subgroup of compounds according to formula IA are compounds in which c is zero. Examples of compounds of said subgroup are the following ones:

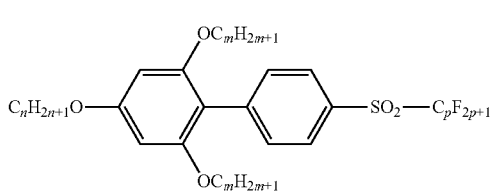

IAa-1

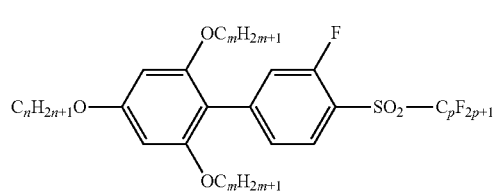

IAa-2

-continued
IAa-3
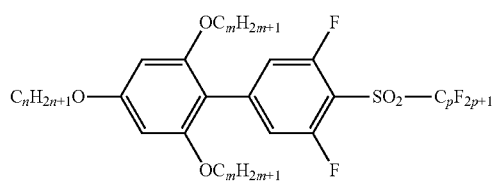
IAa-4
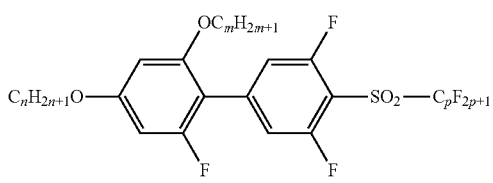
IAa-5
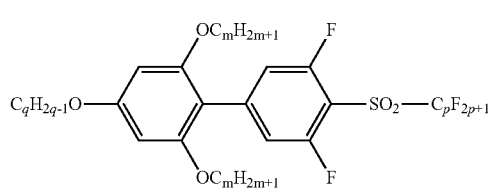
IAa-6
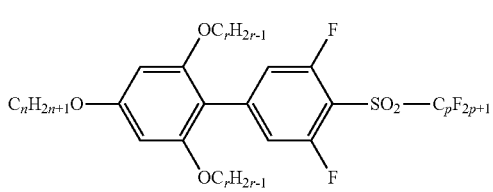
IAa-7
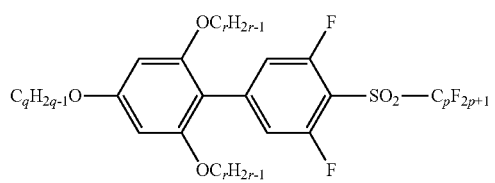
IAa-8
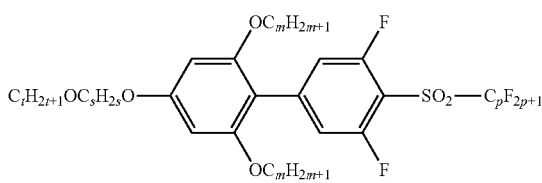
IAa-9
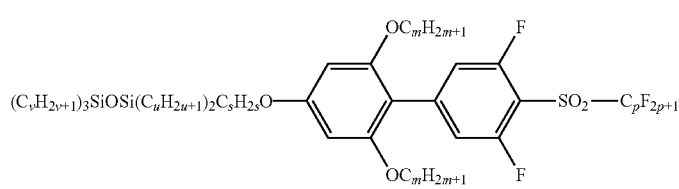
IAa-10
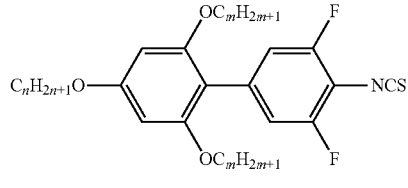
IAa-11
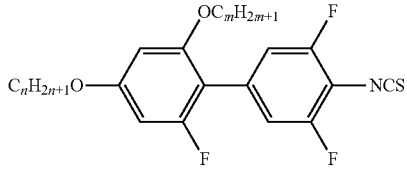
IAa-12
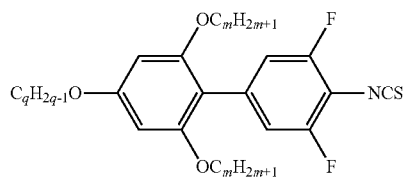
IAa-13
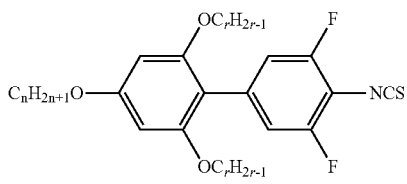
IAa-14
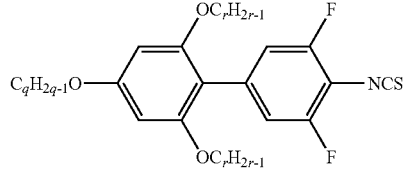
IAa-15
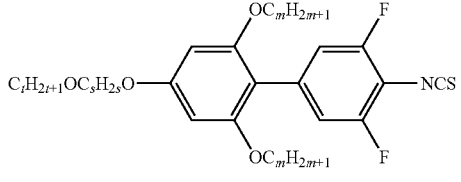
IAa-16
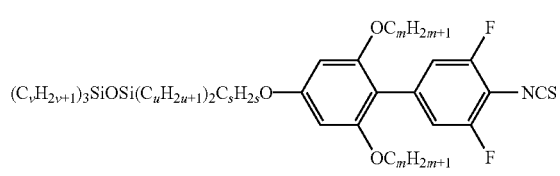
IAa-17
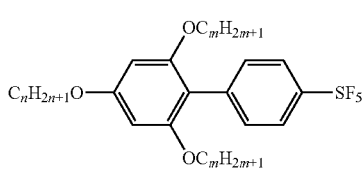

-continued
IAa-18
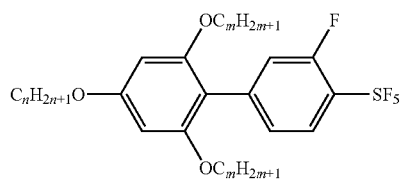
IAa-19
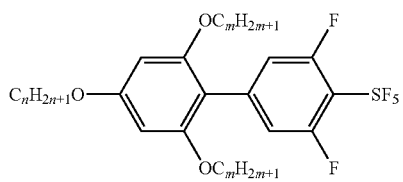
IAa-20
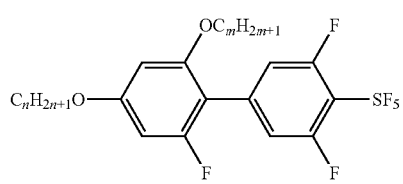
IAa-21
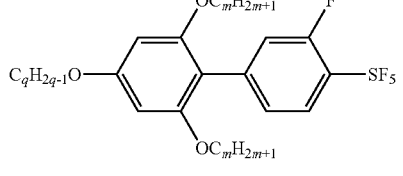
IAa-22
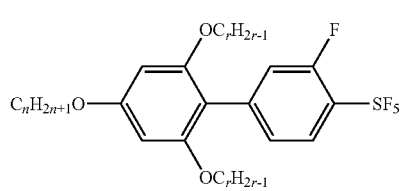
IAa-23
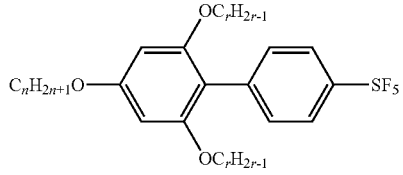
IAa-24
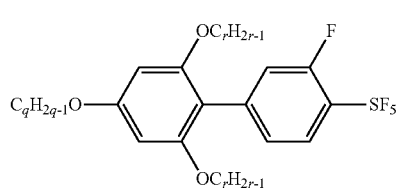
IAa-25
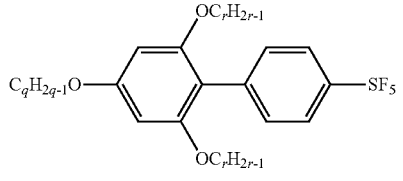
IAa-26
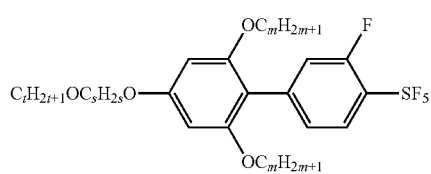
IAa-27
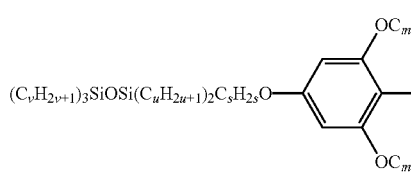
IAa-28
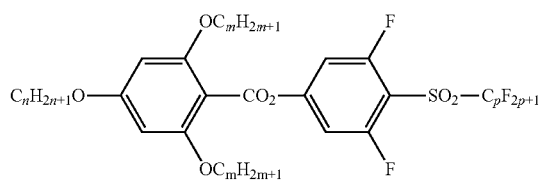
IAa-29
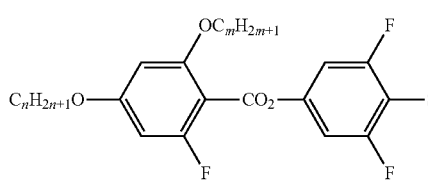
IAa-30
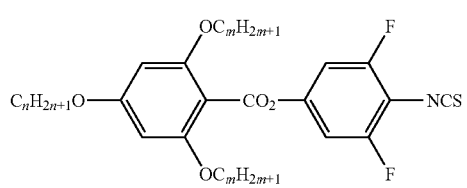
IAa-31
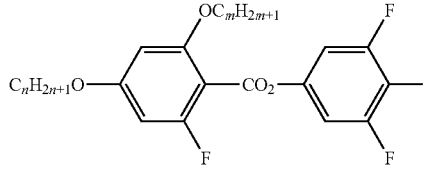
IAa-32
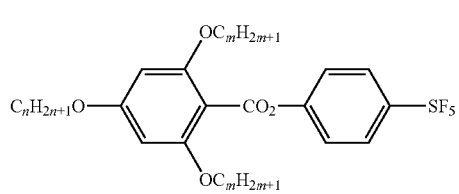
IAa-33
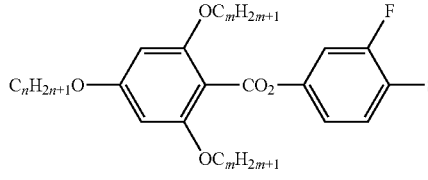

-continued

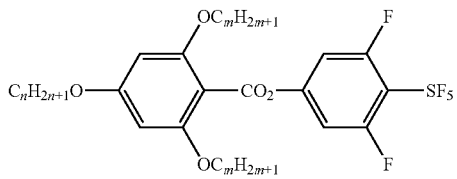
IAa-34

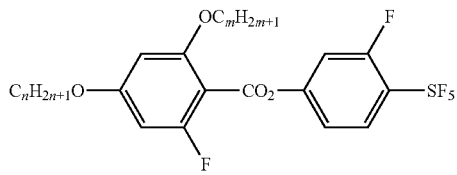
IAa-35

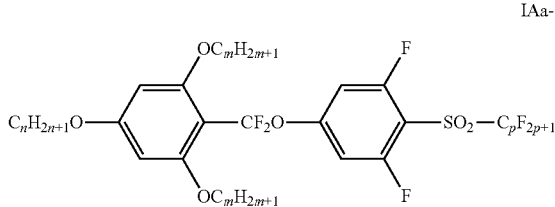
IAa-36

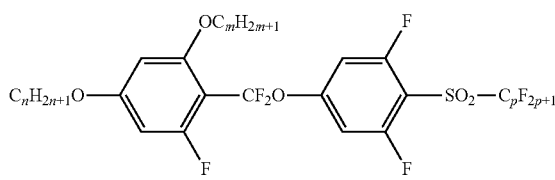
IAa-37

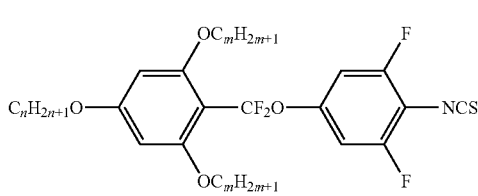
IAa-38

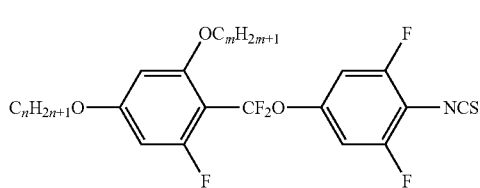
IAa-39

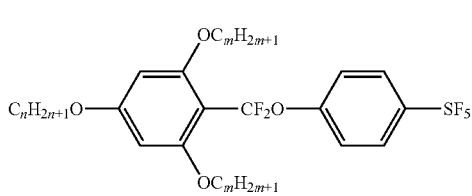
IAa-40

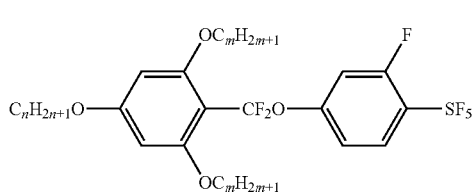
IAa-41

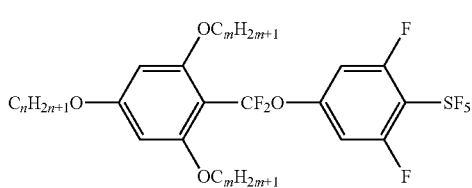
IAa-42

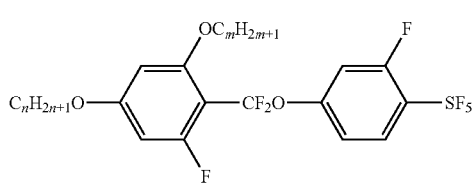
IAa-43 wherein n and m are independently of each other integers from 1 to 10, preferably 1, 2, 3, 4, 5, 6, 7 or 8; p is an integer from 1 to 5, preferably 1, 2 or 4; q and r are independently of each other integers from 2 to 8, preferably 3, 4, 5, 6; s and t are independently of each other 1, 2, 3, 4, preferably 2 or 3; and u and v are independently of each other 1, 2, 3, 4, preferably 1 or 4. Preferably, $C_nH_{2n+1}O$ and $C_mH_{2m+1}O$ represent independently of each other methoxy, ethoxy, propoxy, n-butoxy, n-pentoxy and n-hexoxy. If present twice in the same compound, both $C_mH_{2m+1}O$ substituents may have the same value for m or different ones; preferably m in two $C_mH_{2m+1}O$ substituents have the same meaning. Preferably, $-SO_2-C_pH_{2p+1}$ represents $-SO_2-CF_3$, $-SO_2-C_2F_5$, $-SO_2-C_4F_9$. Preferably, $C_qH_{2q-1}O$ and $C_rH_{2r-1}O$ represent $-O-CH_2CH=CH_2$, $-O-(CH_2)_2CH=CH_2$, $-O-(CH_2)_3CH=CH_2$, $-O-(CH_2)_2CH=CH-CH_3$. Preferably, $-OC_sH_{2s}OC_tH_{2t+1}$ represents $CH_3OCH_2CH_2O-$ and $CH_3CH_2OCH_2CH_2O-$. Preferably, $(C_vH_{2v+1})_3SiOSi(C_uH_{2u+1})_2C_sH_{2s}O$ represents $(CH_3)_3SiOSi(CH_3)_2CH_2CH_2O-$ and $(CH_3)_3SiOSi(CH_3)_2CH_2CH_2CH_2O-$.

Another preferred subgroup of compounds according to formula IA are compounds in which c is 1. Examples of compounds of said subgroup are the following ones:

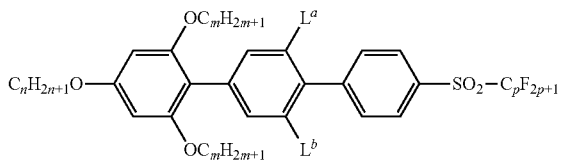
IAb-1

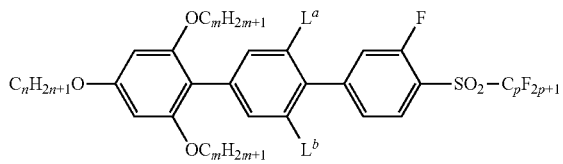
IAb-2

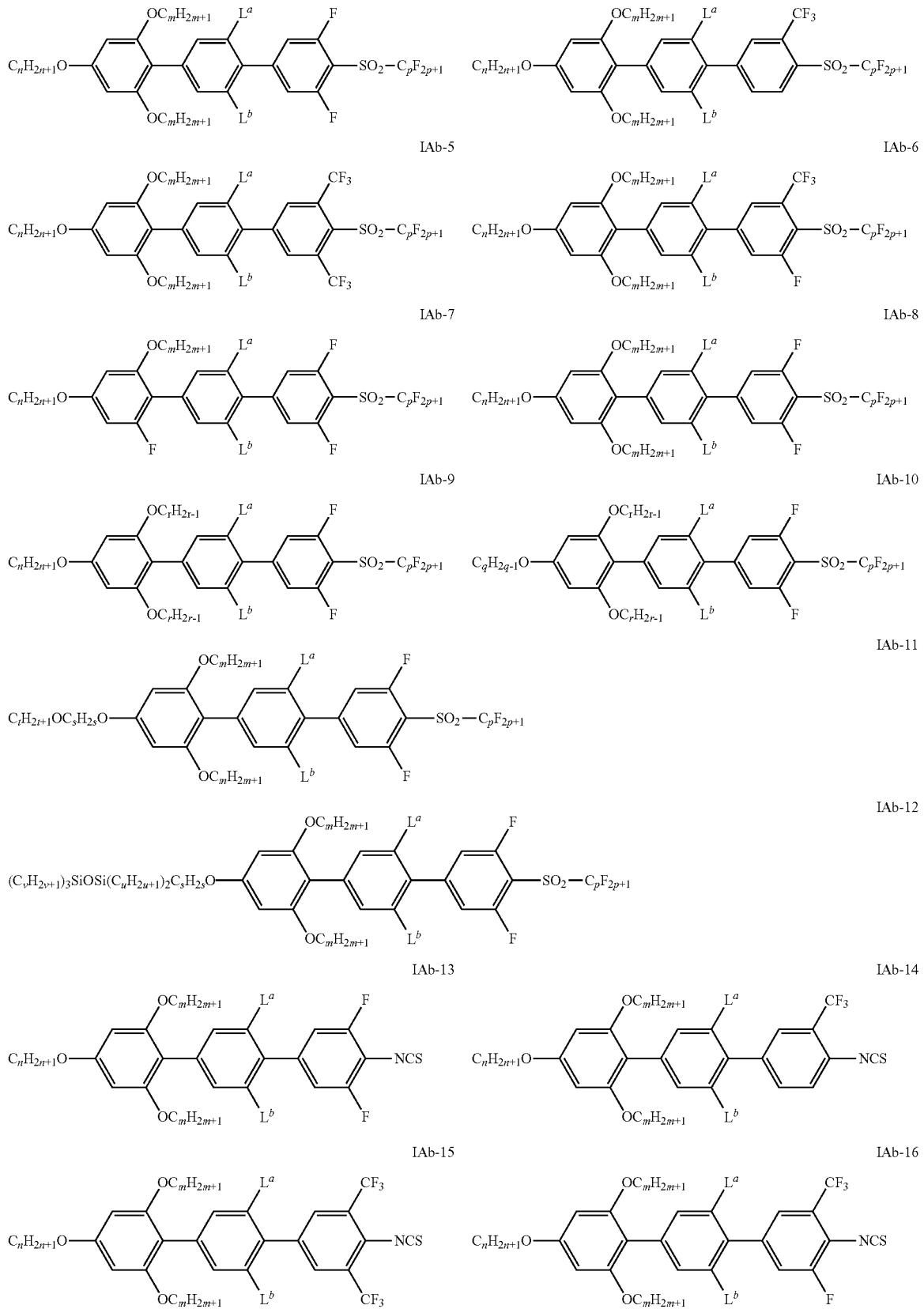

-continued
IAb-17
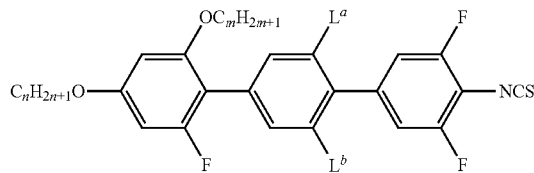
IAb-18
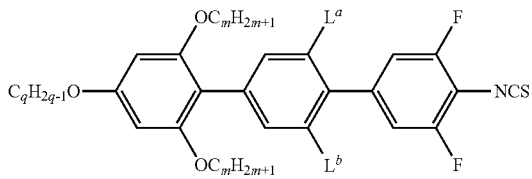
IAb-19
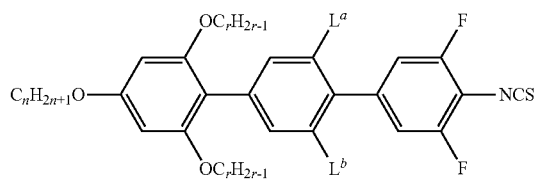
IAb-20
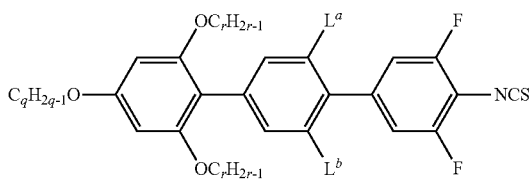
IAb-21
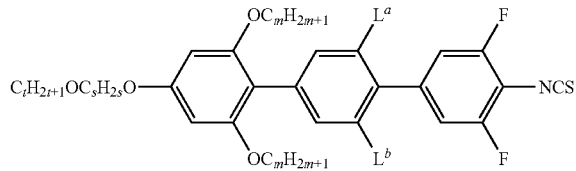
IAb-22
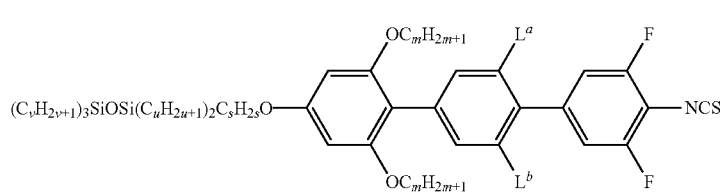
IAb-23
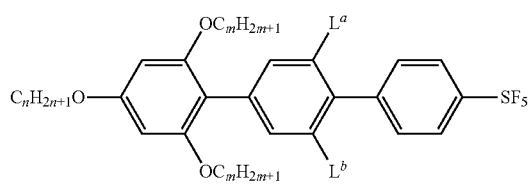
IAb-24
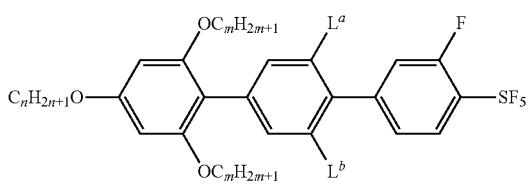
IAb-25
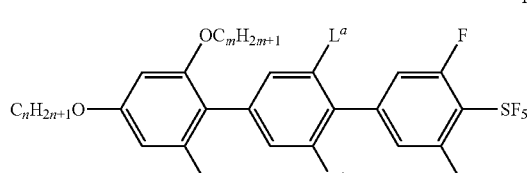
IAb-26
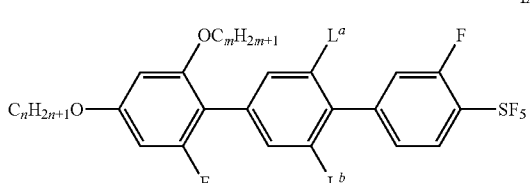
IAb-27
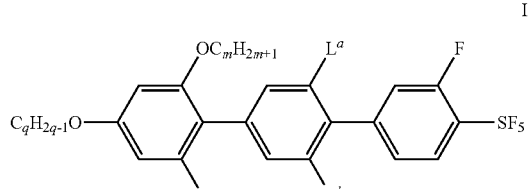
IAb-28
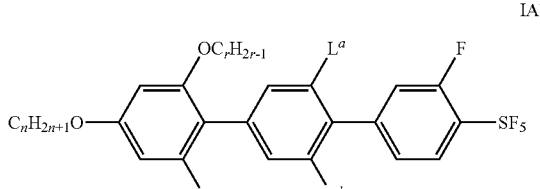
IAb-29
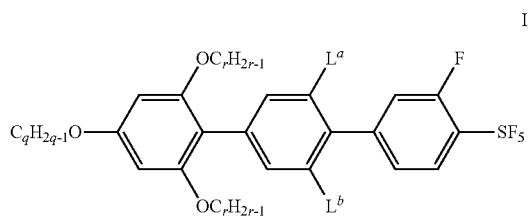
IAb-30
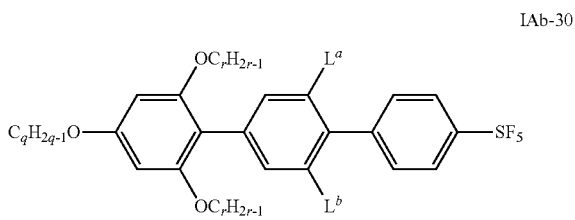

-continued
IAb-31
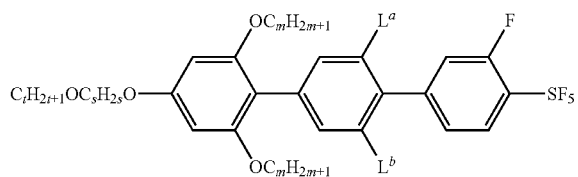
IAb-32
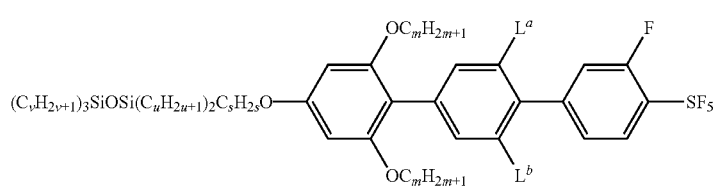
IAb-33
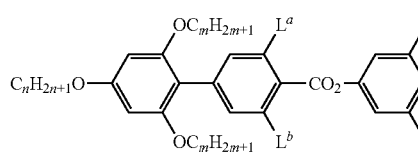
IAb-34
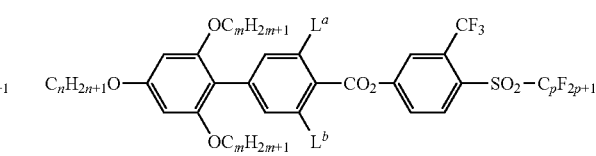
IAb-35
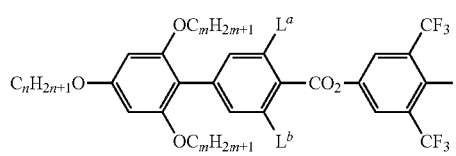
IAb-36
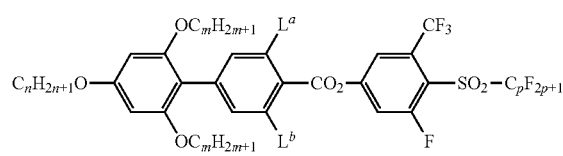
IAb-37
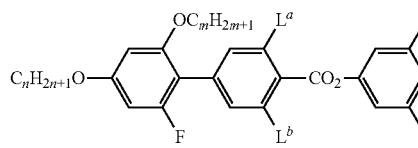
IAb-38
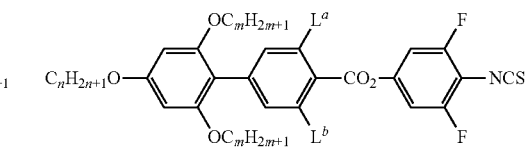
IAb-39
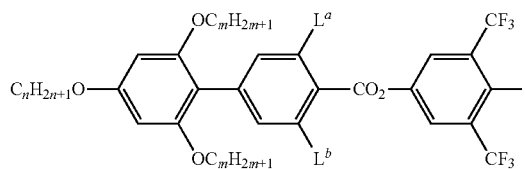
IAb-40
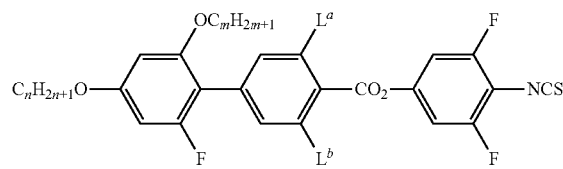
IAb-41
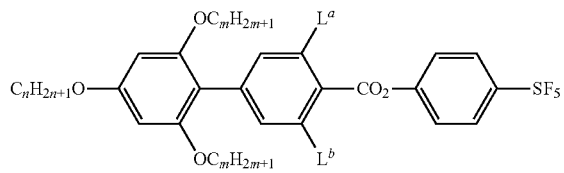
IAb-42
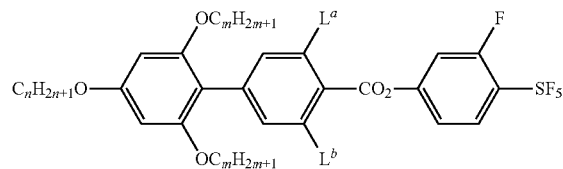
IAb-43
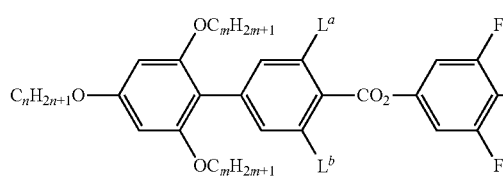
IAb-44
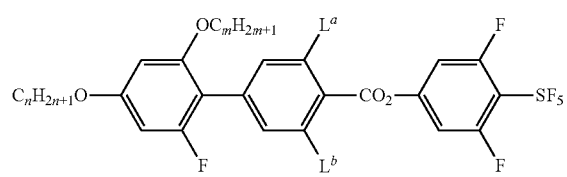

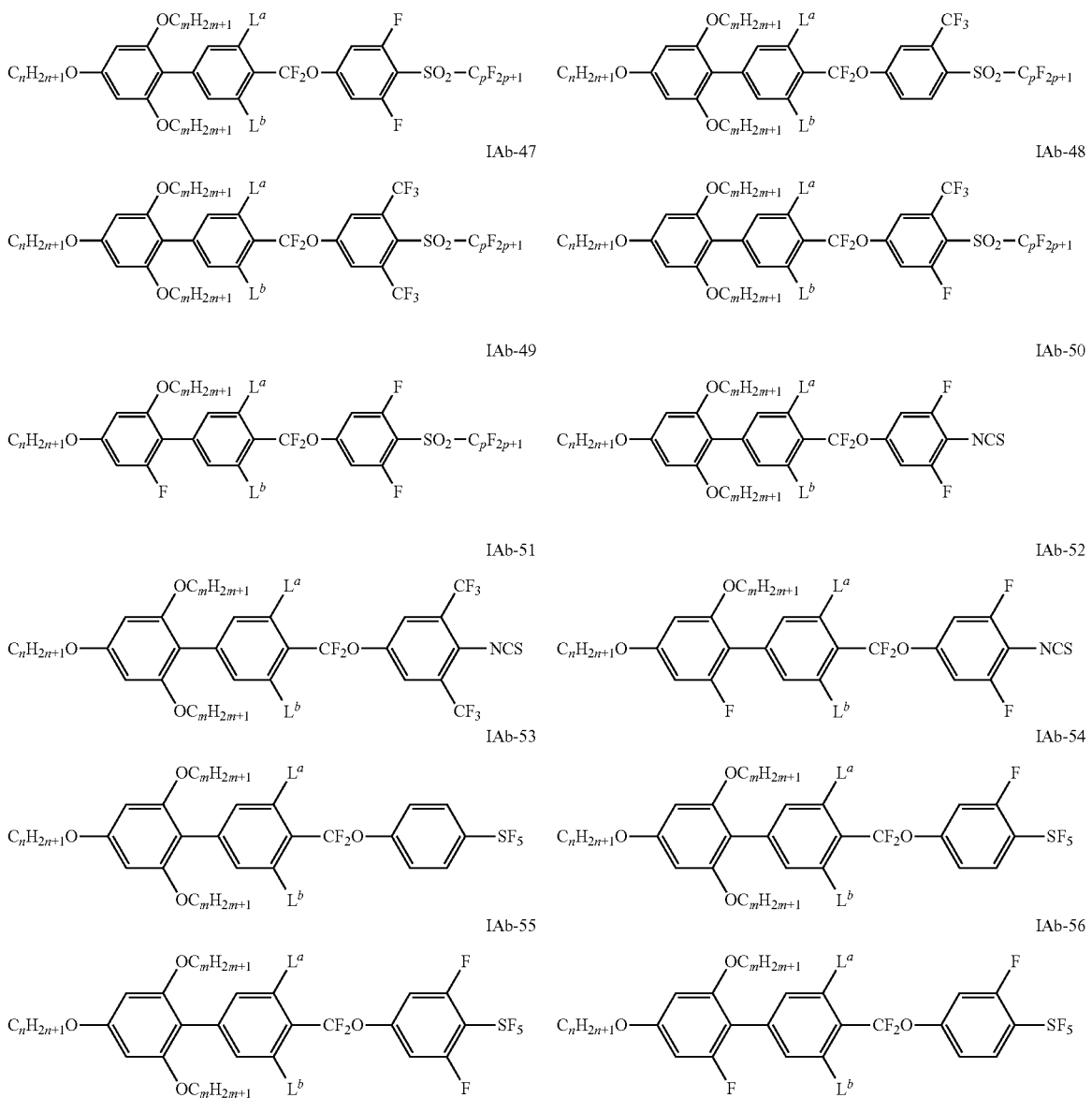

wherein $L^a$ and $L^b$ are independently of each other H or F; n and m are independently of each other integers from 1 to 10, preferably 1, 2, 3, 4, 5, 6, 7 or 8; p is an integer from 1 to 5, preferably 1, 2 or 4; q and r are independently of each other integers from 2 to 8, preferably 3, 4, 5, 6; s and t are independently of each other 1, 2, 3, 4, preferably 2 or 3; and u and v are independently of each other 1, 2, 3, 4, preferably 1 or 4. Preferably, at least one of $L^a$ and $L^b$ is F, and especially preferably, both $L^a$ and $L^b$ are F. If present twice in the same compound, both $C_mH_{2m+1}O$ substituents may have the same value for m or different ones; preferably m in two $C_mH_{2m+1}O$ substituents have the same meaning. Preferably, $C_nH_{2n+1}O$ and $C_mH_{2m+1}O$ represent independently of each other methoxy, ethoxy, propoxy, n-butoxy, n-pentoxy and n-hexoxy. Preferably, $-SO_2-C_pH_{2p+1}$ represents $-SO_2-CF_3$, $-SO_2-C_2F_5$, $-SO_2-C_4F_9$. Preferably, $C_qH_{2q-1}O$ and $C_rH_{2r-1}O$ represent $-O-CH_2CH=CH_2$, $-O-(CH_2)_2CH=CH_2$, $-O-(CH_2)_3CH=CH_2$, $-O-(CH_2)_2CH=CH-CH_3$. Preferably, $-OC_sH_{2s}OC_tH_{2t+1}$ represents $CH_3OCH_2CH_2O-$ and $CH_3CH_2OCH_2CH_2O-$. Preferably, $(C_vH_{2v+1})_3SiOSi(C_uH_{2u+1})_2C_sH_{2s}O$ represents $(CH_3)_3SiOSi(CH_3)_2CH_2CH_2O-$ and $(CH_3)_3SiOSi(CH_3)_2CH_2CH_2CH_2O-$.

Still another preferred subgroup of compounds according to formula IA are compounds of formulas IAc and IAd.

IAc

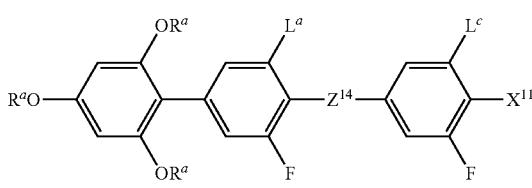

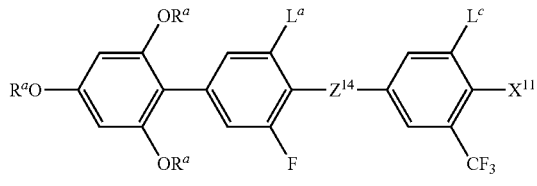

IAd

Preferred meanings of the moieties $L^a$, $L^c$, $X^{11}$ and $Z^{14}$ are given in Table 1 below while $R^aO$ represents methoxy, ethoxy, propoxy, n-butoxy, n-pentoxy or n-hexoxy.

TABLE 1

| Compound IAc/IAd-No. | $L^a$ | $L^c$ | $Z^{14}$ | $X^{11}$ |
|---|---|---|---|---|
| -1 | H | H | $CF_2CF_2$ | F |
| -2 | H | H | $CF_2CF_2$ | Cl |
| -3 | H | H | $CF_2CF_2$ | $CF_3$ |
| -4 | H | H | $CF_2CF_2$ | $CHF_2$ |
| -5 | H | H | $CF_2CF_2$ | $OCF_3$ |
| -6 | H | H | $CF_2CF_2$ | $OCHF_2$ |
| -7 | H | H | $CF_2CF_2$ | CN |
| -8 | H | H | $CF_2CF_2$ | $SF_5$ |
| -9 | H | H | $CF_2CF_2$ | NCS |
| -10 | H | H | $CF_2CF_2$ | $SO_2CF_3$ |
| -11 | H | H | $CF_2CF_2$ | $SCF_3$ |
| -12 | H | F | $CF_2CF_2$ | F |
| -13 | H | F | $CF_2CF_2$ | Cl |
| -14 | H | F | $CF_2CF_2$ | $CF_3$ |
| -15 | H | F | $CF_2CF_2$ | $CHF_2$ |
| -16 | H | F | $CF_2CF_2$ | $OCF_3$ |
| -17 | H | F | $CF_2CF_2$ | $OCHF_2$ |
| -18 | H | F | $CF_2CF_2$ | CN |
| -19 | H | F | $CF_2CF_2$ | $SF_5$ |
| -20 | H | F | $CF_2CF_2$ | NCS |
| -21 | H | F | $CF_2CF_2$ | $SO_2CF_3$ |
| -22 | H | F | $CF_2CF_2$ | $SCF_3$ |
| -23 | H | $CF_3$ | $CF_2CF_2$ | F |
| -24 | H | $CF_3$ | $CF_2CF_2$ | Cl |
| -25 | H | $CF_3$ | $CF_2CF_2$ | $CF_3$ |
| -26 | H | $CF_3$ | $CF_2CF_2$ | $CHF_2$ |
| -27 | H | $CF_3$ | $CF_2CF_2$ | $OCF_3$ |
| -28 | H | $CF_3$ | $CF_2CF_2$ | $OCHF_2$ |
| -29 | H | $CF_3$ | $CF_2CF_2$ | CN |
| -30 | H | $CF_3$ | $CF_2CF_2$ | $SF_5$ |
| -31 | H | $CF_3$ | $CF_2CF_2$ | NCS |
| -32 | H | $CF_3$ | $CF_2CF_2$ | $SO_2CF_3$ |
| -33 | H | $CF_3$ | $CF_2CF_2$ | $SCF_3$ |
| -34 | F | F | $CF_2CF_2$ | F |
| -35 | F | F | $CF_2CF_2$ | Cl |
| -36 | F | F | $CF_2CF_2$ | $CF_3$ |
| -37 | F | F | $CF_2CF_2$ | $CHF_2$ |
| -38 | F | F | $CF_2CF_2$ | $OCF_3$ |
| -39 | F | F | $CF_2CF_2$ | $OCHF_2$ |
| -40 | F | F | $CF_2CF_2$ | CN |
| -41 | F | F | $CF_2CF_2$ | $SF_5$ |
| -42 | F | F | $CF_2CF_2$ | NCS |
| -43 | F | F | $CF_2CF_2$ | $SO_2CF_3$ |
| -44 | F | $CF_3$ | $CF_2CF_2$ | $SCF_3$ |
| -45 | F | $CF_3$ | $CF_2CF_2$ | F |
| -46 | F | $CF_3$ | $CF_2CF_2$ | Cl |
| -47 | F | $CF_3$ | $CF_2CF_2$ | $CF_3$ |
| -48 | F | $CF_3$ | $CF_2CF_2$ | $CHF_2$ |
| -49 | F | $CF_3$ | $CF_2CF_2$ | $OCF_3$ |
| -50 | F | $CF_3$ | $CF_2CF_2$ | $OCHF_2$ |
| -51 | F | $CF_3$ | $CF_2CF_2$ | CN |
| -52 | F | $CF_3$ | $CF_2CF_2$ | $SF_5$ |
| -53 | F | $CF_3$ | $CF_2CF_2$ | NCS |
| -54 | F | $CF_3$ | $CF_2CF_2$ | $SO_2CF_3$ |
| -55 | F | $CF_3$ | $CF_2CF_2$ | $SCF_3$ |
| -56 | H | H | $CF_2CH_2$ | F |
| -57 | H | H | $CF_2CH_2$ | Cl |
| -58 | H | H | $CF_2CH_2$ | $CF_3$ |
| -59 | H | H | $CF_2CH_2$ | $CHF_2$ |
| -60 | H | H | $CF_2CH_2$ | $OCF_3$ |
| -61 | H | H | $CF_2CH_2$ | $OCHF_2$ |
| -62 | H | H | $CF_2CH_2$ | CN |
| -63 | H | H | $CF_2CH_2$ | $SF_5$ |
| -64 | H | H | $CF_2CH_2$ | NCS |
| -65 | H | H | $CF_2CH_2$ | $SO_2CF_3$ |
| -66 | H | H | $CF_2CH_2$ | $SCF_3$ |
| -67 | H | F | $CF_2CH_2$ | F |
| -68 | H | F | $CF_2CH_2$ | Cl |
| -69 | H | F | $CF_2CH_2$ | $CF_3$ |
| -70 | H | F | $CF_2CH_2$ | $CHF_2$ |
| -71 | H | F | $CF_2CH_2$ | $OCF_3$ |
| -72 | H | F | $CF_2CH_2$ | $OCHF_2$ |
| -73 | H | F | $CF_2CH_2$ | CN |
| -74 | H | F | $CF_2CH_2$ | $SF_5$ |
| -75 | H | F | $CF_2CH_2$ | NCS |
| -76 | H | F | $CF_2CH_2$ | $SO_2CF_3$ |
| -77 | H | F | $CF_2CH_2$ | $SCF_3$ |
| -78 | H | $CF_3$ | $CF_2CH_2$ | F |
| -79 | H | $CF_3$ | $CF_2CH_2$ | Cl |
| -80 | H | $CF_3$ | $CF_2CH_2$ | $CF_3$ |
| -81 | H | $CF_3$ | $CF_2CH_2$ | $CHF_2$ |
| -82 | H | $CF_3$ | $CF_2CH_2$ | $OCF_3$ |
| -83 | H | $CF_3$ | $CF_2CH_2$ | $OCHF_2$ |
| -84 | H | $CF_3$ | $CF_2CH_2$ | CN |
| -85 | H | $CF_3$ | $CF_2CH_2$ | $SF_5$ |
| -86 | H | $CF_3$ | $CF_2CH_2$ | NCS |
| -87 | H | $CF_3$ | $CF_2CH_2$ | $SO_2CF_3$ |
| -88 | H | $CF_3$ | $CF_2CH_2$ | $SCF_3$ |
| -89 | F | F | $CF_2CH_2$ | F |
| -90 | F | F | $CF_2CH_2$ | Cl |
| -91 | F | F | $CF_2CH_2$ | $CF_3$ |
| -92 | F | F | $CF_2CH_2$ | $CHF_2$ |
| -93 | F | F | $CF_2CH_2$ | $OCF_3$ |
| -94 | F | F | $CF_2CH_2$ | $OCHF_2$ |
| -95 | F | F | $CF_2CH_2$ | CN |
| -96 | F | F | $CF_2CH_2$ | $SF_5$ |
| -97 | F | F | $CF_2CH_2$ | NCS |
| -98 | F | F | $CF_2CH_2$ | $SO_2CF_3$ |
| -99 | F | $CF_3$ | $CF_2CH_2$ | $SCF_3$ |
| -100 | F | $CF_3$ | $CF_2CH_2$ | F |
| -101 | F | $CF_3$ | $CF_2CH_2$ | Cl |
| -102 | F | $CF_3$ | $CF_2CH_2$ | $CF_3$ |
| -103 | F | $CF_3$ | $CF_2CH_2$ | $CHF_2$ |
| -104 | F | $CF_3$ | $CF_2CH_2$ | $OCF_3$ |
| -105 | F | $CF_3$ | $CF_2CH_2$ | $OCHF_2$ |
| -106 | F | $CF_3$ | $CF_2CH_2$ | CN |
| -107 | F | $CF_3$ | $CF_2CH_2$ | $SF_5$ |
| -108 | F | $CF_3$ | $CF_2CH_2$ | NCS |
| -109 | F | $CF_3$ | $CF_2CH_2$ | $SO_2CF_3$ |
| -110 | F | $CF_3$ | $CF_2CH_2$ | $SCF_3$ |
| -111 | H | H | $CH_2CF_2$ | F |
| -112 | H | H | $CH_2CF_2$ | Cl |
| -113 | H | H | $CH_2CF_2$ | $CF_3$ |
| -114 | H | H | $CH_2CF_2$ | $CHF_2$ |
| -115 | H | H | $CH_2CF_2$ | $OCF_3$ |
| -116 | H | H | $CH_2CF_2$ | $OCHF_2$ |
| -117 | H | H | $CH_2CF_2$ | CN |
| -118 | H | H | $CH_2CF_2$ | $SF_5$ |
| -119 | H | H | $CH_2CF_2$ | NCS |
| -120 | H | H | $CH_2CF_2$ | $SO_2CF_3$ |
| -121 | H | H | $CH_2CF_2$ | $SCF_3$ |
| -122 | H | F | $CH_2CF_2$ | F |
| -123 | H | F | $CH_2CF_2$ | Cl |
| -124 | H | F | $CH_2CF_2$ | $CF_3$ |
| -125 | H | F | $CH_2CF_2$ | $CHF_2$ |
| -126 | H | F | $CH_2CF_2$ | $OCF_3$ |
| -127 | H | F | $CH_2CF_2$ | $OCHF_2$ |
| -128 | H | F | $CH_2CF_2$ | CN |
| -129 | H | F | $CH_2CF_2$ | $SF_5$ |
| -130 | H | F | $CH_2CF_2$ | NCS |
| -131 | H | F | $CH_2CF_2$ | $SO_2CF_3$ |
| -132 | H | $CF_3$ | $CH_2CF_2$ | $SCF_3$ |
| -133 | H | $CF_3$ | $CH_2CF_2$ | F |
| -134 | H | $CF_3$ | $CH_2CF_2$ | Cl |
| -135 | H | $CF_3$ | $CH_2CF_2$ | $CF_3$ |
| -136 | H | $CF_3$ | $CH_2CF_2$ | $CHF_2$ |

TABLE 1-continued

| Compound IAc/IAd-No. | $L^a$ | $L^c$ | $Z^{14}$ | $X^{11}$ |
|---|---|---|---|---|
| -137 | H | $CF_3$ | $CH_2CF_2$ | $OCF_3$ |
| -138 | H | $CF_3$ | $CH_2CF_2$ | $OCHF_2$ |
| -139 | H | $CF_3$ | $CH_2CF_2$ | CN |
| -140 | H | $CF_3$ | $CH_2CF_2$ | $SF_5$ |
| -141 | H | $CF_3$ | $CH_2CF_2$ | NCS |
| -142 | H | $CF_3$ | $CH_2CF_2$ | $SO_2CF_3$ |
| -143 | H | $CF_3$ | $CH_2CF_2$ | $SCF_3$ |
| -144 | F | F | $CH_2CF_2$ | F |
| -145 | F | F | $CH_2CF_2$ | Cl |
| -146 | F | F | $CH_2CF_2$ | $CF_3$ |
| -147 | F | F | $CH_2CF_2$ | $CHF_2$ |
| -148 | F | F | $CH_2CF_2$ | $OCF_3$ |
| -149 | F | F | $CH_2CF_2$ | $OCHF_2$ |
| -150 | F | F | $CH_2CF_2$ | CN |
| -151 | F | F | $CH_2CF_2$ | $SF_5$ |
| -152 | F | F | $CH_2CF_2$ | NCS |
| -153 | F | F | $CH_2CF_2$ | $SO_2CF_3$ |
| -154 | F | F | $CH_2CF_2$ | $SCF_3$ |
| -155 | F | $CF_3$ | $CH_2CF_2$ | F |
| -156 | F | $CF_3$ | $CH_2CF_2$ | Cl |
| -157 | F | $CF_3$ | $CH_2CF_2$ | $CF_3$ |
| -158 | F | $CF_3$ | $CH_2CF_2$ | $CHF_2$ |
| -159 | F | $CF_3$ | $CH_2CF_2$ | $OCF_3$ |
| -160 | F | $CF_3$ | $CH_2CF_2$ | $OCHF_2$ |
| -161 | F | $CF_3$ | $CH_2CF_2$ | CN |
| -162 | F | $CF_3$ | $CH_2CF_2$ | $SF_5$ |
| -163 | F | $CF_3$ | $CH_2CF_2$ | NCS |
| -164 | F | $CF_3$ | $CH_2CF_2$ | $SO_2CF_3$ |
| -165 | F | $CF_3$ | $CH_2CF_2$ | $SCF_3$ |
| -166 | H | H | —CF=CF— | F |
| -167 | H | H | —CF=CF— | Cl |
| -168 | H | H | —CF=CF— | $CF_3$ |
| -169 | H | H | —CF=CF— | $CHF_2$ |
| -170 | H | H | —CF=CF— | $OCF_3$ |
| -171 | H | H | —CF=CF— | $OCHF_2$ |
| -172 | H | H | —CF=CF— | CN |
| -173 | H | H | —CF=CF— | $SF_5$ |
| -174 | H | H | —CF=CF— | NCS |
| -175 | H | H | —CF=CF— | $SO_2CF_3$ |
| -176 | H | H | —CF=CF— | $SCF_3$ |
| -177 | H | F | —CF=CF— | F |
| -178 | H | F | —CF=CF— | Cl |
| -179 | H | F | —CF=CF— | $CF_3$ |
| -180 | H | F | —CF=CF— | $CHF_2$ |
| -181 | H | F | —CF=CF— | $OCF_3$ |
| -182 | H | F | —CF=CF— | $OCHF_2$ |
| -183 | H | F | —CF=CF— | CN |
| -184 | H | F | —CF=CF— | $SF_5$ |
| -185 | H | F | —CF=CF— | NCS |
| -186 | H | F | —CF=CF— | $SO_2CF_3$ |
| -187 | H | F | —CF=CF— | $SCF_3$ |
| -188 | H | $CF_3$ | —CF=CF— | F |
| -189 | H | $CF_3$ | —CF=CF— | Cl |
| -190 | H | $CF_3$ | —CF=CF— | $CF_3$ |
| -191 | H | $CF_3$ | —CF=CF— | $CHF_2$ |
| -192 | H | $CF_3$ | —CF=CF— | $OCF_3$ |
| -193 | H | $CF_3$ | —CF=CF— | $OCHF_2$ |
| -194 | H | $CF_3$ | —CF=CF— | CN |
| -195 | H | $CF_3$ | —CF=CF— | $SF_5$ |
| -196 | H | $CF_3$ | —CF=CF— | NCS |
| -197 | H | $CF_3$ | —CF=CF— | $SO_2CF_3$ |
| -198 | H | $CF_3$ | —CF=CF— | $SCF_3$ |
| -199 | F | F | —CF=CF— | F |
| -200 | F | F | —CF=CF— | Cl |
| -201 | F | F | —CF=CF— | $CF_3$ |
| -202 | F | F | —CF=CF— | $CHF_2$ |
| -203 | F | F | —CF=CF— | $OCF_3$ |
| -204 | F | F | —CF=CF— | $OCHF_2$ |
| -205 | F | F | —CF=CF— | CN |
| -206 | F | F | —CF=CF— | $SF_5$ |
| -207 | F | F | —CF=CF— | NCS |
| -208 | F | F | —CF=CF— | $SO_2CF_3$ |
| -209 | F | F | —CF=CF— | $SCF_3$ |
| -210 | F | $CF_3$ | —CF=CF— | F |
| -211 | F | $CF_3$ | —CF=CF— | Cl |
| -212 | F | $CF_3$ | —CF=CF— | $CF_3$ |
| -213 | F | $CF_3$ | —CF=CF— | $CHF_2$ |
| -214 | F | $CF_3$ | —CF=CF— | $OCF_3$ |
| -215 | F | $CF_3$ | —CF=CF— | $OCHF_2$ |
| -216 | F | $CF_3$ | —CF=CF— | CN |
| -217 | F | $CF_3$ | —CF=CF— | $SF_5$ |
| -218 | F | $CF_3$ | —CF=CF— | NCS |
| -219 | F | $CF_3$ | —CF=CF— | $SO_2CF_3$ |
| -220 | F | $CF_3$ | —CF=CF— | $SCF_3$ |

Still another preferred embodiment of the invention comprises compounds of formula IB:

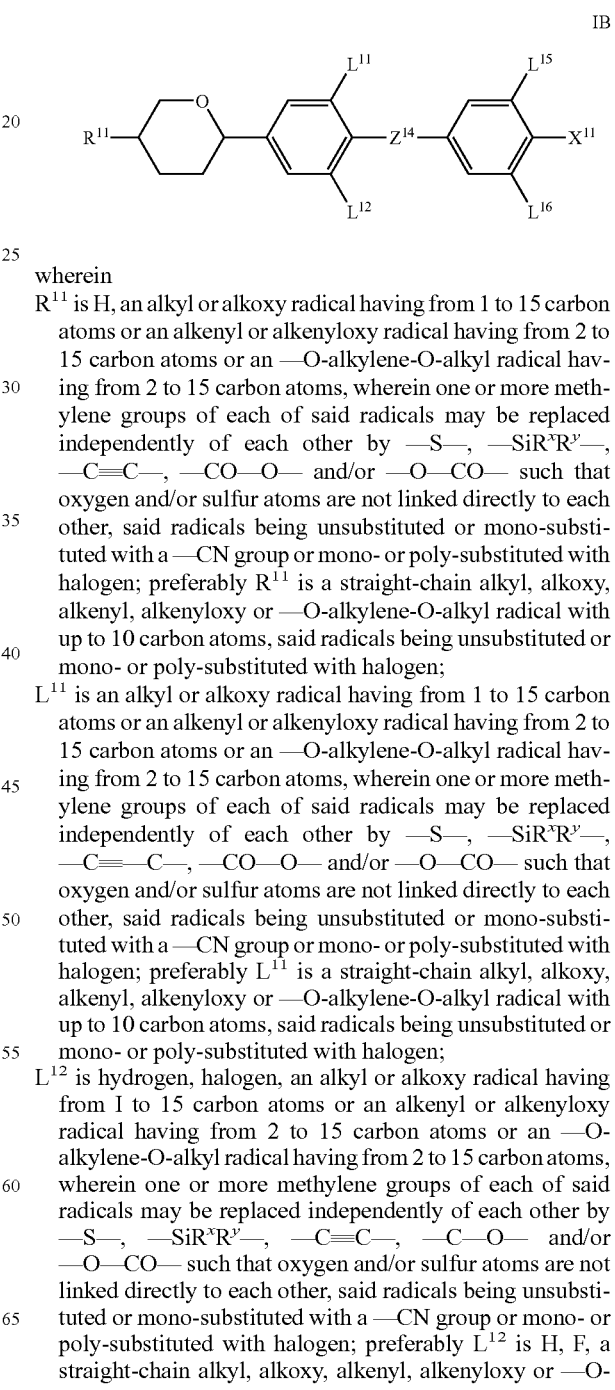

wherein $R^{11}$ is H, an alkyl or alkoxy radical having from 1 to 15 carbon atoms or an alkenyl or alkenyloxy radical having from 2 to 15 carbon atoms or an —O-alkylene-O-alkyl radical having from 2 to 15 carbon atoms, wherein one or more methylene groups of each of said radicals may be replaced independently of each other by —S—, —SiR$^x$R$^y$—, —C≡C—, —CO—O— and/or —O—CO— such that oxygen and/or sulfur atoms are not linked directly to each other, said radicals being unsubstituted or mono-substituted with a —CN group or mono- or poly-substituted with halogen; preferably $R^{11}$ is a straight-chain alkyl, alkoxy, alkenyl, alkenyloxy or —O-alkylene-O-alkyl radical with up to 10 carbon atoms, said radicals being unsubstituted or mono- or poly-substituted with halogen;

$L^{11}$ is an alkyl or alkoxy radical having from 1 to 15 carbon atoms or an alkenyl or alkenyloxy radical having from 2 to 15 carbon atoms or an —O-alkylene-O-alkyl radical having from 2 to 15 carbon atoms, wherein one or more methylene groups of each of said radicals may be replaced independently of each other by —S—, —SiR$^x$R$^y$—, —C≡C—, —CO—O— and/or —O—CO— such that oxygen and/or sulfur atoms are not linked directly to each other, said radicals being unsubstituted or mono-substituted with a —CN group or mono- or poly-substituted with halogen; preferably $L^{11}$ is a straight-chain alkyl, alkoxy, alkenyl, alkenyloxy or —O-alkylene-O-alkyl radical with up to 10 carbon atoms, said radicals being unsubstituted or mono- or poly-substituted with halogen;

$L^{12}$ is hydrogen, halogen, an alkyl or alkoxy radical having from 1 to 15 carbon atoms or an alkenyl or alkenyloxy radical having from 2 to 15 carbon atoms or an —O-alkylene-O-alkyl radical having from 2 to 15 carbon atoms, wherein one or more methylene groups of each of said radicals may be replaced independently of each other by —S—, —SiR$^x$R$^y$—, —C≡C—, —C—O— and/or —O—CO— such that oxygen and/or sulfur atoms are not linked directly to each other, said radicals being unsubstituted or mono-substituted with a —CN group or mono- or poly-substituted with halogen; preferably $L^{12}$ is H, F, a straight-chain alkyl, alkoxy, alkenyl, alkenyloxy or —O- alkylene-O-alkyl radical with up to 10 carbon atoms, said radicals being unsubstituted or mono- or poly-substituted with halogen;

whereby it is further preferred that at least one of $R^{11}$, $L^{11}$ and $L^{12}$ is one of said straight-chain alkyl, alkoxy, alkenyl, alkenyloxy or —O-alkylene-O-alkyl radicals;

$L^{15}$ and $L^{16}$ are independently of each other H, $CF_3$ or F; preferably at least $L^{15}$ is F or $CF_3$;

$Z^{14}$ is a single bond, —$CH_2CH_2$—, (—$CH_2CH_2$—)$_2$, —$CF_2$—$CF_2$—, —$CF_2$—$CH_2$—, —$CH_2$—$CF_2$—, —CH=CH—, —CF=CF—, —CF=CH—, —CH=CF—, —C≡C—, —$CH_2O$—, —$OCH_2$—, —$CF_2O$—, —$OCF_2$—, —CO—O— or —O—CO—; preferably $Z^{14}$ is a single bond, —$CF_2O$— or —$CO_2$—;

$X^{11}$ is F, Cl, —CN, —NCS, —$SF_5$, —S—$R^z$, —$SO_2$—$R^z$, an alkyl or alkoxy radical having from 1 to 15 carbon atoms, wherein one or more methylene groups of said alkyl or alkoxy radical may be replaced independently of each other by —O—, —S—, —$SiR^xR^y$—, —CH=CH—, —C≡C—, —CO—O— and/or —O—CO— such that oxygen and/or sulfur atoms are not linked directly to each other, said alkyl or alkoxy radical being unsubstituted or mono-substituted with a —CN group or mono- or poly-substituted with halogen; preferably $X^{11}$ is F, Cl, $CF_3$, $OCF_3$, $OCHF_2$, NCS, $SF_5$, —S—$R^z$ or —$SO_2$—$R^z$;

$R^x$ and $R^y$ are independently of each other hydrogen or an alkyl radical having from 1 to 7 carbon atoms; preferably both $R^x$ and $R^y$ are methyl, ethyl, propyl or butyl;

$R^z$ is an alkyl radical having from 1 to 7 carbon atoms, said alkyl radical being unsubstituted or mono- or poly-substituted with halogen; preferably $R^z$ is $CF_3$, $C_2F_5$ or n-$C_4F_9$.

Examples of compounds of said preferred embodiment are the following compounds:

IB-1
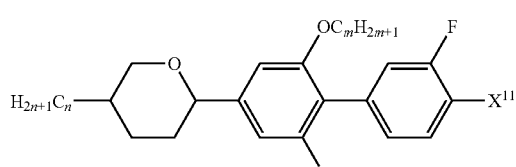

IB-2
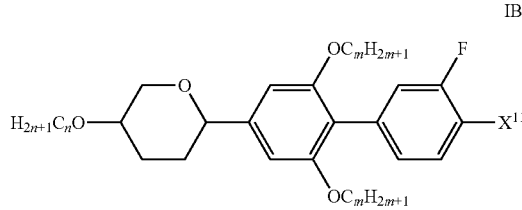

IB-3
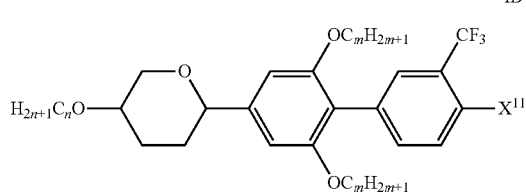

IB-4
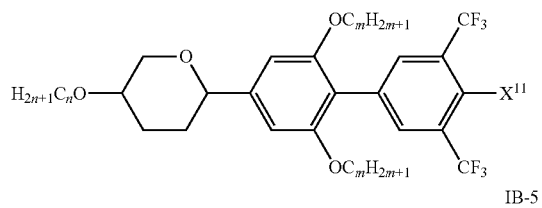

IB-5
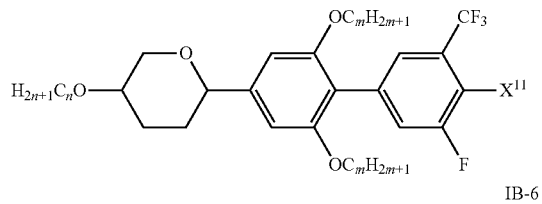

IB-6
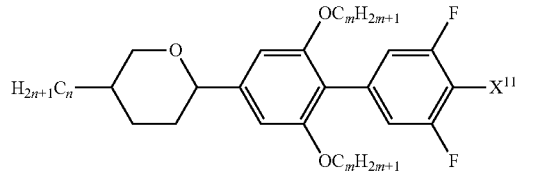

IB-7
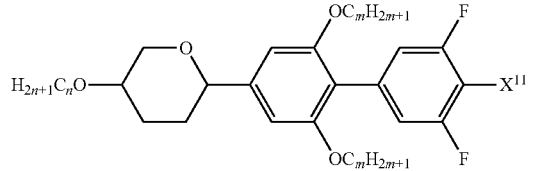

IB-8
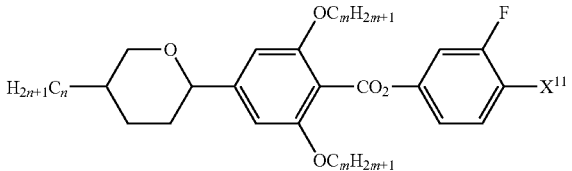

IB-9
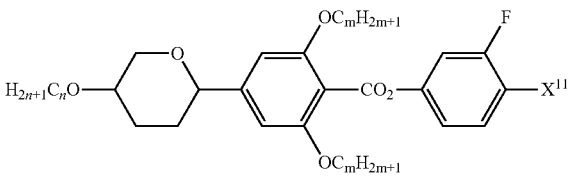

IB-10
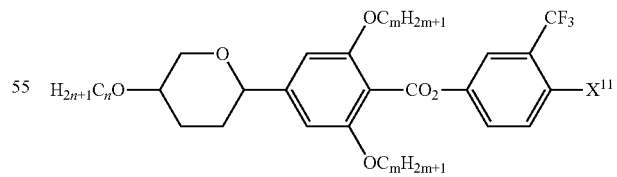

IB-11
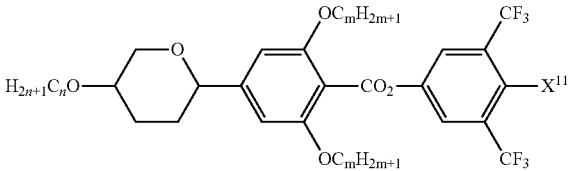

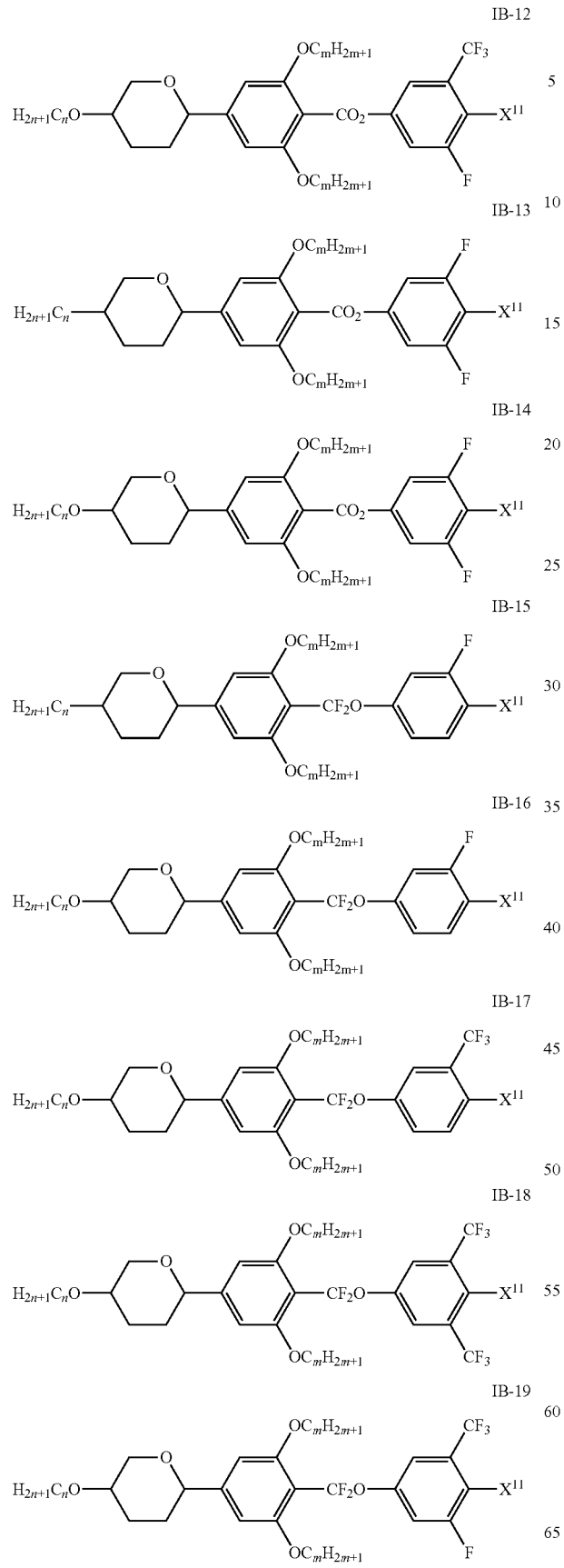

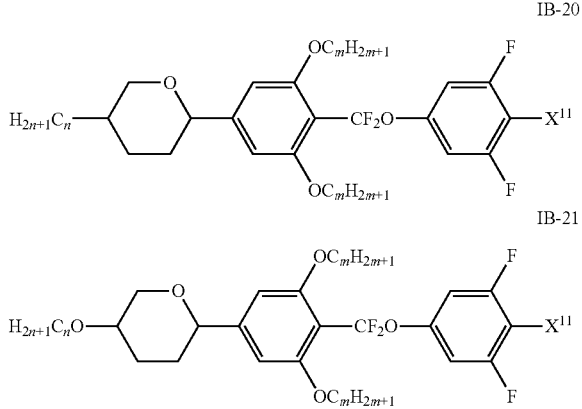

wherein n and m are independently of each other 1, 2, 3, 4, 5, 6, 7 or 8 and $X^{11}$ is CN, NCS, $SF_5$, $SCF_3$, $SO_2CF_3$, $SO_2C_2F_5$, $SO_2C_4F_9$, F, $CF_3$, $CHF_2$, $C_2F_5$, —CH=$CF_2$, —CF=$CF_2$, —O—$CH_3$, —O—$C_2H_5$, —O—$C_3H_7$, —O-n-$C_4H_9$, —O-n-$C_5H_{11}$, —O-n-$C_6H_{13}$, —O—$CF_3$, —O—$CHF_2$, —O—$C_2F_5$, —O—$C_3F_7$, —O-n-$C_4F_9$ with CN, $SO_2CF_3$, F, $CF_3$, —O—$CF_3$ being preferred. Preferably, n and m are the same number and equal to 1, 2, 3, 4, 5 or 6. If present twice in the same compound, both $C_mH_{2m+1}O$ substituents may have the same value for m or different ones; preferably m in two $C_mH_{2m+1}O$ substituents have the same meaning. Furthermore, one or more of the hydrogen atoms of the $C_nH_{2n+1}$, the $OC_nH_{2n+1}$ and the $OC_mH_{2m+1}$ moiety, respectively, may be replaced by a halogen atom, preferably a fluorine atom. Particularly preferred are compounds of formulas IB-1 to IB-21 with $X^{11}$ being F, $CF_3$ or $OCF_3$, especially F.

Further preferred embodiments of the invention comprise compounds of formulas IC or ID:

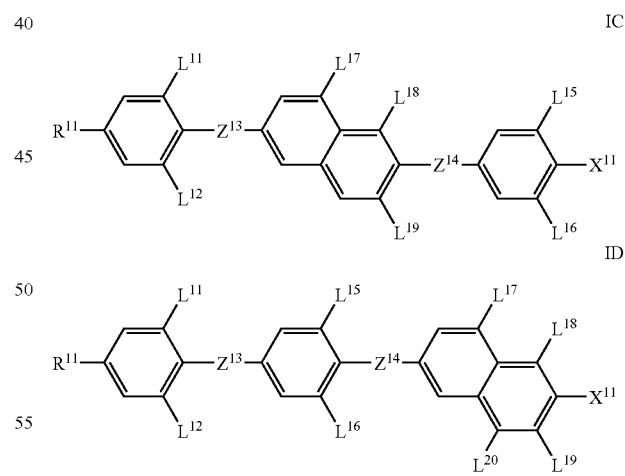

wherein $R^{11}$ is H, an alkyl or alkoxy radical having from 1 to 15 carbon atoms or an alkenyl or alkenyloxy or —O-alkylene-O-alkyl radical having from 2 to 15 carbon atoms, wherein one or more methylene groups of each of said radicals may be replaced independently of each other by —S—, —$SiR^xR^y$—, —C≡C—, —CO—O— and/or —O—CO— such that oxygen and/or sulfur atoms are not linked directly to each other, said radicals being unsubstituted or mono-substituted with a —CN group or mono- or poly-substituted with halogen; preferably $R^{11}$ is a straight-chain alkyl, alkoxy, alkenyl, alkenyloxy or —O-alkylene-O-alkyl radical with up to 10 carbon atoms, said radicals being unsubstituted or mono- or poly-substituted with halogen;

$L^{11}$ is an alkyl or alkoxy radical having from 1 to 15 carbon atoms or an alkenyl or alkenyloxy or —O-alkylene-O-alkyl radical having from 2 to 15 carbon atoms, wherein one or more methylene groups of each of said radicals may be replaced independently of each other by —S—, —SiR$^x$R$^y$—, —C≡C—, —CO—O— and/or —O—CO— such that oxygen and/or sulfur atoms are not linked directly to each other, said radicals being unsubstituted or mono-substituted with a —CN group or mono- or poly-substituted with halogen; preferably, $L^{11}$ is a straight-chain alkyl, alkoxy, alkenyl, alkenyloxy or —O-alkylene-O-alkyl radical with up to 10 carbon atoms, said radicals being unsubstituted or mono- or poly-substituted with halogen;

$L^{12}$ is hydrogen, halogen, an alkyl or alkoxy radical having from 1 to 15 carbon atoms or an alkenyl or alkenyloxy or —O-alkylene-O-alkyl radical having from 2 to 15 carbon atoms, wherein one or more methylene groups of each of said radicals may be replaced independently of each other by —S—, —SiR$^x$R$^y$—, —C≡C—, —CO—O— and/or —O—CO— such that oxygen and/or sulfur atoms are not linked directly to each other, said radicals being unsubstituted or mono-substituted with a —CN group or mono- or poly-substituted with halogen; preferably, $L^{12}$ is H, F, a straight-chain alkyl, alkoxy, alkenyl, alkenyloxy or —O-alkylene-O-alkyl radical with up to 10 carbon atoms, said radicals being unsubstituted or mono- or poly-substituted with halogen;

whereby it is preferred that at least one of $R^{11}$, $L^{11}$ and $L^{12}$ is one of said preferred straight-chain alkyl, alkoxy, alkenyl, alkenyloxy or —O-alkylene-O-alkyl radicals;

$L^{15}$, $L^{16}$, $L^{17}$, $L^{18}$, $L^{19}$ and $L^{20}$ are independently of each other H, $CF_3$ or F; preferably at least $L^{15}$ and $L^{18}$ are both F;

$Z^{13}$ and $Z^{14}$ are independently of each other a single bond, —CH$_2$CH$_2$—, (—CH$_2$CH$_2$—)$_2$, —CF$_2$—CF$_2$—, —CF$_2$—CH$_2$—, —CH$_2$—CF$_2$—, —CH=CH—, —CF=CF—, —CF=CH—, —CH=CF—, —C≡C—, —CH$_2$O—, —OCH$_2$—, —CF$_2$O—, —OCF$_2$—, —CO—O— or —O—CO— whereby at least one of $Z^{13}$ and $Z^{14}$ is a single bond; preferably $Z^{13}$ and $Z^{14}$ are both a single bond or one of $Z^{13}$ and $Z^{14}$ is —CF$_2$O— or —CO$_2$—;

$X^{11}$ is F, Cl, —CN, —NCS, —SF$_5$, —S—R$^z$, —SO$_2$—R$^z$, an alkyl or alkoxy radical having from 1 to 15 carbon atoms, wherein one or more methylene groups of said alkyl or alkoxy radical may be replaced independently of each other by —O—, —S—, —SiR$^x$R$^y$—, —CH=CH—, —C≡C—, —CO—O— and/or —O—CO— such that oxygen and/or sulfur atoms are not linked directly to each other, said alkyl or alkoxy radical being unsubstituted or mono-substituted with a —CN group or mono- or poly-substituted with halogen; preferably $X^{11}$ is F, Cl, $CF_3$, $OCF_3$, $OCHF_2$, NCS, $SF_5$, —S—R$^z$ or —SO$_2$—R$^z$;

$R^x$ and $R^y$ are independently of each other hydrogen or an alkyl radical having from 1 to 7 carbon atoms; preferably both $R^x$ and $R^y$ are methyl, ethyl, propyl or butyl; and $R^z$ is an alkyl radical having from 1 to 7 carbon atoms, said alkyl radical being unsubstituted or mono- or poly-substituted with halogen; preferably $R^z$ is $CF_3$, $C_2F_5$ or n-$C_4F_9$.

Examples of said preferred compounds of formula IC are the following ones:

IC-1
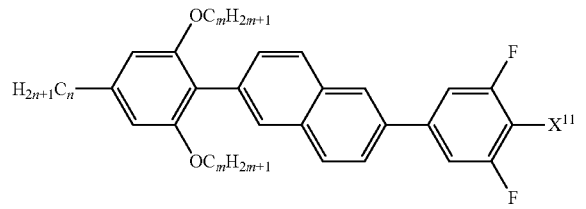

IC-2
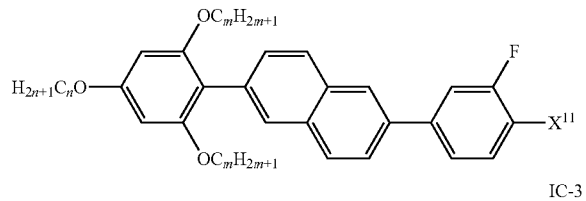

IC-3
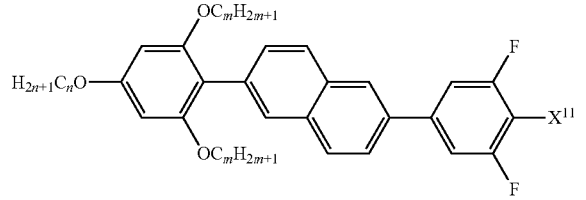

IC-4
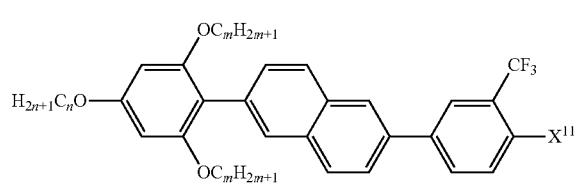

IC-5
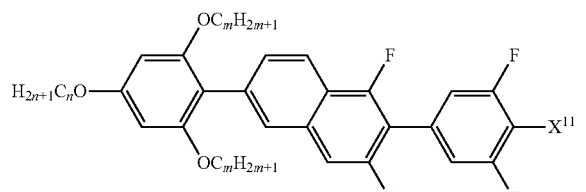

IC-6
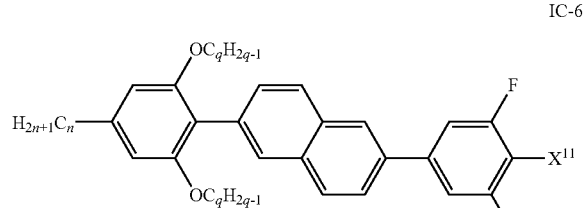

IC-7
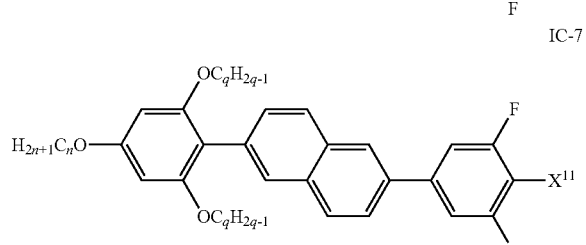

IC-8
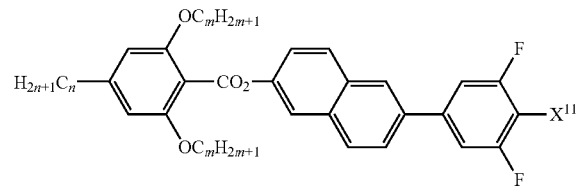
IC-9
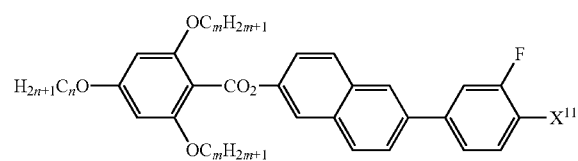
IC-10
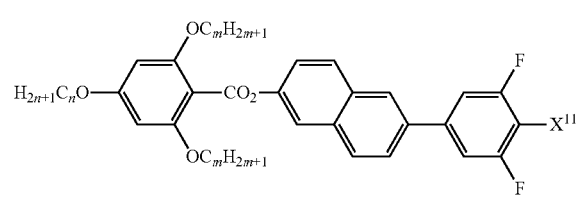
IC-11
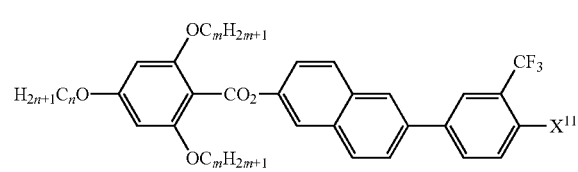
IC-12
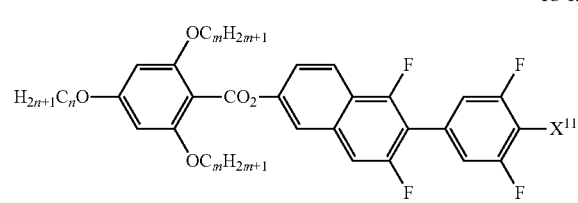
IC-13
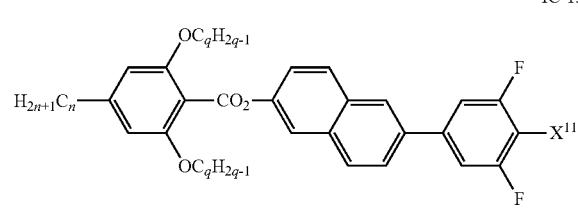
IC-14
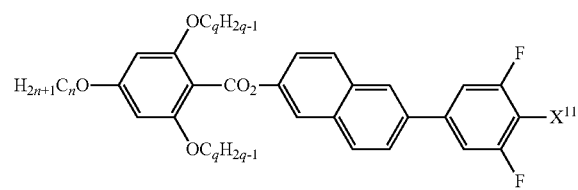
IC-15
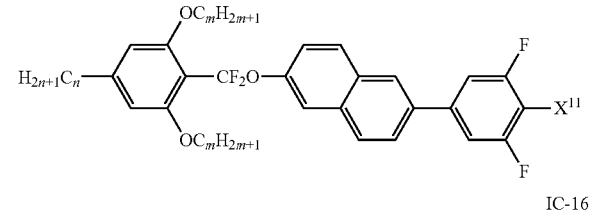
IC-16
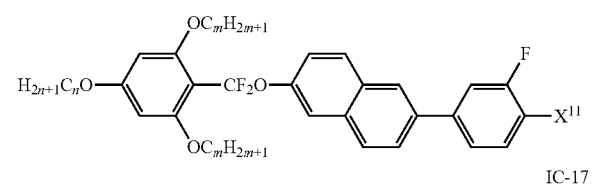
IC-17
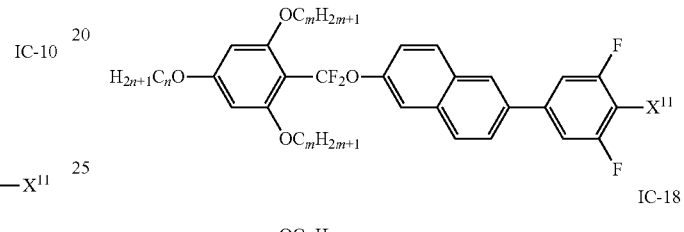
IC-18
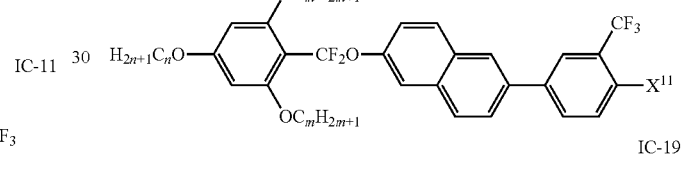
IC-19
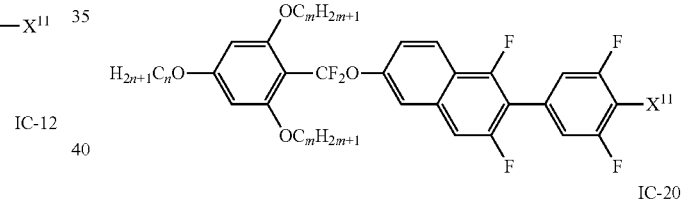
IC-20
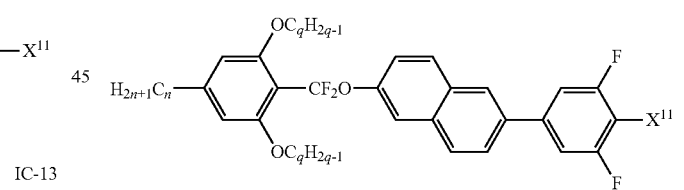
IC-21
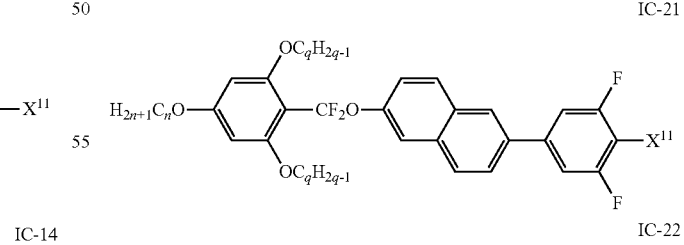
IC-22
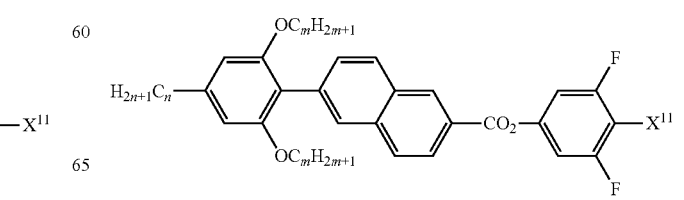

IC-23
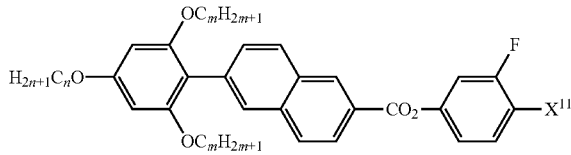

IC-24
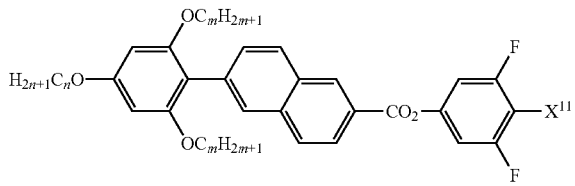

IC-25
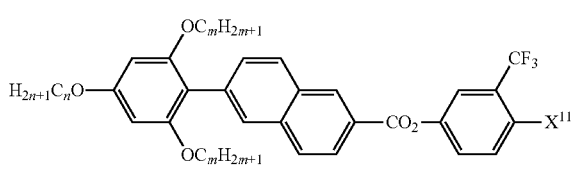

IC-26
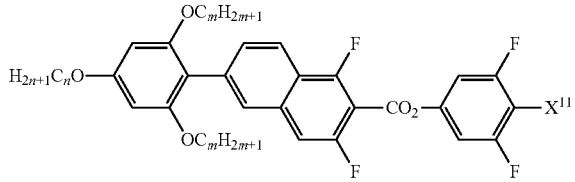

IC-27
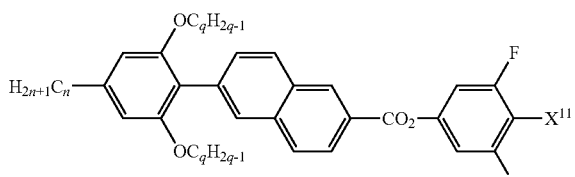

IC-28
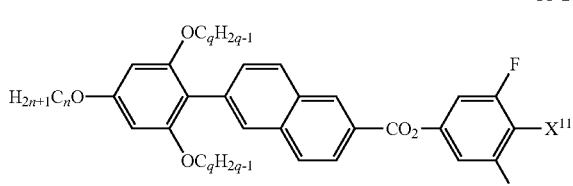

I-29
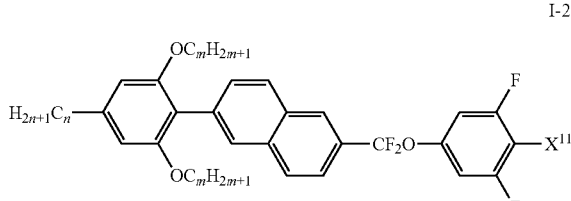

I-30
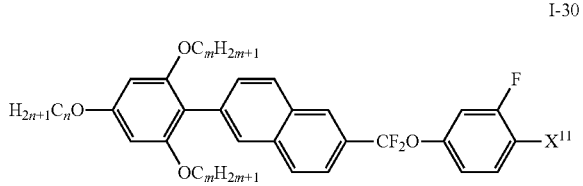

I-31
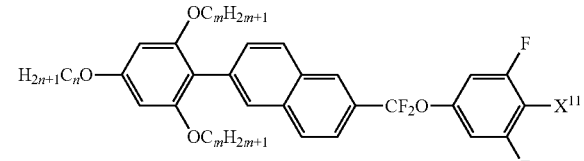

IC-32
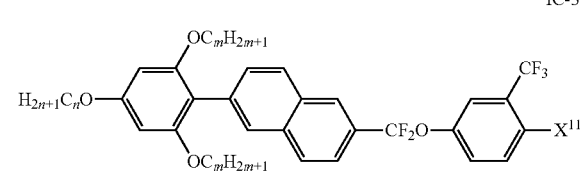

IC-33
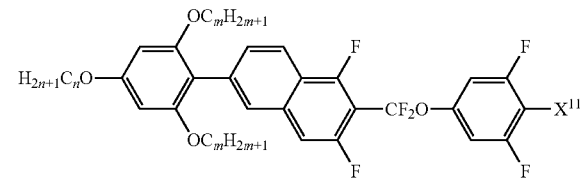

IC-34
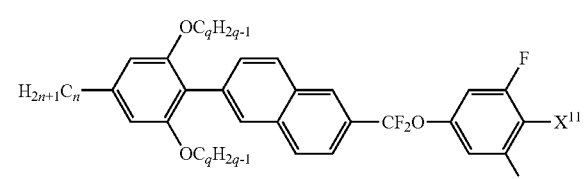

IC-35
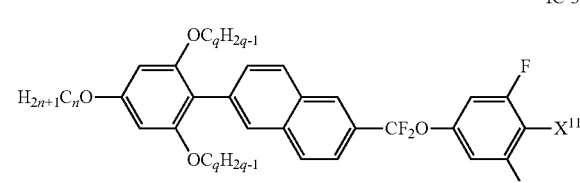

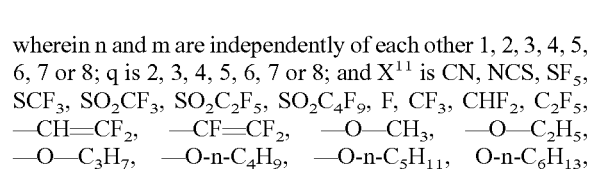

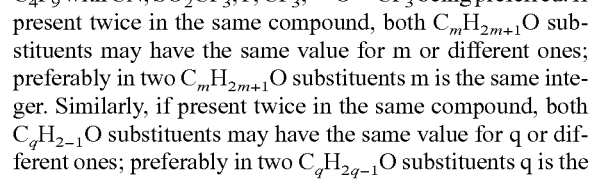

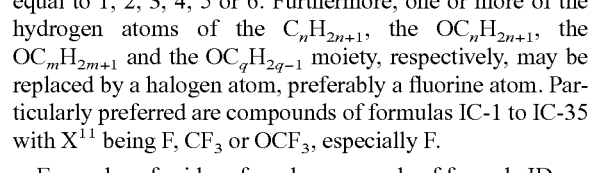

wherein n and m are independently of each other 1, 2, 3, 4, 5, 6, 7 or 8; q is 2, 3, 4, 5, 6, 7 or 8; and $X^{11}$ is CN, NCS, $SF_5$, $SCF_3$, $SO_2CF_3$, $SO_2C_2F_5$, $SO_2C_4F_9$, F, $CF_3$, $CHF_2$, $C_2F_5$, —CH=$CF_2$, —CF=$CF_2$, —O—$CH_3$, —O—$C_2H_5$, —O—$C_3H_7$, —O-n-$C_4H_9$, —O-n-$C_5H_{11}$, —O-n-$C_6H_{13}$, —O—$CF_3$, —O—$CHF_2$, —O—$C_2F_5$, —O—$C_3F_7$, —O-n-$C_4F_9$ with CN, $SO_2CF_3$, F, $CF_3$, —O—$CF_3$ being preferred. If present twice in the same compound, both $C_mH_{2m+1}$O substituents may have the same value for m or different ones; preferably in two $C_mH_{2m+1}$O substituents m is the same integer. Similarly, if present twice in the same compound, both $C_qH_{2-1}$O substituents may have the same value for q or different ones; preferably in two $C_qH_{2q-1}$O substituents q is the same integer. Preferably, n and m are the same number and equal to 1, 2, 3, 4, 5 or 6. Furthermore, one or more of the hydrogen atoms of the $C_nH_{2n+1}$, the $OC_nH_{2n+1}$, the $OC_mH_{2m+1}$ and the $OC_qH_{2q-1}$ moiety, respectively, may be replaced by a halogen atom, preferably a fluorine atom. Particularly preferred are compounds of formulas IC-1 to IC-35 with $X^{11}$ being F, $CF_3$ or $OCF_3$, especially F.

Examples of said preferred compounds of formula ID are the following ones:

ID-1
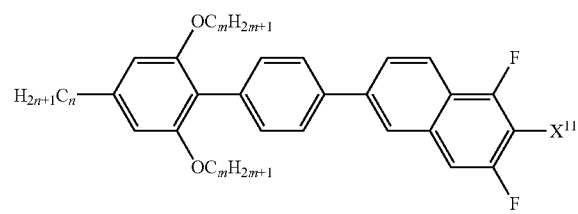
ID-2
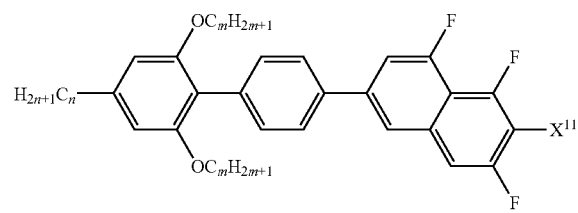
ID-3
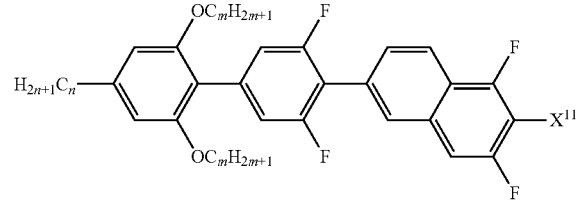
ID-4
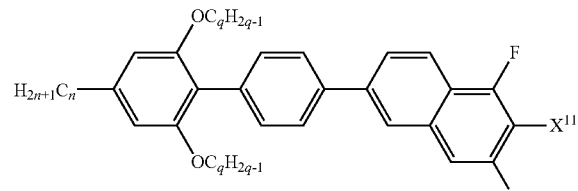
ID-5
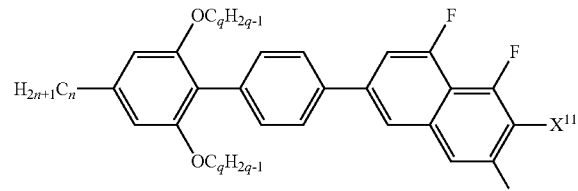
ID-6
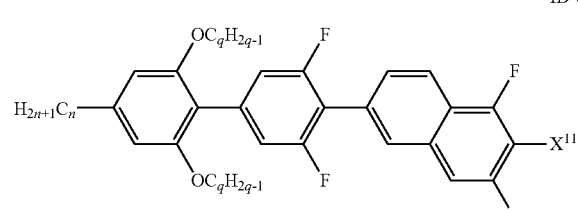
ID-7
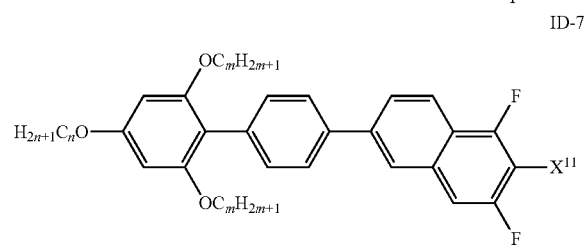
-continued
ID-8
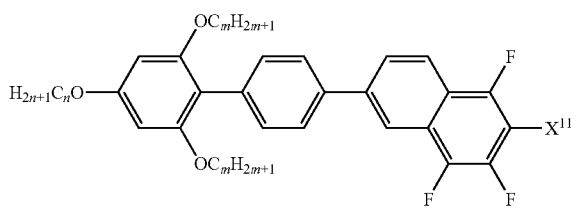
ID-9
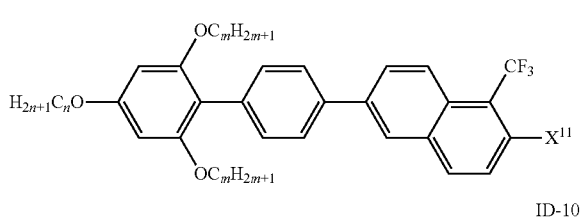
ID-10
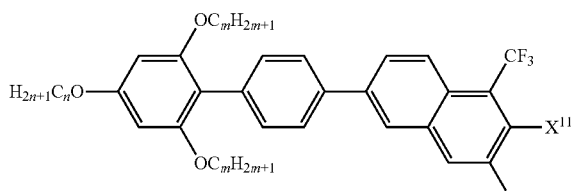
ID-11
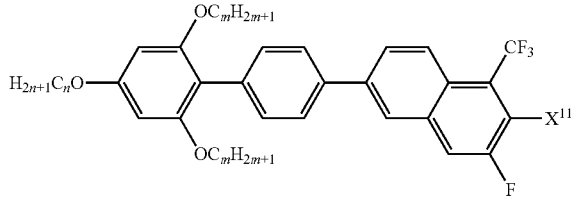
ID-12
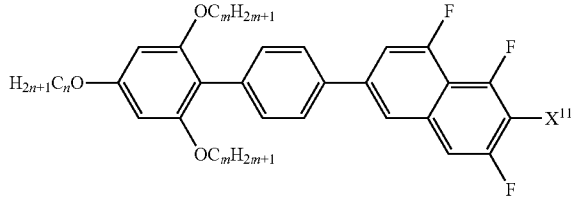
ID-13
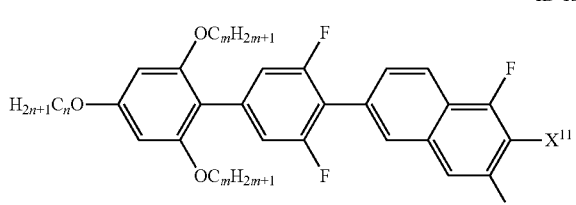
ID-14
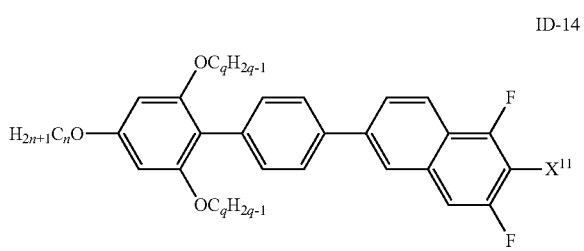

-continued

ID-15

ID-16

ID-17

ID-18

ID-19

ID-20

ID-21

ID-22

ID-23

ID-24

ID-25

ID-26

ID-27

ID-28

-continued
ID-29
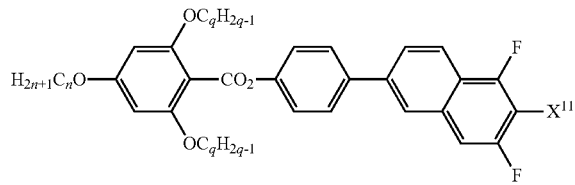
ID-30
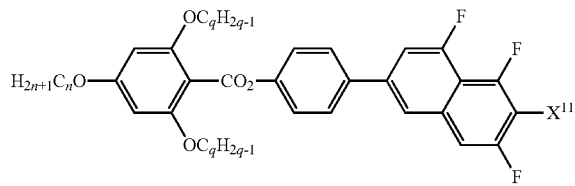
ID-31
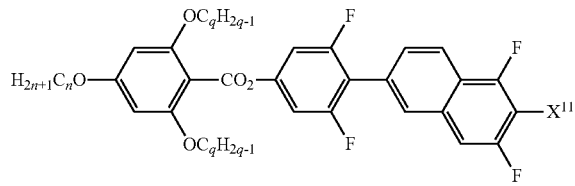
ID-32
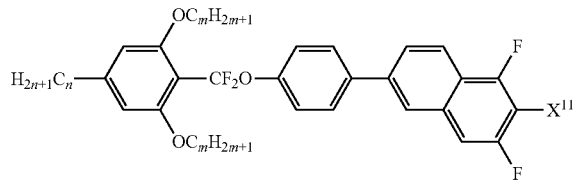
ID-33
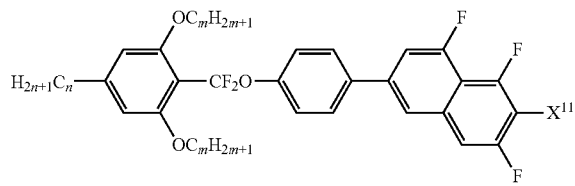
ID-34
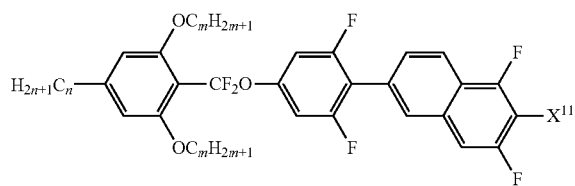
ID-35
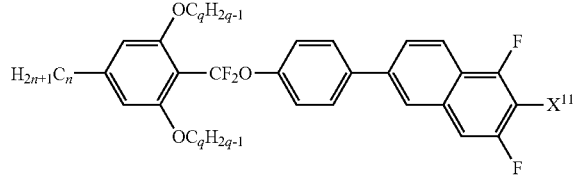
-continued
ID-36
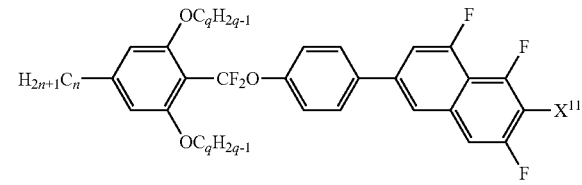
ID-37
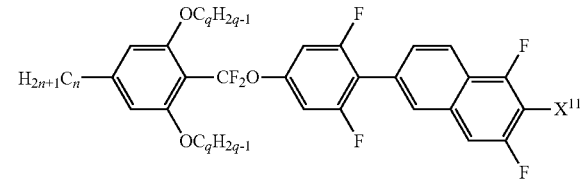
ID-38
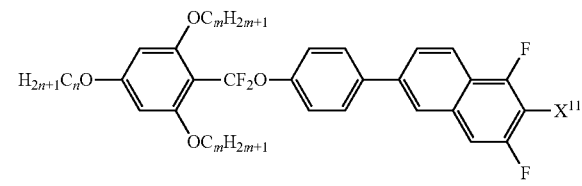
ID-39
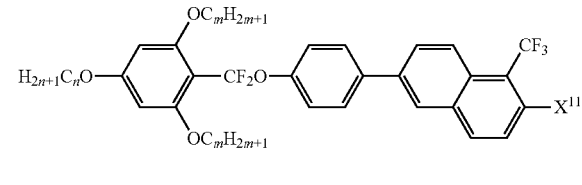
ID-40
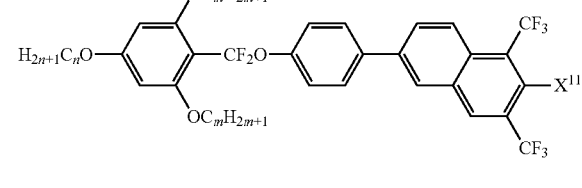
ID-41
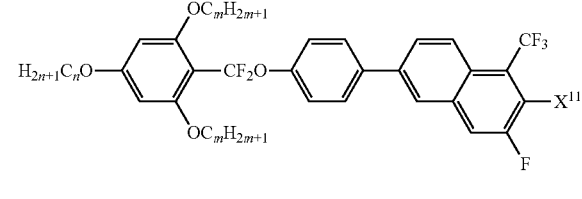
ID-42
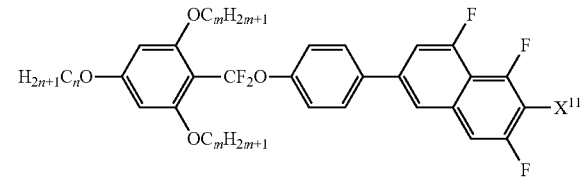

ID-43
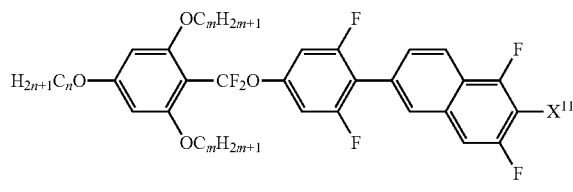
ID-44
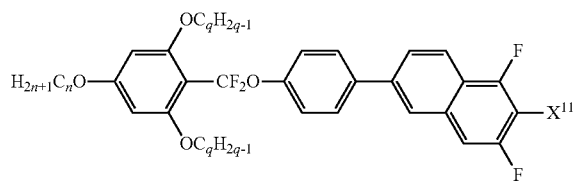
ID-45
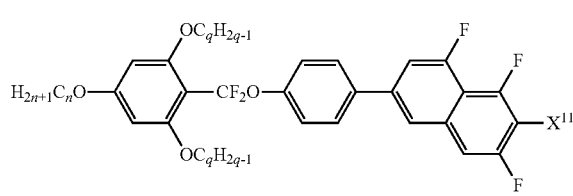
ID-46
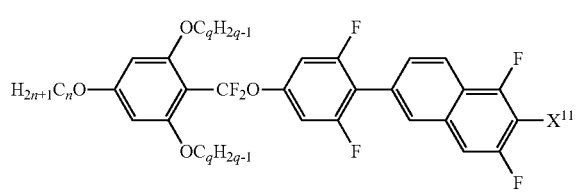
ID-47
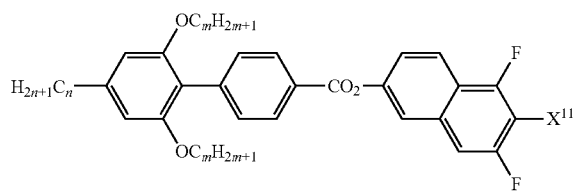
ID-48
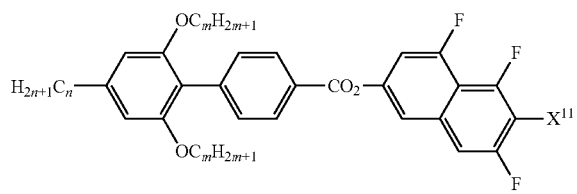
ID-49
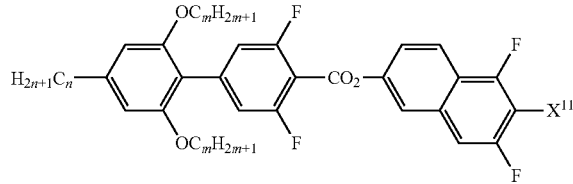
ID-50
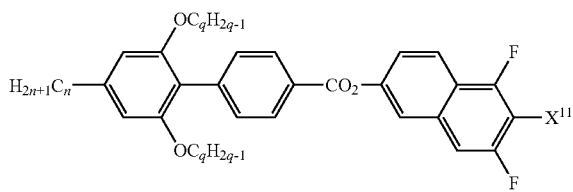
ID-51
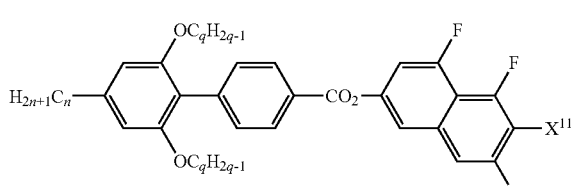
ID-52
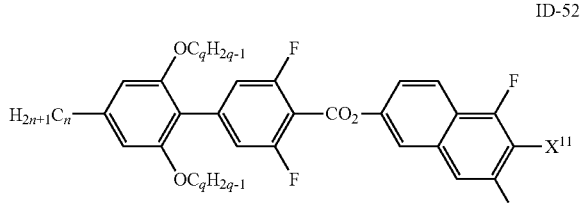
ID-53
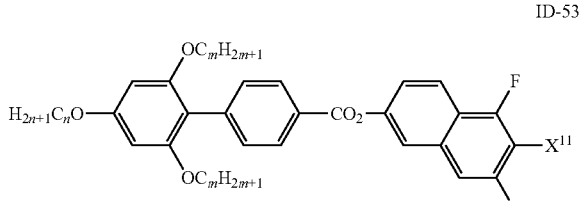
ID-54
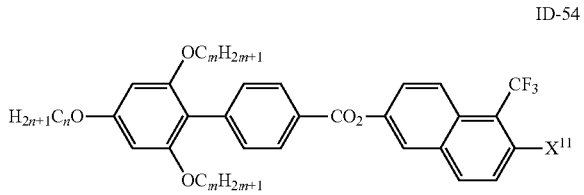
ID-55
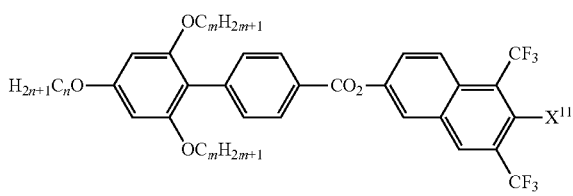
ID-56
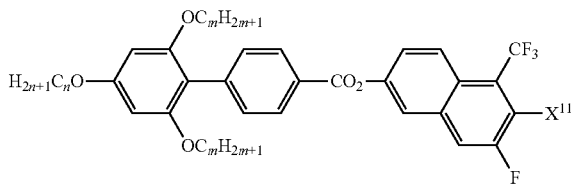

ID-57 through ID-70: chemical structure diagrams.

ID-71
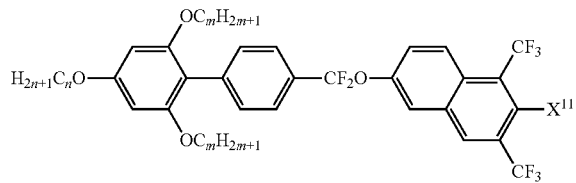

ID-72
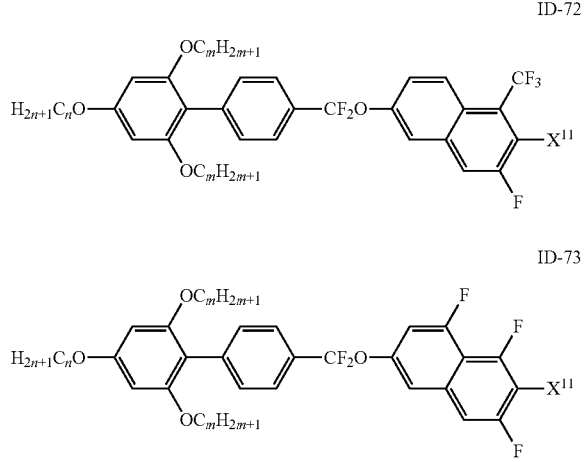

ID-73

ID-74

ID-75

ID-76

ID-77
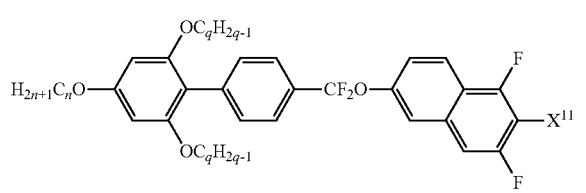

ID-78
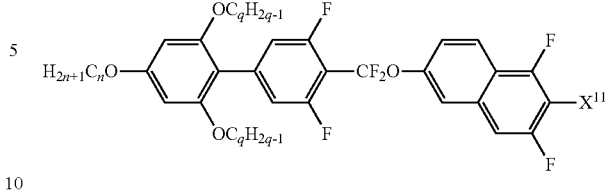

wherein n and m are independently of each other 1, 2, 3, 4, 5, 6, 7 or 8; q is 2, 3, 4, 5, 6, 7 or 8; and $X^{11}$ is CN, NCS, SF$_5$, SCF$_3$, SO$_2$CF$_3$, SO$_2$C$_2$F$_5$, SO$_2$C$_4$F$_9$, F, CF$_3$, CHF$_2$, C$_2$F$_5$, —CH=CF$_2$, —CF=CF$_2$, —O—CH$_3$, —O—C$_2$H$_5$, —O—C$_3$H$_7$, —O-n-C$_4$H$_9$, —O-n-C$_5$H$_{11}$, O-n-C$_6$H$_{13}$, —O—CF$_3$, —O—CHF$_2$, —O—C$_2$F$_5$, —O—C$_3$F$_7$, —O-n-C$_4$F$_9$ with CN, SO$_2$CF$_3$, F, CF$_3$, —O—CF$_3$ being preferred. If present twice in the same compound, both C$_m$H$_{2m+1}$O substituents may have the same value for m or different ones; preferably in two C$_m$H$_{2m+1}$O substituents m is the same integer. Similarly, if present twice in the same compound, both C$_q$H$_{2q-1}$O substituents may have the same value for q or different ones; preferably in two C$_q$H$_{2q-1}$O substituents q is the same integer. Preferably, n and m are the same number and equal to 1, 2, 3, 4, 5 or 6. Furthermore, one or more of the hydrogen atoms of the C$_n$H$_{2n+1}$, the OC$_n$H$_{2n+1}$, the OC$_m$H$_{2m+1}$ an the C$_q$H$_{2q-1}$ moiety, respectively, may be replaced by a halogen atom, preferably a fluorine atom. Particularly preferred are compounds of formulas ID-1 to ID-78 with $X^{11}$ being F, CF$_3$ or OCF$_3$, especially F.

Further preferred embodiments of the invention comprise compounds of formulas IE or IF:

IE
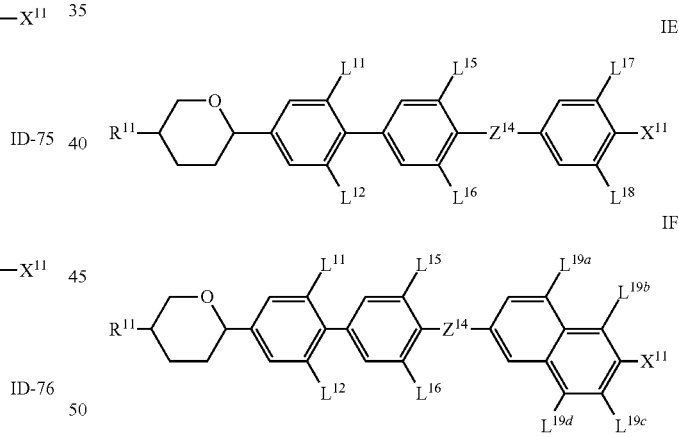

IF wherein
$R^{11}$ is H, an alkyl or alkoxy radical having from 1 to 15 carbon atoms or an alkenyl or alkenyloxy or —O-alkylene-O-alkyl radical having from 2 to 15 carbon atoms, wherein one or more methylene groups of each of said radicals may be replaced independently of each other by —S—, —SiR$^x$R$^y$—, —C≡C—, —CO—O— and/or —O—CO— such that oxygen and/or sulfur atoms are not linked directly to each other, said radicals being unsubstituted or mono-substituted with a —CN group or mono- or poly-substituted with halogen; preferably $R^{11}$ is a straight-chain alkyl, alkoxy, alkenyl, alkenyloxy or —O-alkylene-O-alkyl radical with up to 10 carbon atoms, said radicals being unsubstituted or mono- or poly-substituted with halogen;

$L^{11}$ is an alkyl or alkoxy radical having from 1 to 15 carbon atoms or an alkenyl or alkenyloxy or —O-alkylene-O-alkyl radical having from 2 to 15 carbon atoms, wherein one or more methylene groups of each of said radicals may be replaced independently of each other by —S—, —SiR$^x$R$^y$—, —C≡C—, —CO—O— and/or —O—CO— such that oxygen and/or sulfur atoms are not linked directly to each other, said radicals being unsubstituted or mono-substituted with a —CN group or mono- or poly-substituted with halogen; preferably $L^{11}$ is a straight-chain alkyl, alkoxy, alkenyl, alkenyloxy or —O-alkylene-O-alkyl radical with up to 10 carbon atoms, said radicals being unsubstituted or mono- or poly-substituted with halogen;

$L^{12}$ is hydrogen, halogen, an alkyl or alkoxy radical having from 1 to 15 carbon atoms or an alkenyl or alkenyloxy or —O-alkylene-O-alkyl radical having from 2 to 15 carbon atoms, wherein one or more methylene groups of each of said radicals may be replaced independently of each other by —S—, —SiR$^x$R$^y$—, —C≡C—, —CO—O— and/or —O—CO— such that oxygen and/or sulfur atoms are not linked directly to each other, said radicals being unsubstituted or mono-substituted with a —CN group or mono- or poly-substituted with halogen; preferably $L^{12}$ is H, F, a straight-chain alkyl, alkoxy, alkenyl, alkenyloxy or —O-alkylene-O-alkyl radical with up to 10 carbon atoms, said radicals being unsubstituted or mono- or poly-substituted with halogen;

whereby at least one of $R^{11}$, $L^{11}$ and $L^2$ is one of said straight-chain alkyl, alkoxy, alkenyl, alkenyloxy or —O-alkylene-O-alkyl radicals;

$L^{15}$, $L^{16}$, $L^{17}$, $L^{18}$, $L^{19a}$, $L^{19b}$, $L^{19c}$ and $L^{19d}$ are independently of each other H, CF$_3$ or F; preferably both $L^{17}$ and $L^{19b}$ are F or CF$_3$;

$Z^{14}$ is a single bond, —CH$_2$CH$_2$—, (—CH$_2$CH$_2$—)$_2$, —CF$_2$—CF$_2$—, —CF$_2$—CH$_2$—, —CH$_2$—CF$_2$—, —CH=CH—, —CF=CF—, —CF=CH—, —CH=CF—, —C≡C—, —CH$_2$O—, —OCH$_2$—, —CF$_2$O—, —OCF$_2$—, —CO—O— or —O—CO—; preferably $Z^{14}$ is a single bond, —CF$_2$O— or —CO$_2$—;

$X^{11}$ is F, Cl, —CN, —NCS, —SF$_5$, —S—R$^z$, —SO$_2$—R$^z$, an alkyl or alkoxy radical having from 1 to 15 carbon atoms, wherein one or more methylene groups of said alkyl or alkoxy radical may be replaced independently of each other by —O—, —S—, —SiR$^x$R$^y$—, —CH=CH—, —C≡C—, —CO—O— and/or —O—CO— such that oxygen and/or sulfur atoms are not linked directly to each other, said alkyl or alkoxy radical being unsubstituted or mono-substituted with a —CN group or mono- or poly-substituted with halogen; preferably $X^{11}$ is F, Cl, CF$_3$, OCF$_3$, OCHF$_2$, NCS, SF$_5$, —S—R$^z$ or —SO$_2$—R$^z$;

R$^x$ and R$^y$ are independently of each other hydrogen or an alkyl radical having from 1 to 7 carbon atoms; preferably both R$^x$ and R$^y$ are methyl, ethyl, propyl or butyl; and;

R$^z$ is an alkyl radical having from 1 to 7 carbon atoms, said alkyl radical being unsubstituted or mono- or poly-substituted with halogen; preferably R$^z$ is CF$_3$, C$_2$F$_5$ or n-C$_4$F$_9$.

Examples of said preferred compounds of formula IE are the following ones:

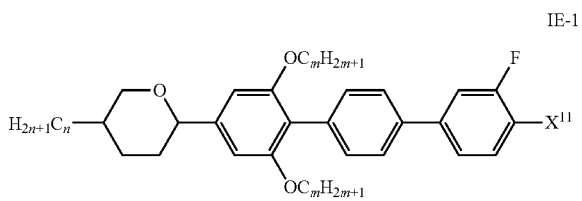

IE-1

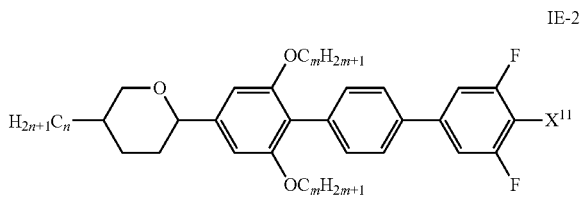

IE-2

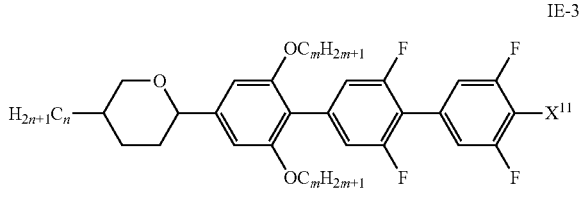

IE-3

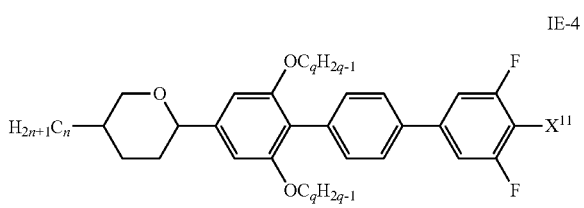

IE-4

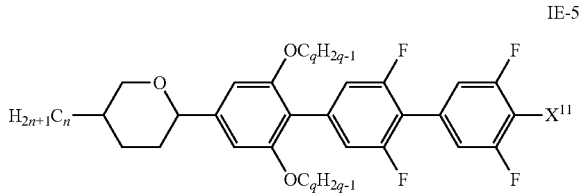

IE-5

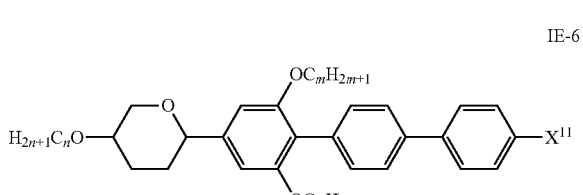

IE-6

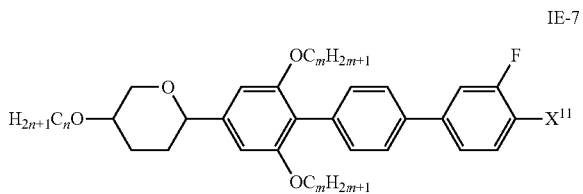

IE-7

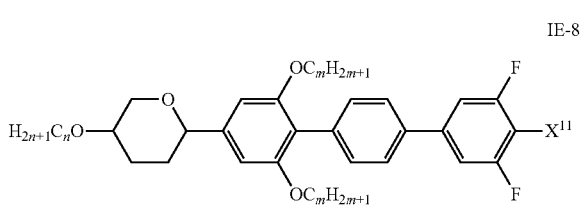

IE-8

IE-9
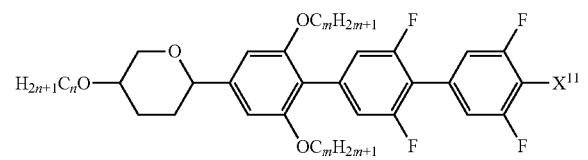
IE-10
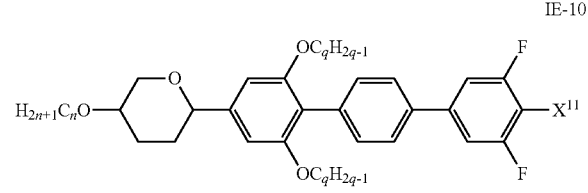
IE-11
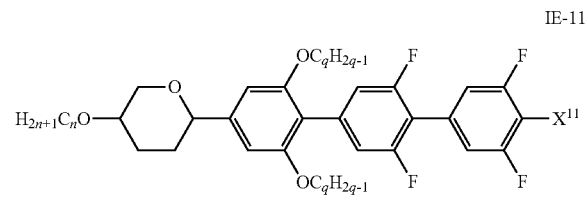
IE-12
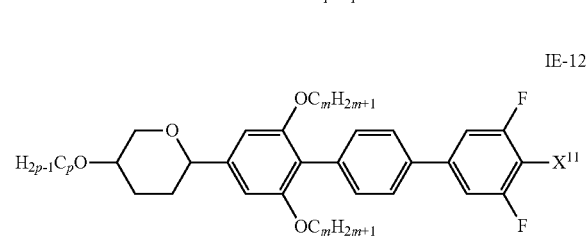
IE-13
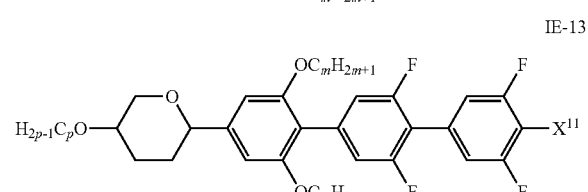
IE-14
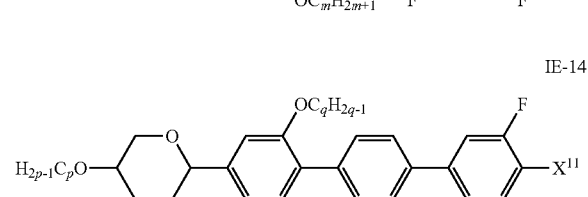
IE-15
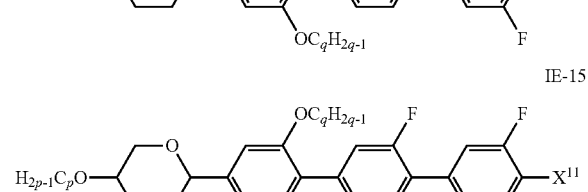
IE-16
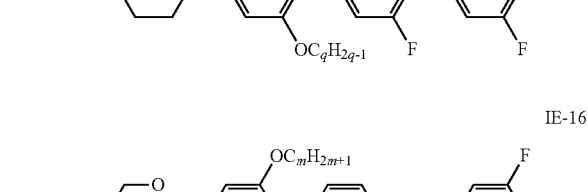
IE-17
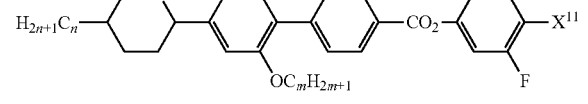
IE-18
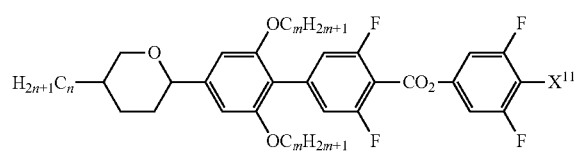
IE-19
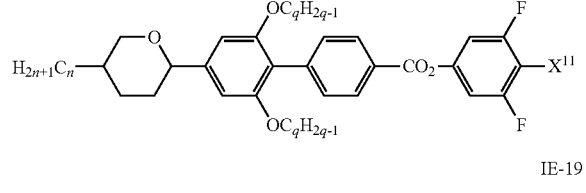
IE-20
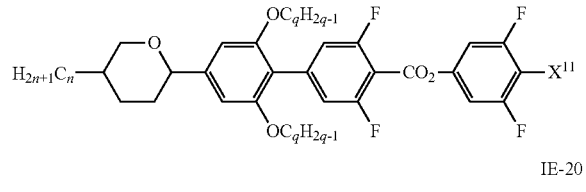
IE-21
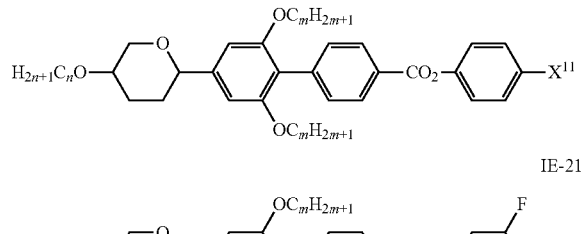
IE-22
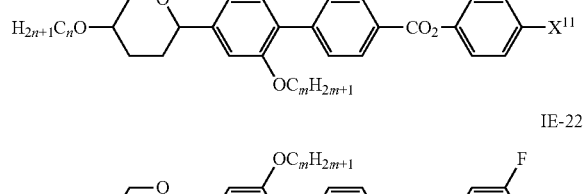
IE-23
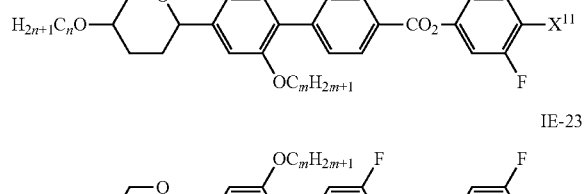
IE-24
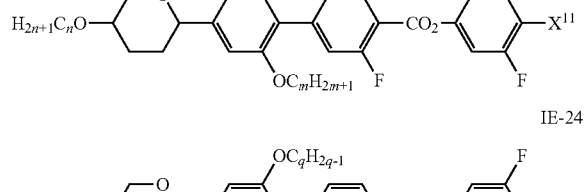
IE-25
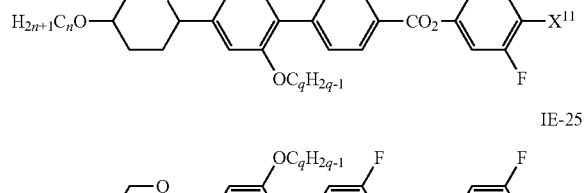

IE-26
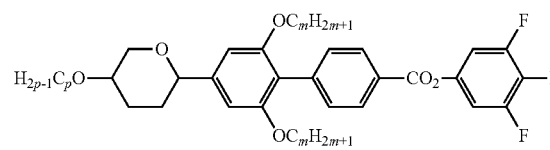
IE-27
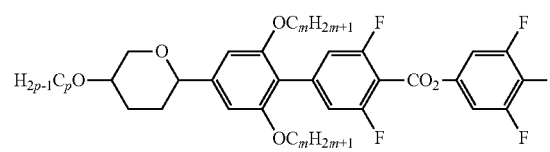
IE-28
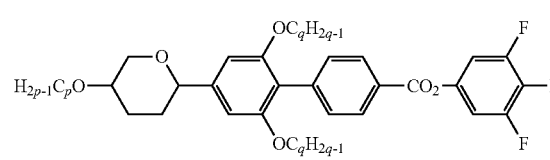
IE-29
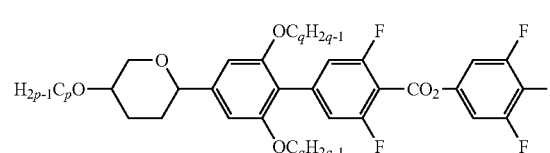
IE-30
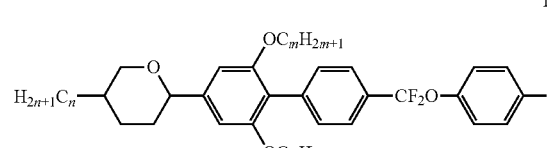
IE-31
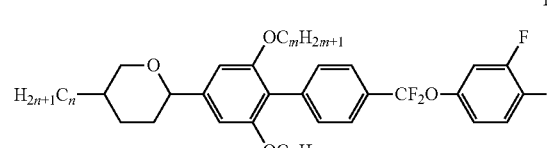
IE-32
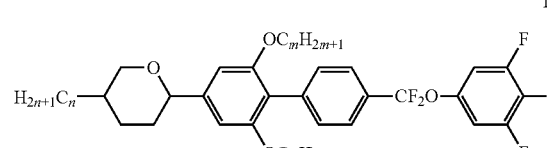
IE-33
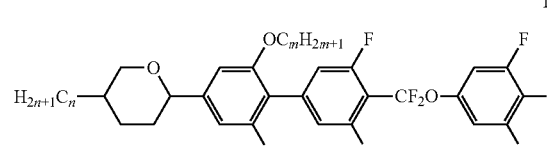
IE-34
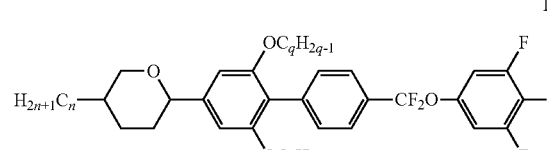
IE-35
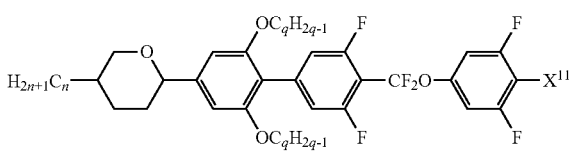
IE-36
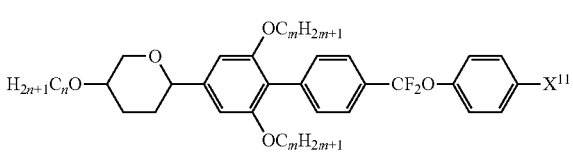
IE-37
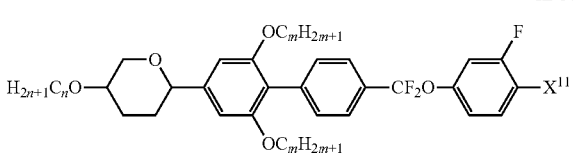
IE-38
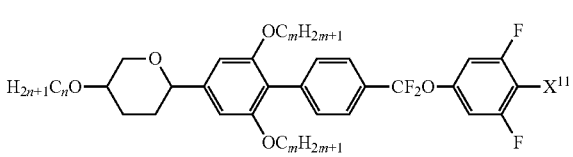
IE-39
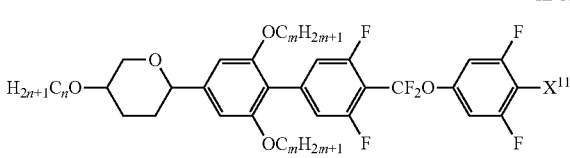
IE-40
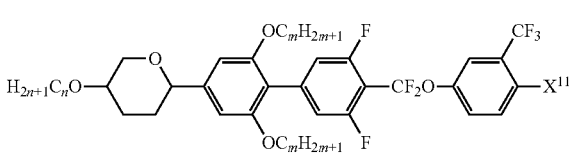
IE-41
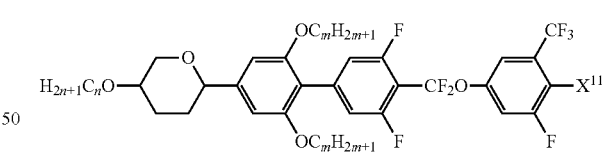
IE-42
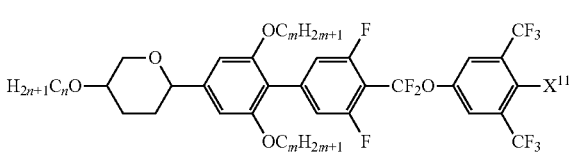
IE-43
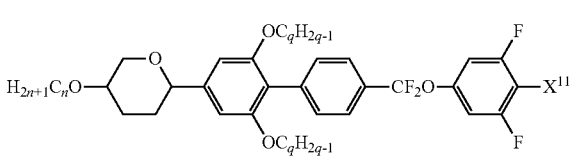

IE-44
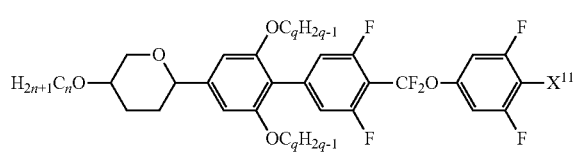

IE-45
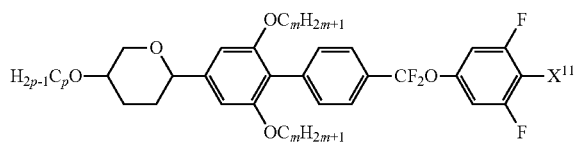

IE-46
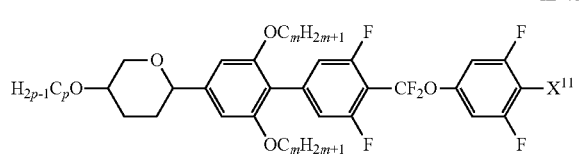

IE-47
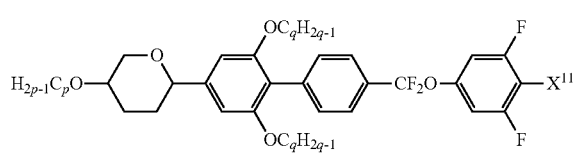

IE-48
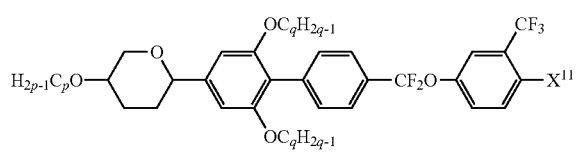

IE-49
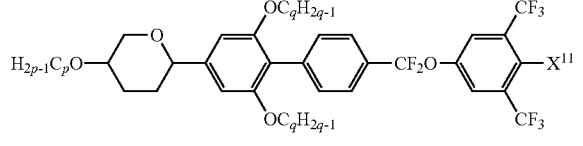

IE-50
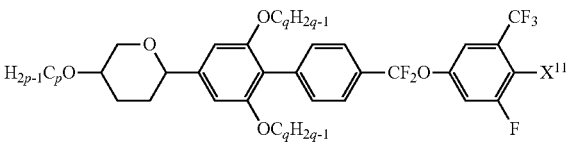

IE-51
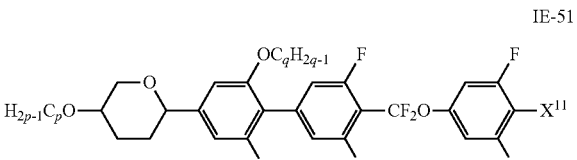

wherein n and m are independently of each other 1, 2, 3, 4, 5, 6, 7 or 8; q and p are independently of each other 2, 3, 4, 5, 6, 7 or 8; and $X^{11}$ is CN, NCS, $SF_5$, $SCF_3$, $SO_2CF_3$, $SO_2C_2F_5$, $SO_2C_4F_9$, F, $CF_3$, $CHF_2$, $C_2F_5$, —CH=$CF_2$, —CF=$CF_2$, —O—$CH_3$, —O—$C_2H_5$, —O—$C_3H_7$, —O-n-$C_4H_9$, —O-n-$C_5H_{11}$, O-n-$C_6H_{13}$, —O—$CF_3$, —O—$CHF_2$, —O—$C_2F_5$, —O—$C_3F_7$, —O-n-$C_4F_9$ With NCS, $SF_5$, $SO_2CF_3$, $SO_2C_2F_5$, $SO_2C_4F_9$, F, $CF_3$, $OCF_3$ being preferred. If present twice in the same compound, both $C_mH_{2m+1}O$ substituents may have the same value for m or different ones; preferably in two $C_mH_{2m+1}O$ substituents m is the same integer. Similarly, if present twice in the same compound, both $C_qH_{2q-1}O$ substituents may have the same value for q or different ones; preferably in two $C_qH_{2q-1}O$ substituents q is the same integer. Preferably, n and m are the same number and equal to 1, 2, 3, 4, 5 or 6. Likewise it is preferred that both q and p are the same number and equal to 3, 4, 5, 6. Furthermore, one or more of the hydrogen atoms of the $C_nH_{2n+1}$, the $OC_nH_{2n+1}$, the $OC_mH_{2m+1}$, the $OC_pH_{2p-1}$ and the $OC_qH_{2q-1}$ moiety, respectively, may be replaced by a halogen atom, preferably a fluorine atom. Particularly preferred are compounds of formulas IE-1 to IE-51 with $X^{11}$ being NCS, $SF_5$, $SO_2CF_3$, $SO_2C_2F_5$, $SO_2C_4F_9$.

Examples of said preferred compounds of formula IF are the following ones:

IF-1
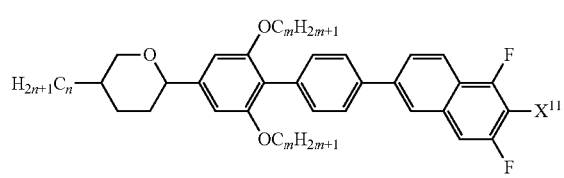

IF-2
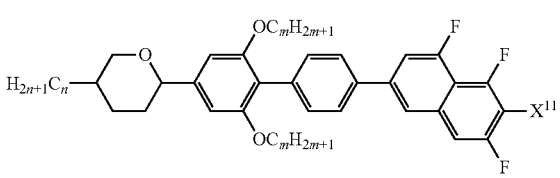

IF-3
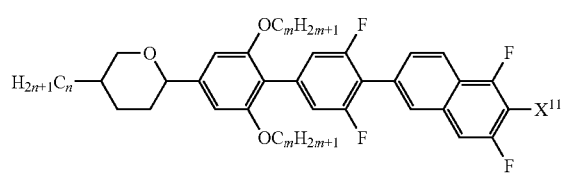

IF-4
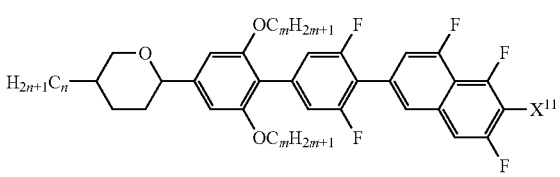

-continued
IF-5
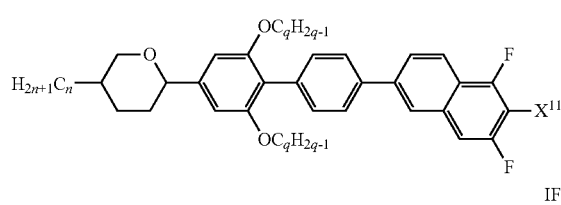
IF-6
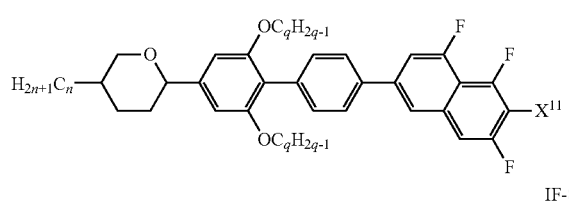
IF-7
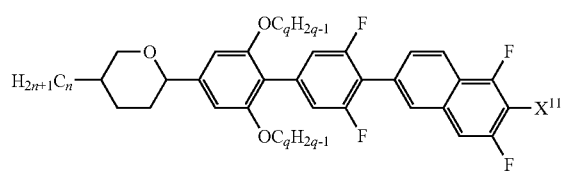
IF-8
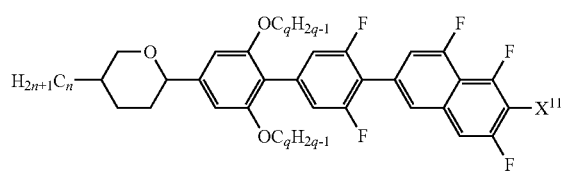
IF-9
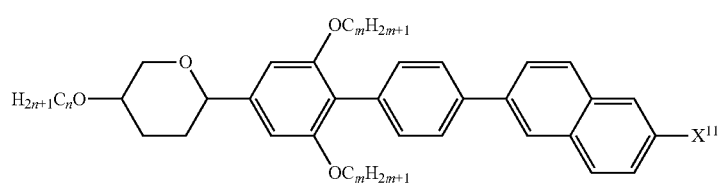
IF-10
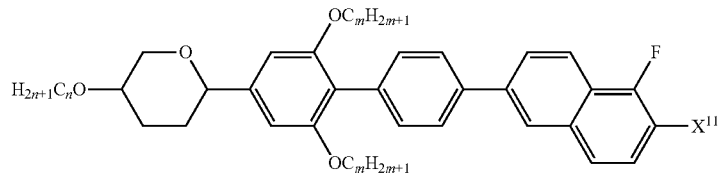
IF-11
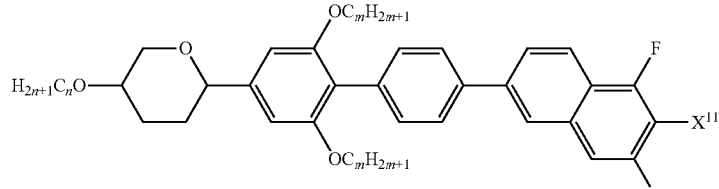
IF-12
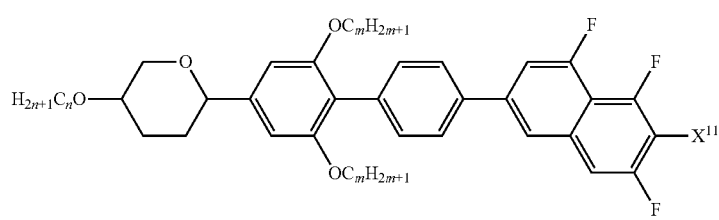
IF-13
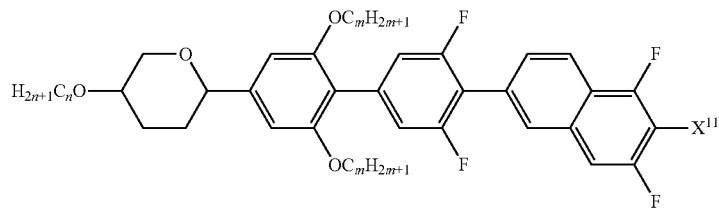
IF-14
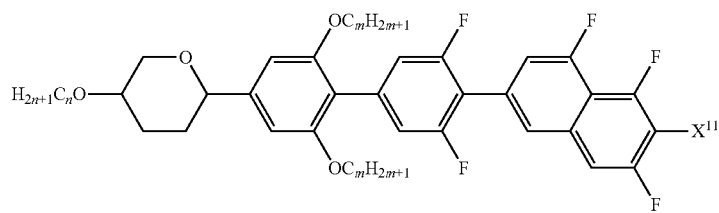

-continued
IF-15
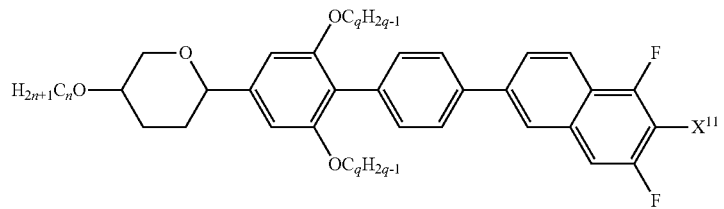
IF-16
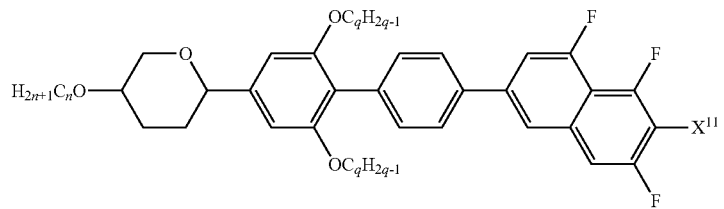
IF-17
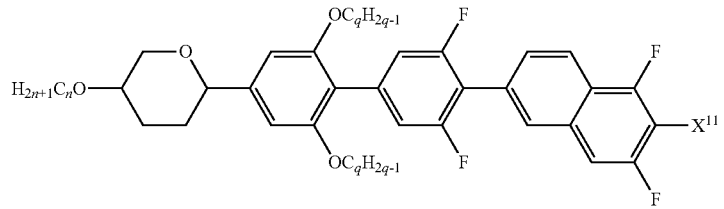
IF-18
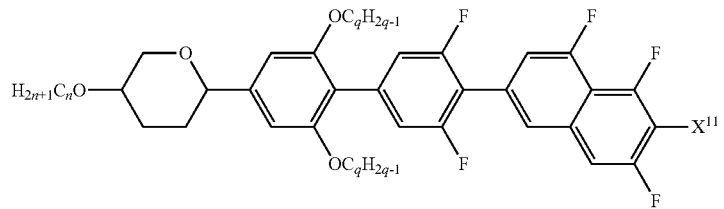
IF-19
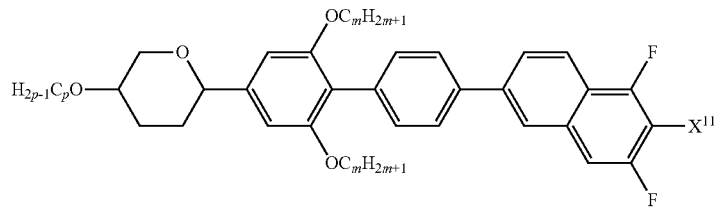
IF-20
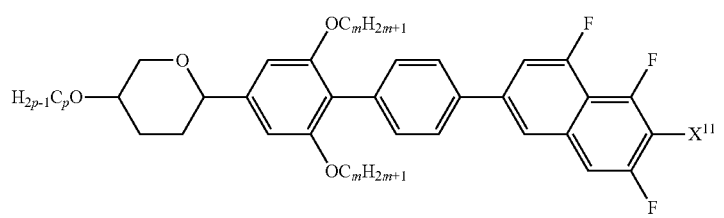
IF-21
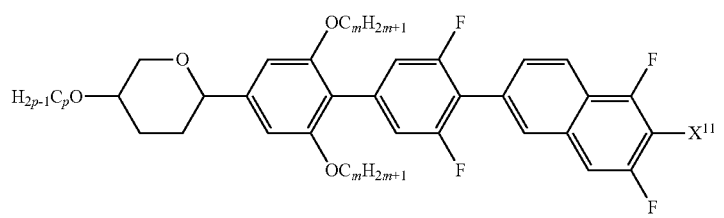

-continued
IF-22
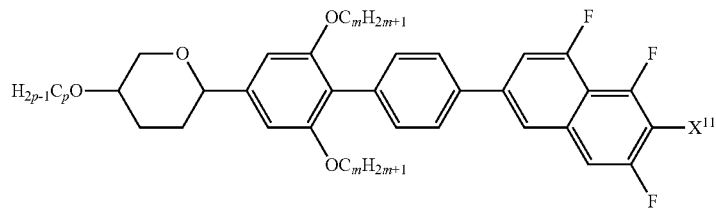
IF-23
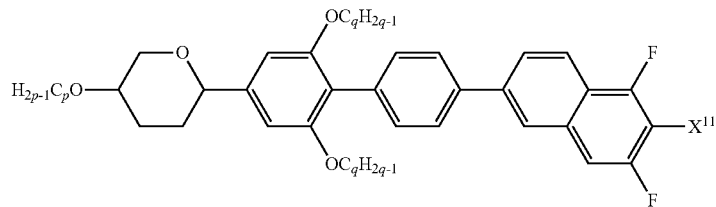
IF-24
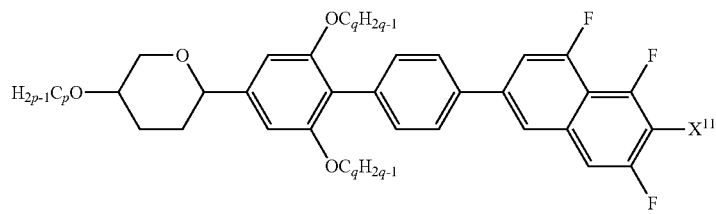
IF-25
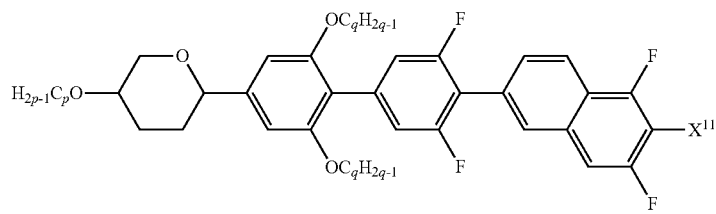
IF-26
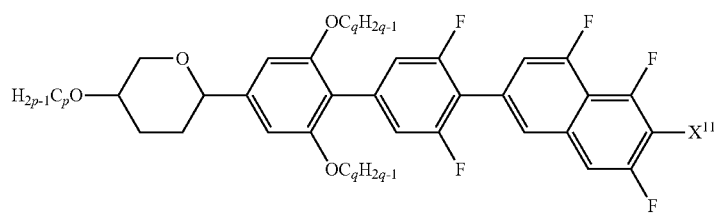
IF-27
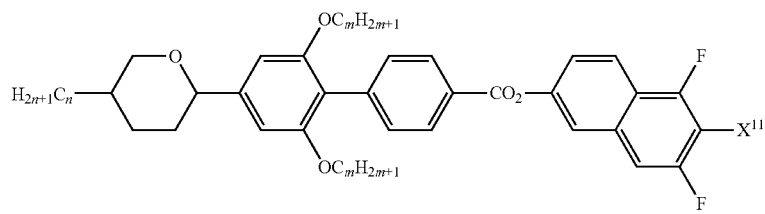
IF-28
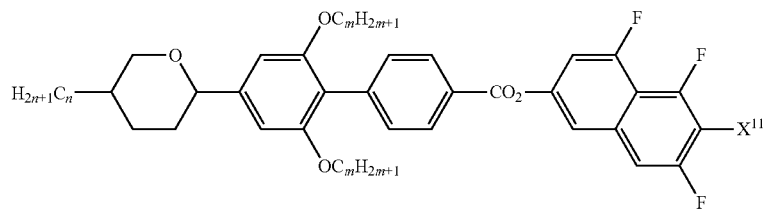

-continued
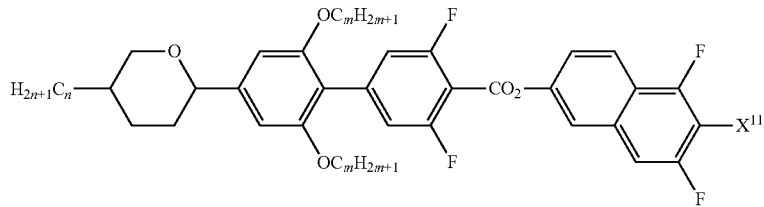
IF-29
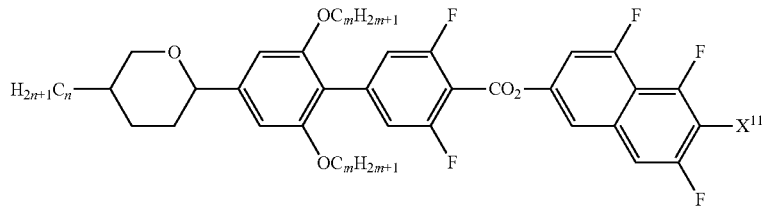
IF-30
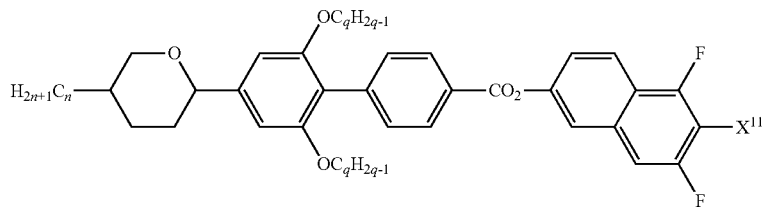
IF-31
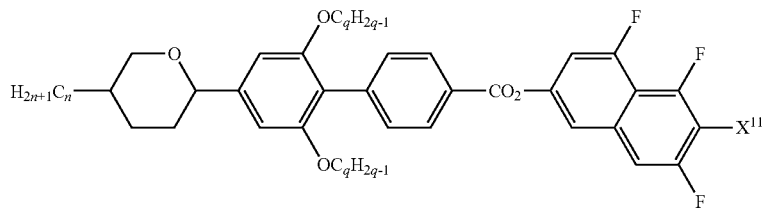
IF-32
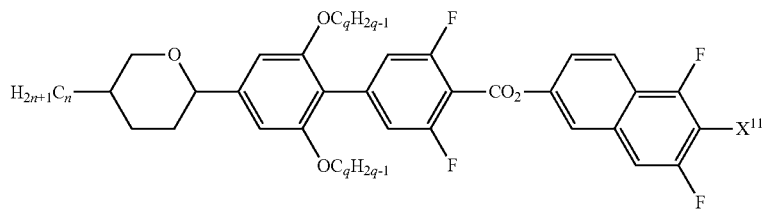
IF-33
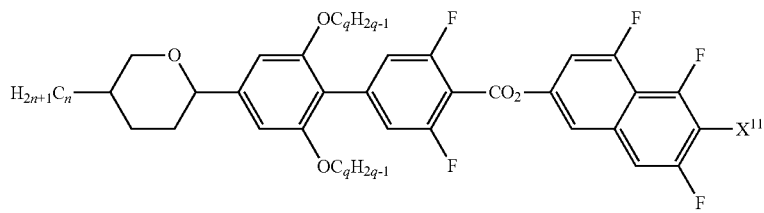
IF-34
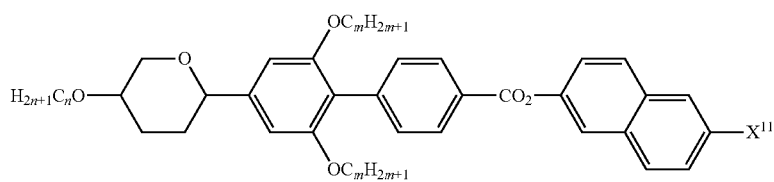
IF-35

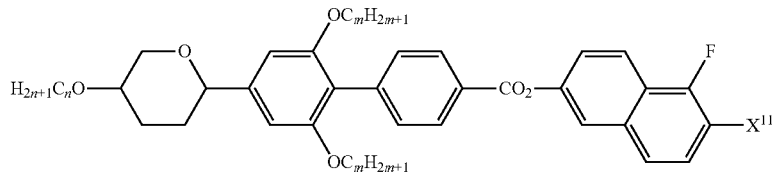
IF-36
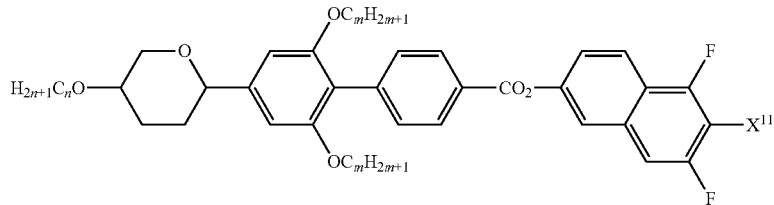
IF-37
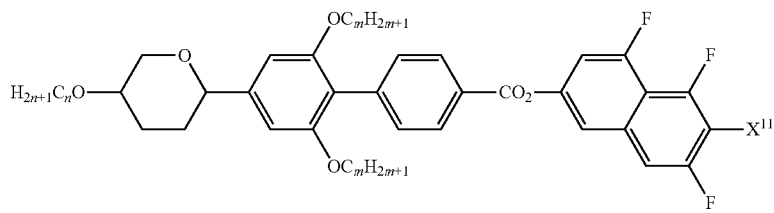
IF-38
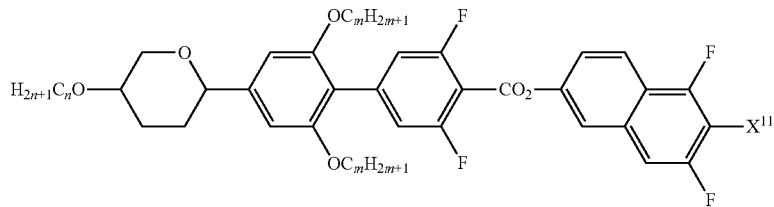
IF-39
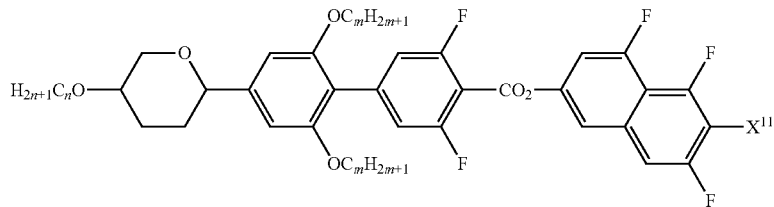
IF-40
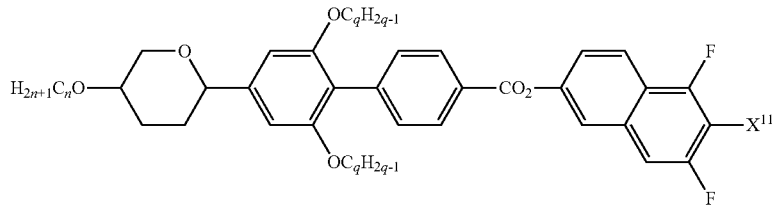
IF-41
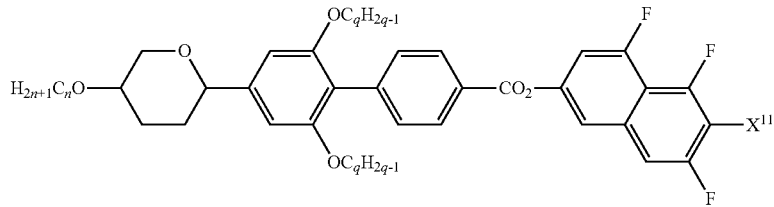
IF-42

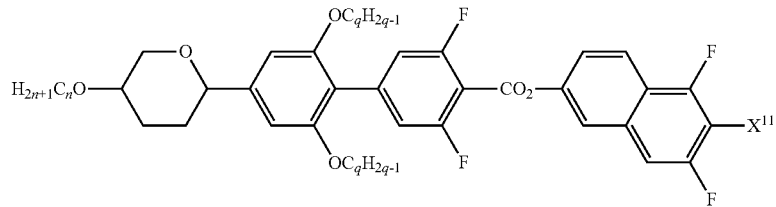 IF-43
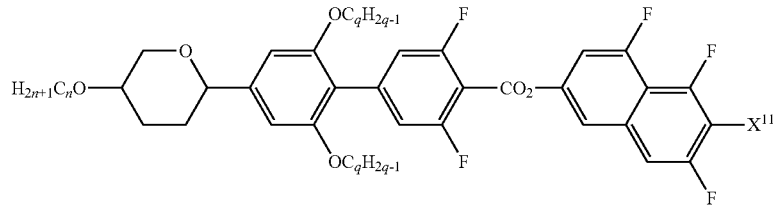 IF-44
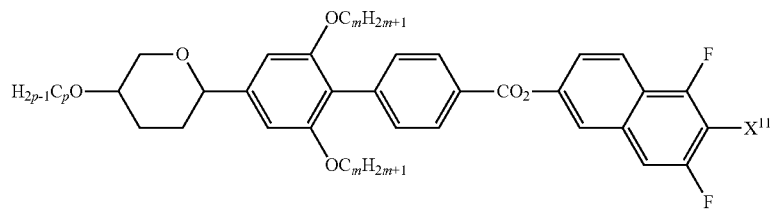 IF-45
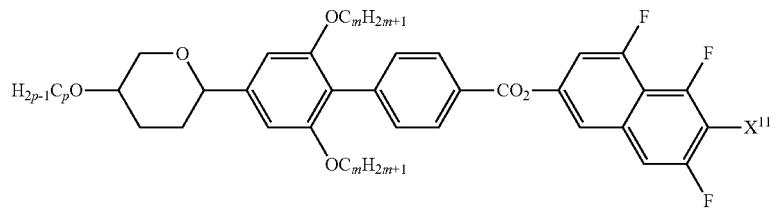 IF-46
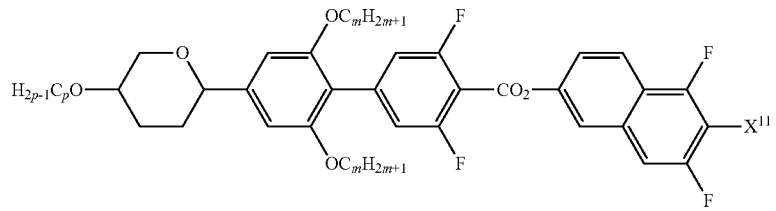 IF-47
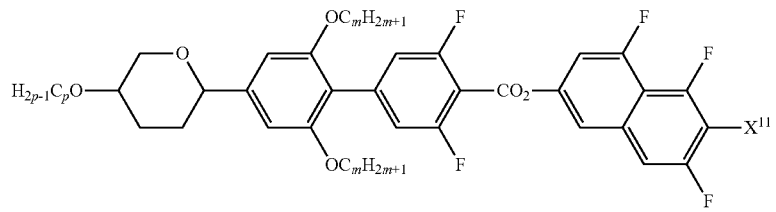 IF-48
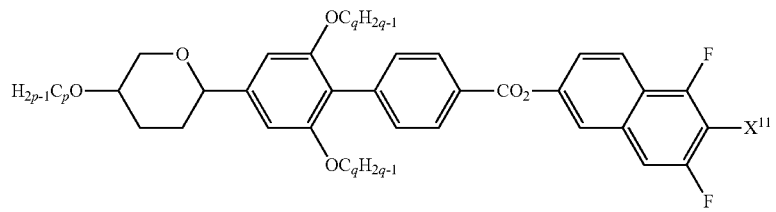 IF-49

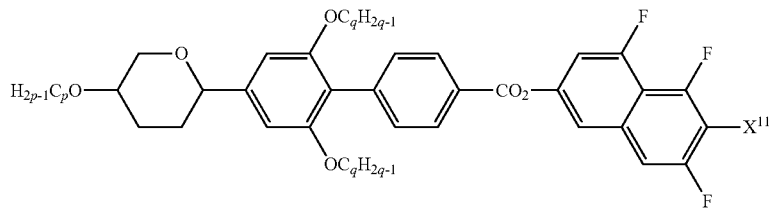
IF-50
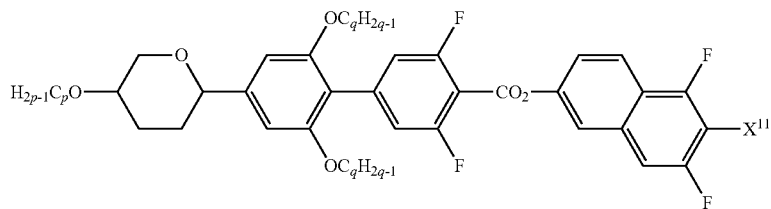
IF-51
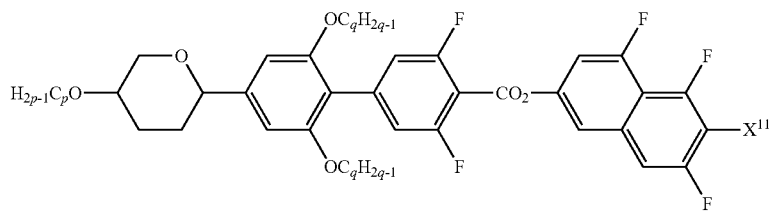
IF-52
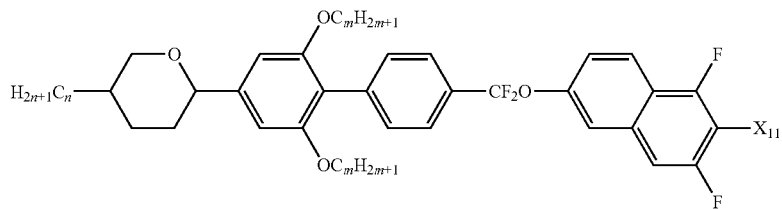
IF-53
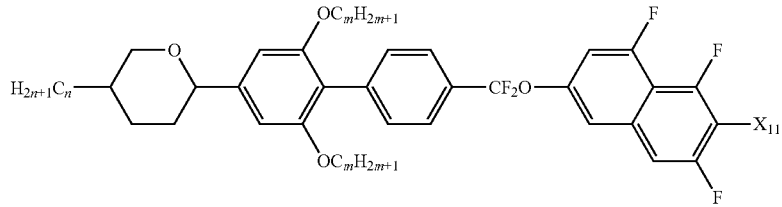
IF-54
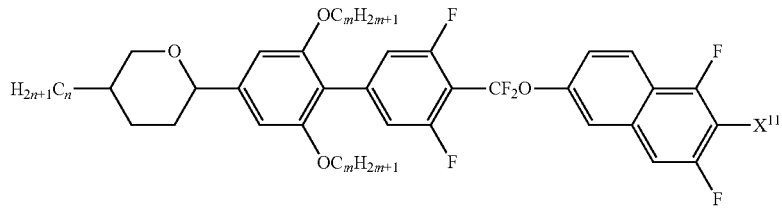
IF-55
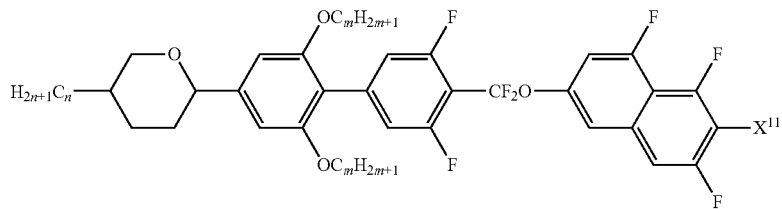
IF-56

-continued
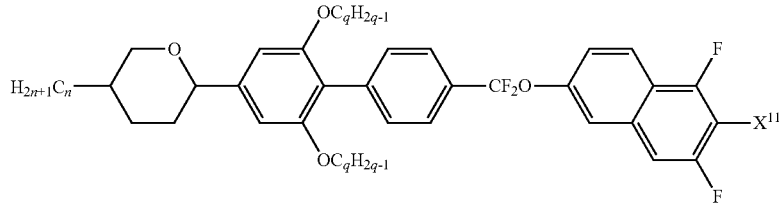
IF-57
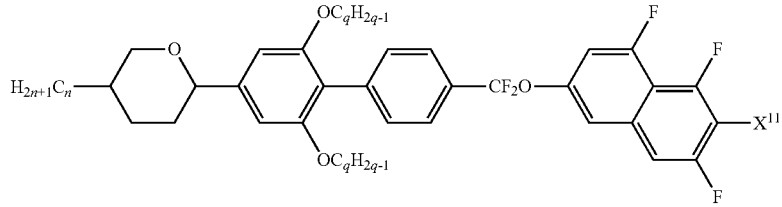
IF-58
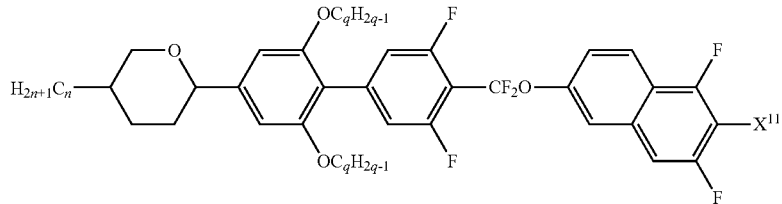
IF-59
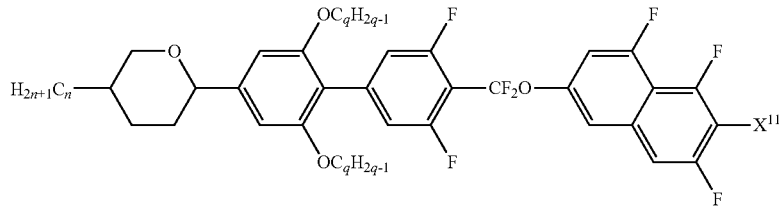
IF-60
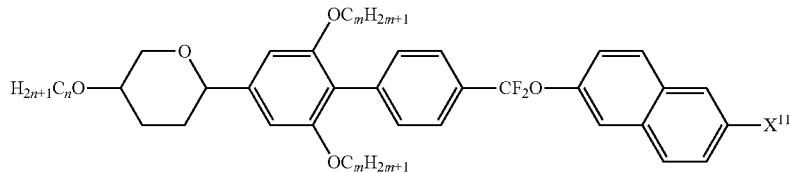
IF-61
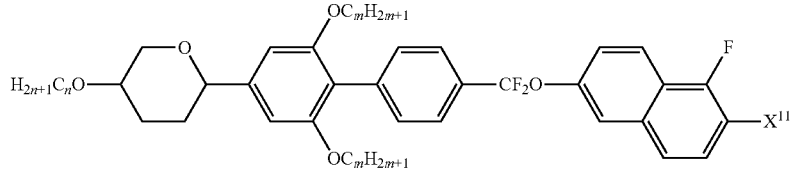
IF-62
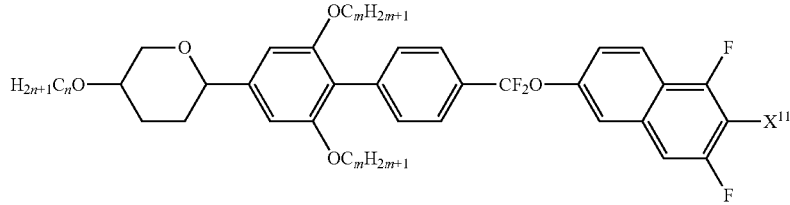
IF-63

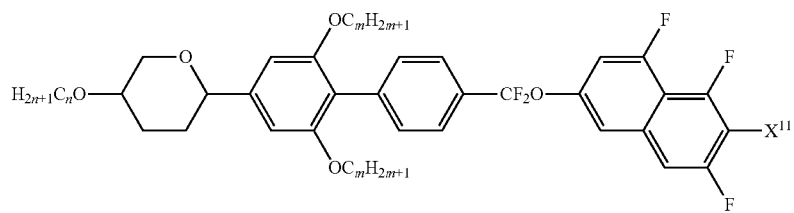 IF-64
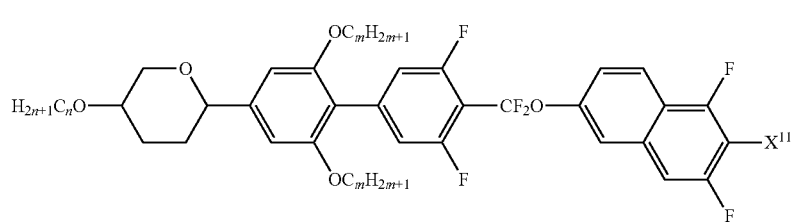 IF-65
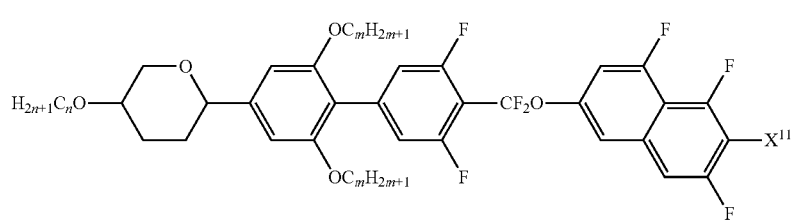 IF-66
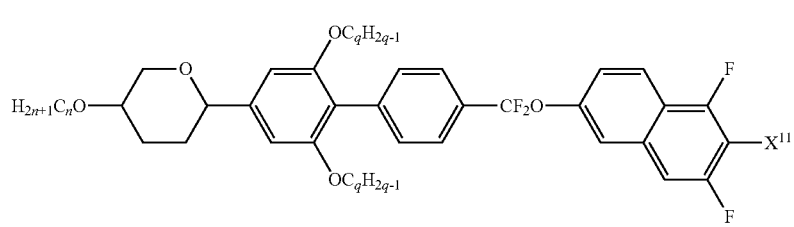 IF-67
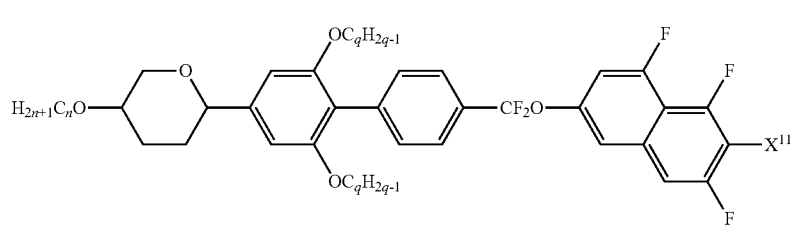 IF-68
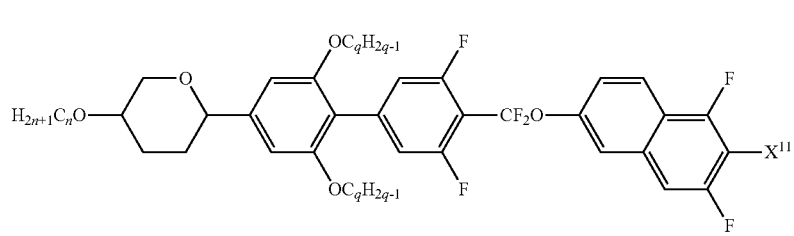 IF-69
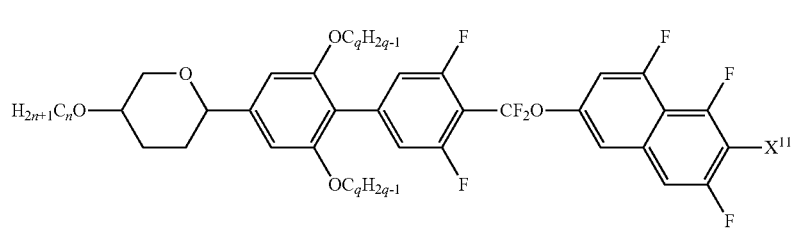 IF-70

IF-71
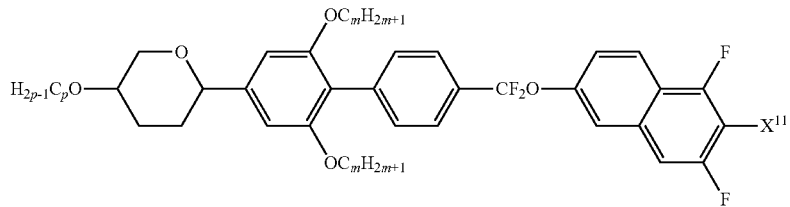
IF-72
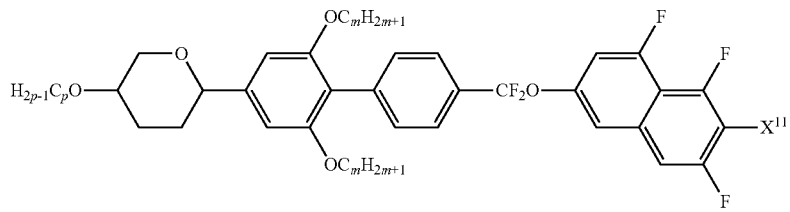
IF-73
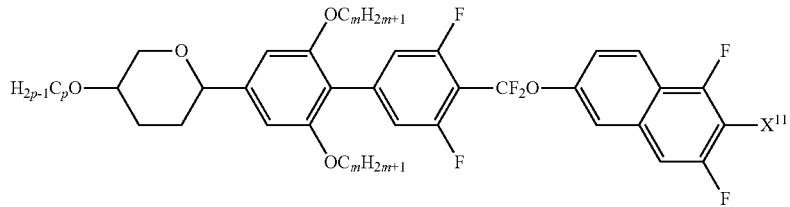
IF-74
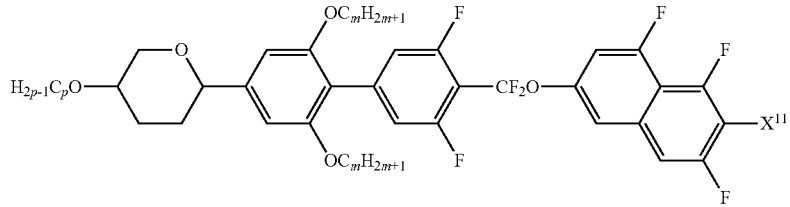
IF-75
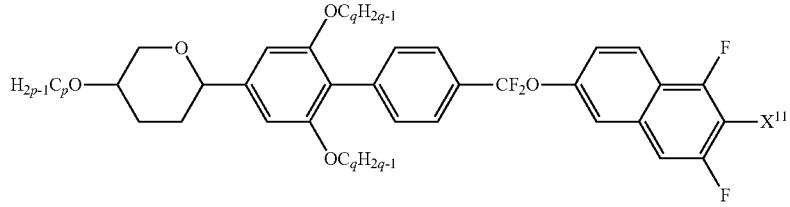
IF-76
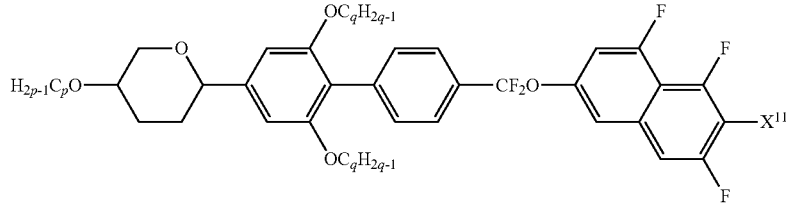
IF-77
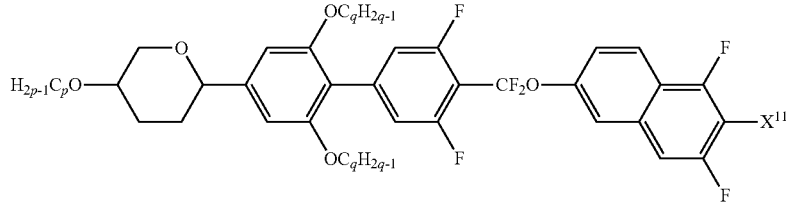

-continued

IF-78

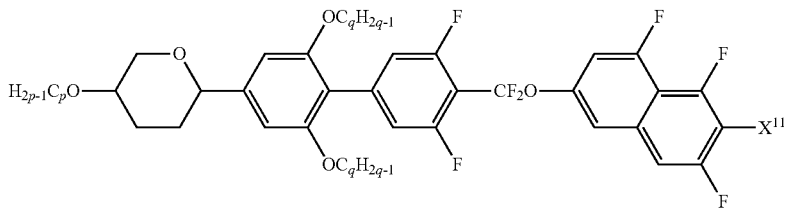

wherein n and m are independently of each other 1, 2, 3, 4, 5, 6, 7 or 8; q and p are independently of each other 2, 3, 4, 5, 6, 7 or 8; and $X^{11}$ is CN, NCS, $SF_5$, $SCF_3$, $SO_2CF_3$, $SO_2C_2F_5$, $SO_2C_4F_9$, F, $CF_3$, $CHF_2$, $C_2F_5$, —CH=$CF_2$, —CF=$CF_2$, —O—$CH_3$, —O—$C_2H_5$, —O—$C_3H_7$, —O-n-$C_4H_9$, —O-n-$C_5H_{11}$, O-n-$C_6H_{13}$, —O—$CF_3$, —O—$CHF_2$, —O—$C_2F_5$, —O—$C_3F_7$, —O-n-$C_4F_9$ with NCS, $SF_5$, $SO_2CF_3$, $SO_2C_2F_5$, $SO_2C_4F_9$, F, $CF_3$, $OCF_3$ being preferred. If present twice in the same compound, both $C_mH_{2m+1}O$ substituents may have the same value for m or different ones; preferably in two $C_mH_{2m+1}O$ substituents m is the same integer. Similarly, if present twice in the same compound, both $C_qH_{2q-1}O$ substituents may have the same value for q or different ones; preferably in two $C_qH_{2q-1}O$ substituents q is the same integer. Preferably, n and m are the same number and equal to 1, 2, 3, 4, 5 or 6. Likewise it is preferred that both q and p are the same number and equal to 3, 4, 5, 6. Furthermore, one or more of the hydrogen atoms of the $C_nH_{2n+1}$, the $OC_nH_{2n+1}$, the $OC_mH_{2m+1}$, the $OC_pH_{2p-1}$ and the $OC_qH_{2q-1}$ moiety, respectively, may be replaced by a halogen atom, preferably a fluorine atom. Particularly preferred are compounds of formulas IF-1 to IF-78 with $X^{11}$ being NCS, $SF_5$, $SO_2CF_3$, $SO_2C_2F_5$, $SO_2C_4F_9$, F, $CF_3$, $OCF_3$, especially F.

A further preferred embodiment of the invention comprises compounds of formula IG:

IG

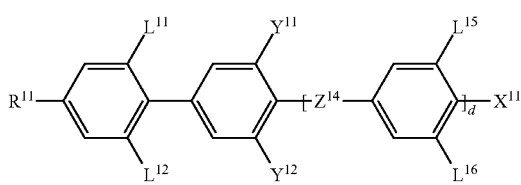

wherein
$R^{11}$ is an alkyl or alkoxy radical having from 1 to 15 carbon atoms or an alkenyl or alkenyloxy or —O-alkylene-O-alkyl radical having from 2 to 15 carbon atoms, wherein one or more methylene groups of each of said radicals may be replaced independently of each other by —S—, —$SiR^xR^y$—, —C≡C—, —CO—O— and/or —O—CO— such that oxygen and/or sulfur atoms are not linked directly to each other, said radicals being unsubstituted or mono-substituted with a —CN group or mono- or poly-substituted with halogen; preferably $R^{11}$ is a straight-chain alkyl, alkoxy, alkenyl, alkenyloxy or —O-alkylene-O-alkyl radical with up to 10 carbon atoms, said radicals being unsubstituted or mono- or poly-substituted with halogen;
$L^{11}$ is an alkyl or alkoxy radical having from 1 to 15 carbon atoms or an alkenyl or alkenyloxy or —O-alkylene-O-alkyl radical having from 2 to 15 carbon atoms, wherein one or more methylene groups of each of said radicals may be replaced independently of each other by —S—, —$SiR^xR^y$—, —C≡C—, —CO—O— and/or —O—CO— such that oxygen and/or sulfur atoms are not linked directly to each other, said radicals being unsubstituted or mono-substituted with a —CN group or mono- or poly-substituted with halogen; preferably $L^{11}$ is an alkoxy, alkenyloxy or —O-alkylene-O-alkyl radical with up to 10 carbon atoms, said radicals being unsubstituted or mono- or poly-substituted with halogen;
$L^{12}$ is hydrogen, halogen, an alkyl or alkoxy radical having from 1 to 15 carbon atoms or an alkenyl or alkenyloxy or —O-alkylene-O-alkyl radical having from 2 to 15 carbon atoms, wherein one or more methylene groups of each of said radicals may be replaced independently of each other by —S—, —$SiR^xR^y$—, —C≡C—, —CO—O— and/or —O—CO— such that oxygen and/or sulfur atoms are not linked directly to each other, said radicals being unsubstituted or mono-substituted with a —CN group or mono- or poly-substituted with halogen; preferably $L^{12}$ is H;
$Y^{11}$ is an alkyl or alkoxy radical having from 1 to 15 carbon atoms or an alkenyl or alkenyloxy or —O-alkylene-O-alkyl radical having from 2 to 15 carbon atoms, wherein one or more methylene groups of each of said radicals may be replaced independently of each other by —S—, —$SiR^xR^y$—, —C≡C—, —CO—O— and/or —O—CO— such that oxygen and/or sulfur atoms are not linked directly to each other, said radicals being unsubstituted or mono-substituted with a —CN group or mono- or poly-substituted with halogen; preferably $Y^{11}$ is an alkoxy, alkenyloxy or —O-alkylene-O-alkyl radical with up to 10 carbon atoms, said radicals being unsubstituted or mono- or poly-substituted with halogen; in particular $Y^{11}$ has the same meaning as $L^{11}$;
$Y^{12}$ is hydrogen, halogen, an alkyl or alkoxy radical having from 1 to 15 carbon atoms or an alkenyl or alkenyloxy or —O-alkylene-O-alkyl radical having from 2 to 15 carbon atoms, wherein one or more methylene groups of each of said radicals may be replaced independently of each other by —S—, —$SiR^xR^y$—, —C≡C—, —CO—O— and/or —O—CO— such that oxygen and/or sulfur atoms are not linked directly to each other, said radicals being unsubstituted or mono-substituted with a —CN group or mono- or poly-substituted with halogen; preferably $L^{12}$ is H;
d is 0, 1 or 2; preferably d is 0 or 1, especially 1;
$L^{15}$ and $L^{16}$ are independently of each other H, $CF_3$ or F; preferably both $L^{15}$ and $L^{16}$ are F or $CF_3$;
$Z^{14}$ is a single bond, —$CH_2CH_2$—, (—$CH_2CH_2$—)$_2$, —$CF_2$—$CF_2$—, —$CF_2$—$CH_2$—, —$CH_2$—$CF_2$—, —CH=CH—, —CF=CF—, —CF=CH—, —CH=CF—, —C≡C—, —$CH_2$O—, —O$CH_2$—, —$CF_2$O—, —O$CF_2$—, —CO—O— or —O—CO—; preferably $Z^{14}$ is a single bond, —$CF_2$O— or —$CO_2$—;
$X^{11}$ is F, Cl, —CN, —NCS, —$SF_5$, —S—$R^z$, —$SO_2$—$R^z$, an alkyl or alkoxy radical having from 1 to 15 carbon atoms, wherein one or more methylene groups of said alkyl or alkoxy radical may be replaced independently of each other by —O—, —S—, —SiR$^x$R$^y$—, —CH═CH—, —C≡C—, —CO—O—, and/or —O—CO— such that oxygen and/or sulfur atoms are not linked directly to each other, said alkyl or alkoxy radical being unsubstituted or mono-substituted with a —CN group or mono- or poly-substituted with halogen; preferably X$^{11}$ is F, Cl, CF$_3$, OCF$_3$, OCHF$_2$, NCS, SF$_5$, —S—R$^z$ or —SO$_2$—R$^z$;

R$^x$ and R$^y$ are independently of each other hydrogen or an alkyl radical having from 1 to 7 carbon atoms; preferably both R$^x$ and R$^y$ are methyl, ethyl, propyl or butyl; and;

R$^z$ is an alkyl radical having from 1 to 7 carbon atoms, said alkyl radical being unsubstituted or mono or poly-substituted with halogen; preferably R$^z$ is CF$_3$, C$_2$F$_5$ or n-C$_4$F$_9$.

One preferred subgroup of compounds according to formula IG are compounds of formula I in which d is zero. Examples of compounds of said subgroup are the following ones:

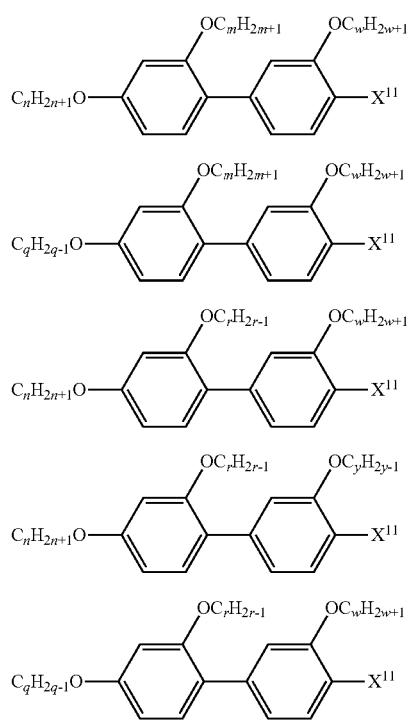

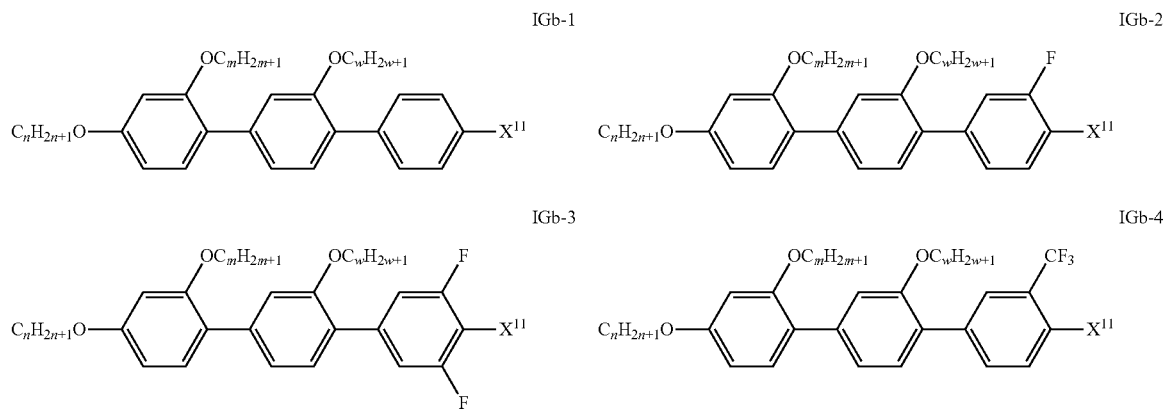

wherein m, n and w are independently of each other integers from 1 to 8, preferably 1, 2, 3, 4, 5 or 6; q, y and r are independently of each other integers from 2 to 8, preferably 3, 4, 5, 6; s and t are independently of each other 1, 2, 3, 4, preferably 2 or 3; u and v are independently of each other 1, 2, 3, 4, preferably 1 or 4; and X$^{11}$ is CN, NCS, SF$_5$, SCF$_3$, SO$_2$CF$_3$, SO$_2$C$_2$F$_5$, SO$_2$C$_4$F$_9$, F, CF$_3$, CHF$_2$, C$_2$F$_5$, —CH═CF$_2$, —CF═CF$_2$, —O—CH$_3$, —O—C$_2$H$_5$, —O—C$_3$H$_7$, —O-n-C$_4$H$_9$, —O-n-C$_5$H$_{11}$, O-n-C$_6$H$_{13}$, —O—CF$_3$, —O—CHF$_2$, —O—C$_2$F$_5$, —O—C$_3$F$_7$, —O-n-C$_4$F$_9$ with CN, SO$_2$CF$_3$, F, CF$_3$, —O—CF$_3$ being preferred. Preferably, C$_n$H$_{2n+1}$O, C$_m$H$_{2m+1}$O and C$_w$H$_{2w+1}$O represent independently of each other methoxy, ethoxy, propoxy, n-butoxy, n-pentoxy and n-hexoxy. Preferably, C$_q$H$_{2q-1}$O, C$_y$H$_{2y-1}$O and C$_r$H$_{2r-1}$O represent —O—CH$_2$CH═CH$_2$, —O—(CH$_2$)$_2$CH═CH$_2$, —O—(CH$_2$)$_3$CH═CH$_2$, —O—(CH$_2$)$_2$CH═CH—CH$_3$. Preferably, —OC$_s$H$_{2s}$OC$_t$H$_{2t+1}$ represents CH$_3$OCH$_2$CH$_2$O— and CH$_3$CH$_2$OCH$_2$CH$_2$O—. Preferably, (C$_v$H$_{2v+1}$)$_3$SiOSi(C$_u$H$_{2u+1}$)$_2$C$_s$H$_{2s}$O represents (CH$_3$)$_3$SiOSi(CH$_3$)$_2$CH$_2$CH$_2$O— and (CH$_3$)$_3$SiOSi(CH$_3$)$_2$CH$_2$CH$_2$CH$_2$O—. Particularly preferred are compounds of formulas IGa-1 to IGa-8 with X$^{11}$ being F, CF$_3$ or OCF$_3$, especially F.

Another preferred subgroup of compounds according to formula IG are compounds in which d is 1. Examples of compounds of said subgroup are the following ones:

-continued
IGb-5
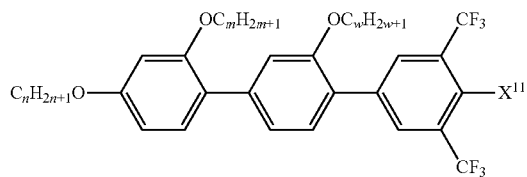
IGb-6
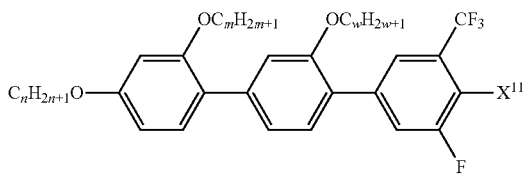
IGb-7
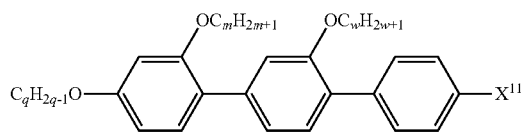
IGb-8
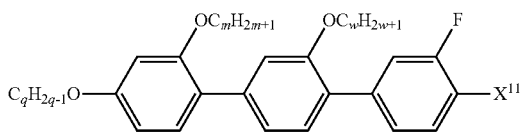
IGb-9
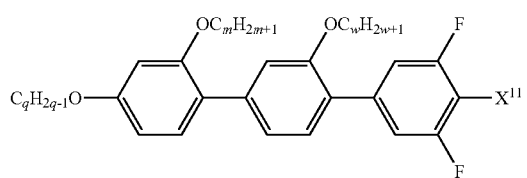
IGb-10
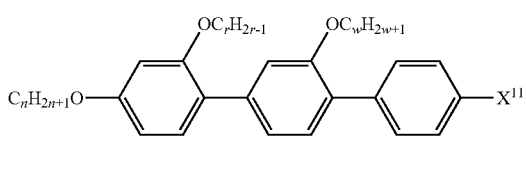
IGb-11
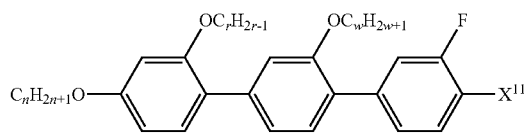
IGb-12
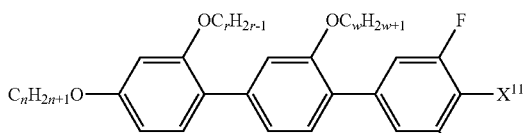
IGb-13
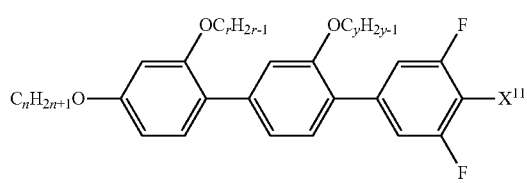
IGb-14
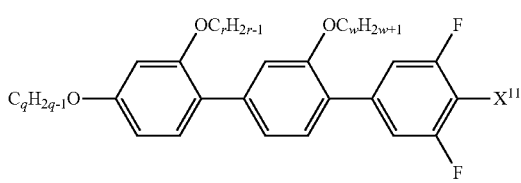
IGb-15
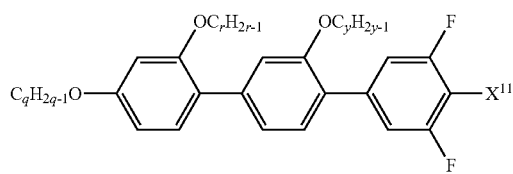
IGb-16
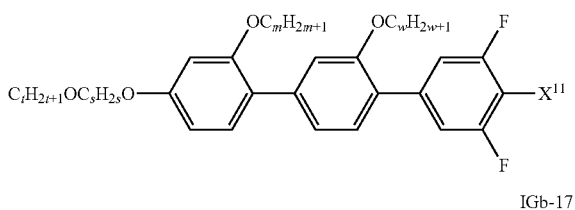
IGb-17
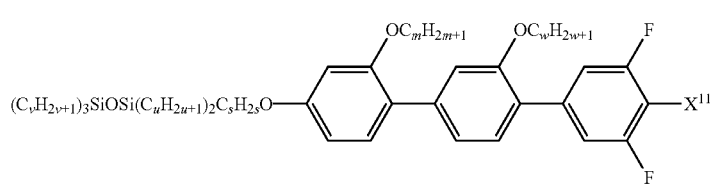
IGb-18
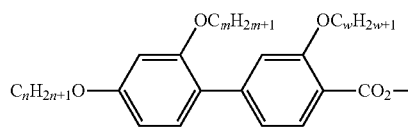
IGb-19
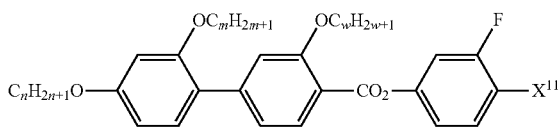

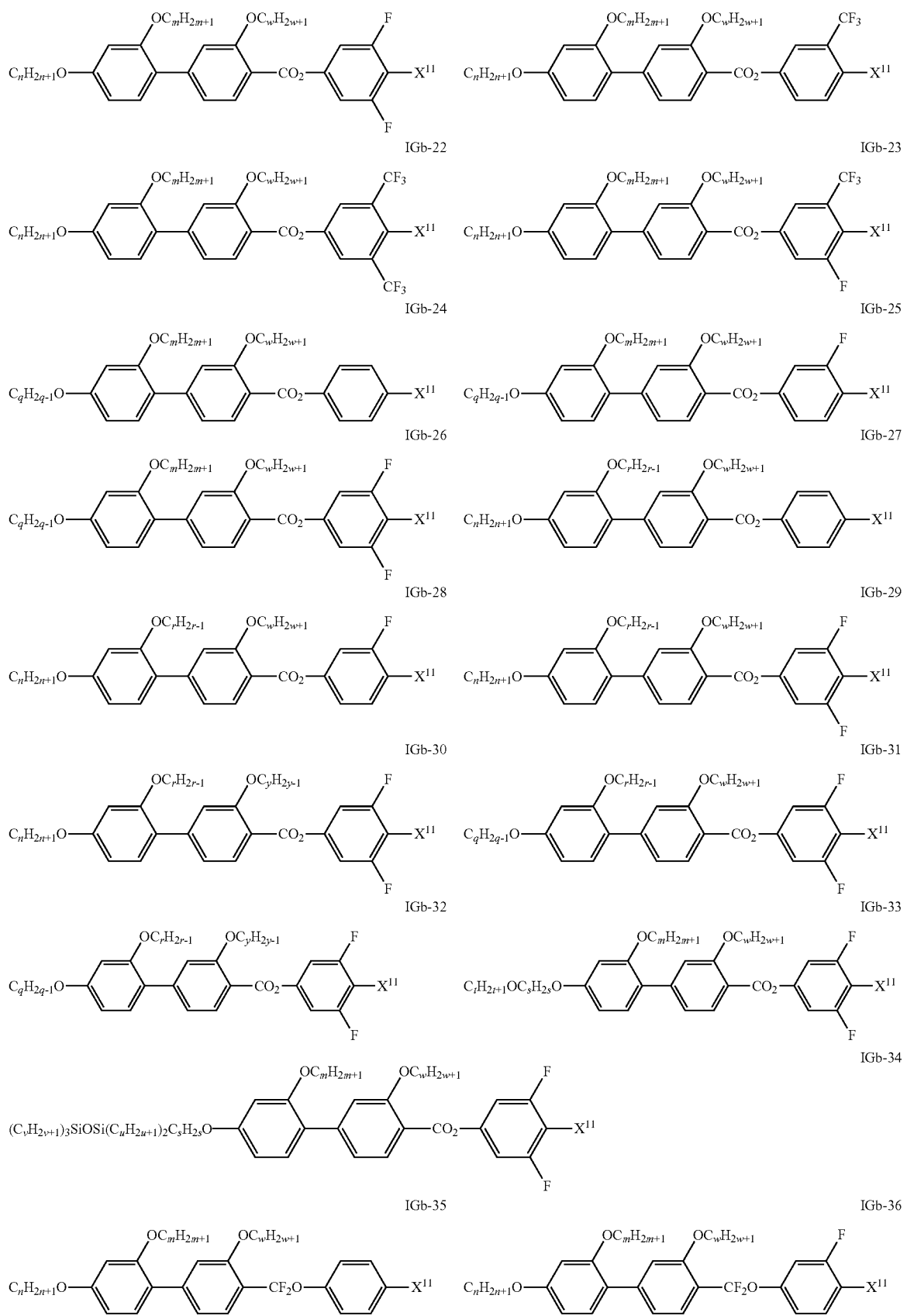

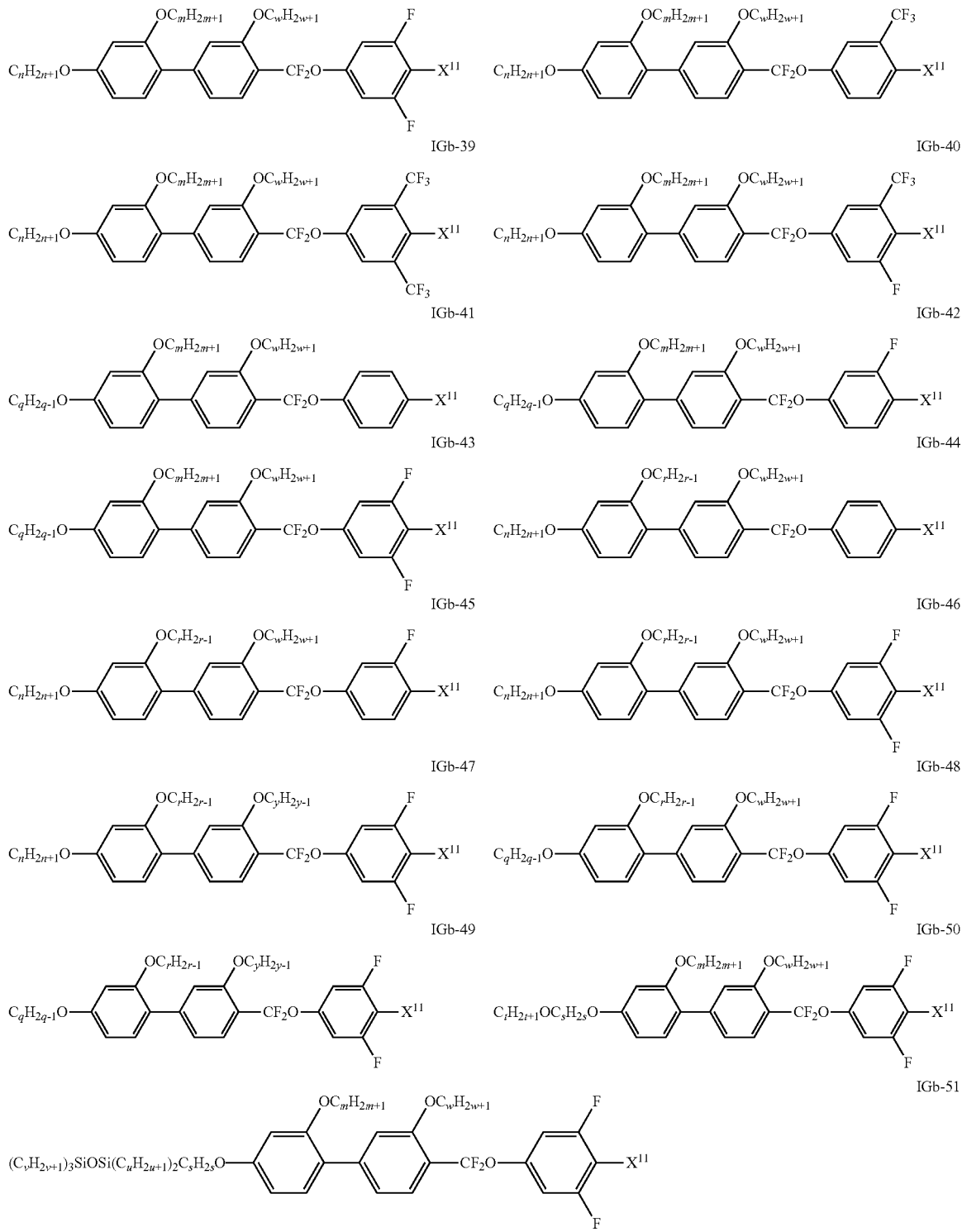

wherein m, n and w are independently of each other integers from 1 to 8, preferably 1, 2, 3, 4, 5 or 6; q, y and r are independently of each other integers from 2 to 8, preferably 3, 4, 5, 6; s and t are independently of each other 1, 2, 3, 4, preferably 2 or 3; u and v are independently of each other 1, 2, 3, 4, preferably 1 or 4; and $X^{11}$ is CN, NCS, $SF_5$, $SCF_3$, $SO_2CF_3$, $SO_2C_2F_5$, $SO_2C_4F_9$, F, $CF_3$, $CHF_2$, $C_2F_5$, —CH=$CF_2$, —CF=$CF_2$, —O—$CH_3$, —O—$C_2H_5$, —O—$C_3H_7$, —O-n-$C_4H_9$, —O-n-$C_5H_{11}$, O-n-$C_6H_{13}$, —O—$CF_3$, —O—$CHF_2$, —O—$C_2F_5$, —O—$C_3F_7$, —O-n-$C_4F_9$ with CN, $SO_2CF_3$, F, $CF_3$, —O—$CF_3$ being preferred. Preferably, $C_nH_{2n+1}O$, $C_mH_{2m+1}O$ and $C_wH_{2w+1}O$ represent independently of each other methoxy, ethoxy, propoxy, n-butoxy, n-pentoxy and n-hexoxy. Preferably, $C_yH_{2y-1}O$ and $C_rH_{2r-1}O$ represent —O—CH$_2$CH=CH$_2$, —O—(CH$_2$)$_2$CH=CH$_2$, —O—(CH$_2$)$_3$CH=CH$_2$, —O—(CH$_2$)$_2$CH=CH—CH$_3$. Preferably, —OC$_s$H$_{2s}$OC$_t$H$_{2t+1}$ represents CH$_3$OCH$_2$CH$_2$O— and CH$_3$CH$_2$OCH$_2$CH$_2$O—. Preferably, $(C_vH_{2v+1})_3SiOSi(C_uH_{2u+1})_2C_sH_{2s}O$ represents (CH$_3$)$_3$SiOSi(CH$_3$)$_2$CH$_2$CH$_2$O— and (CH$_3$)$_3$SiOSi(CH$_3$)$_2$CH$_2$CH$_2$CH$_2$O—. Particularly preferred are compounds of formulas IGb-1 to IGb-51 with $X^{11}$ being F, CF$_3$ or OCF$_3$, especially F.

The compounds of formula I are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the said reactions. Use can also be made here of variants which are known per se, but are not mentioned here in greater detail.

Compounds of formula I may be prepared according to the following schemes or variants thereof which will be easily recognized by the person skilled in the art:

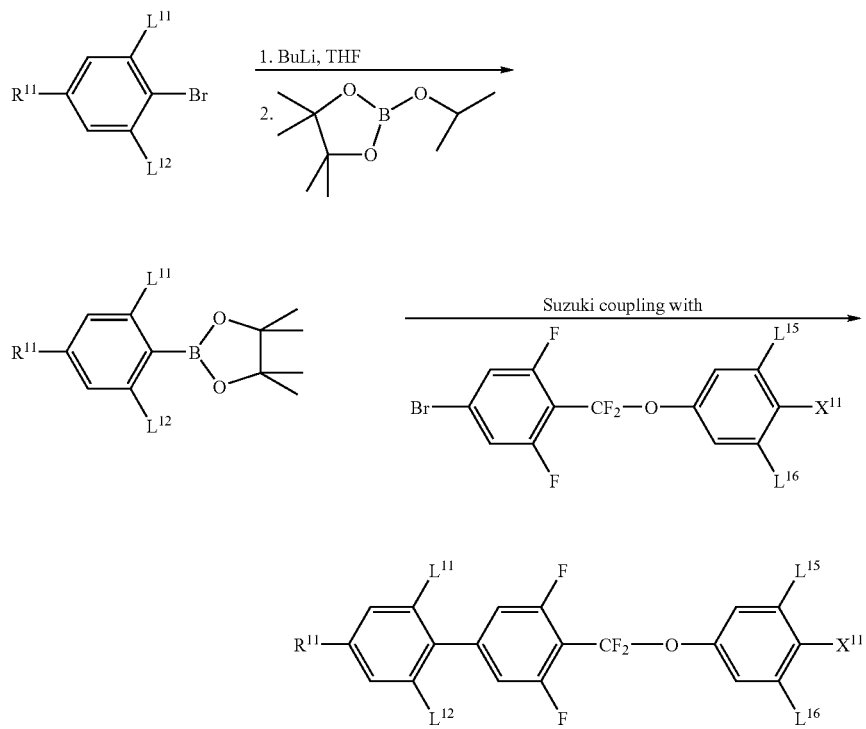

wherein $R^{11}, L^{11}, L^{12}, L^{15}, L^{16}, X^{11}$ have the same meaning as given above for general formula I. As it will be apparent to those skilled in the art, the synthesis as given in Scheme 1 may easily adapted for preparing other compounds of general formula I having a different substitution pattern.

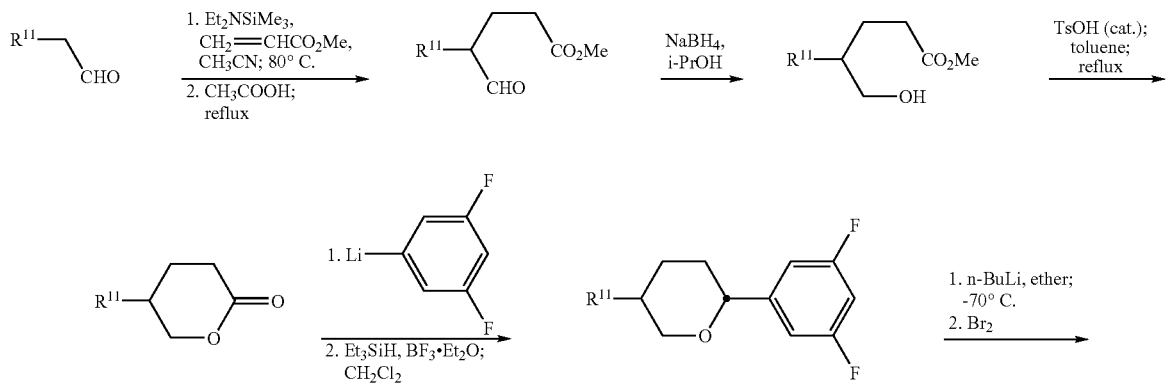

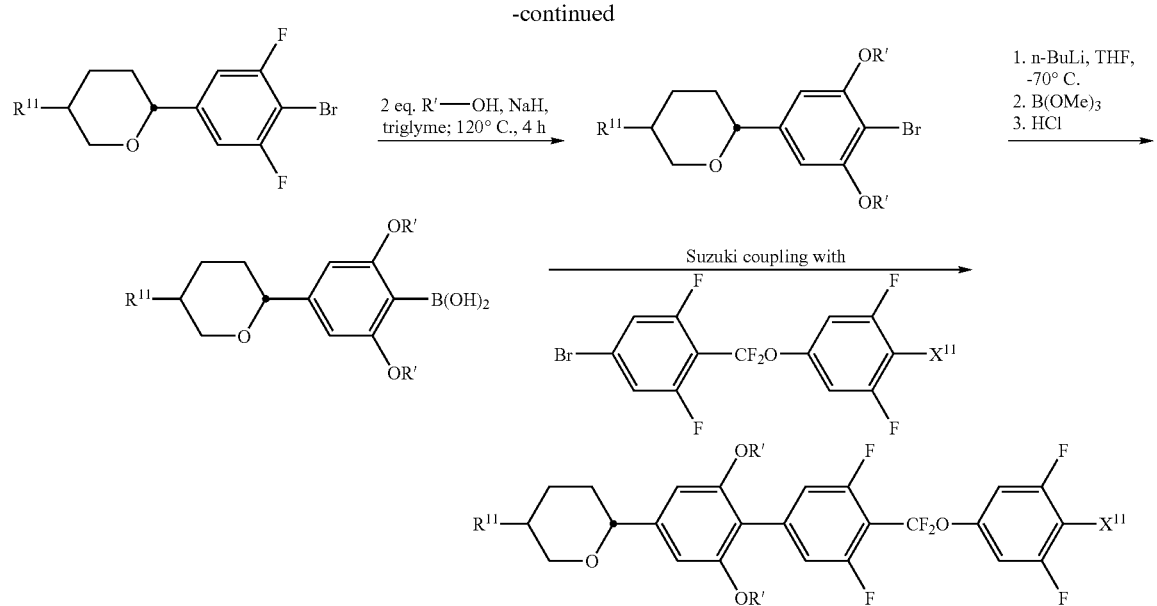

wherein $R^{11}$, $X^{11}$ have the same meaning as given above for general formula I and R' is an alkyl or alkenyl moiety optionally substituted with one or more halogen atoms. It should be noted that —OR' radicals having different meanings for R' can easily be introduced by stepwise reaction of

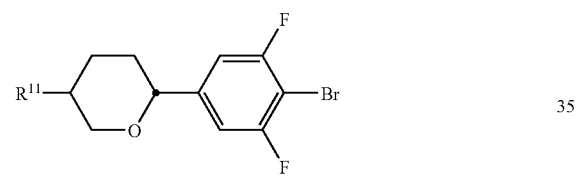

with (1) 1 equivalent of an alcohol $R'^a$—OH in the presence of NaH at a reaction temperature of about 80° C. and (2) 1 equivalent of a different alcohol $R'^b$—OH in the presence of NaH at a reaction temperature of about 120° C.

Scheme 3

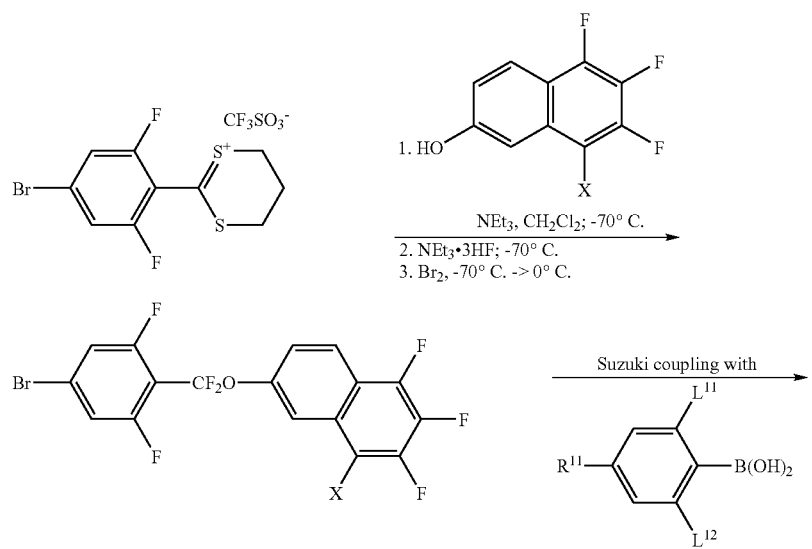

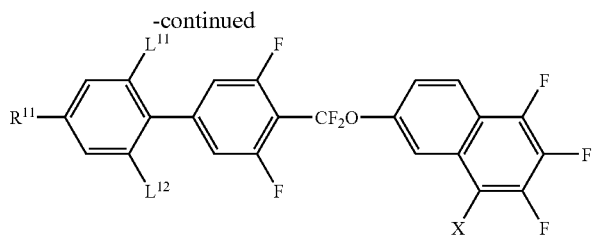

wherein $R^{11}$, $L^{11}$, $L^{12}$ have the same meaning as given above for general formula I and X is either H or F.

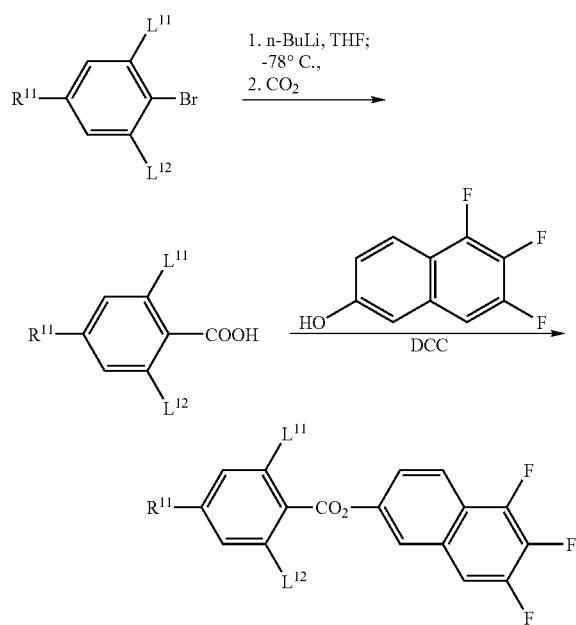

wherein $R^{11}$, $L^{11}$, $L^{12}$ have the same meaning as given above for general formula I.

Another subject of the present invention are liquid crystal media comprising at least one compound of formula I. Said media may further comprise from 2 to 40, in particular from 4 to 30, components as further constituents besides one or more compounds according to the invention. These media very particularly preferably comprise from 7 to 25 components besides one or more compounds according to the invention. These further constituents are preferably selected from nematic or nematogenic (monotropic or isotropic) substances, in particular substances from the classes of the azoxybenzenes, benzylideneanilines, biphenyls, terphenyls, phenyl or cyclohexyl benzoates, phenyl or cyclohexyl esters of cyclohexanecarboxylic acid, phenyl or cyclohexyl esters of cyclohexyl-benzoic acid, phenyl or cyclohexyl esters of cyclohexylcyclohexanecarboxylic acid, cyclohexylphenyl esters of benzoic acid, of cyclohexanecarboxylic acid or of cyclohexylcyclohexanecarboxylic acid, phenylcyclohexanes, cyclohexylbiphenyls, phenylcyclohexylcyclohexanes, cyclohexylcyclohexanes, cyclohexylcyclohexyl-cyclohexenes, 1,4-biscyclohexylbenzenes, 4,4'-biscyclohexylbiphenyls, phenyl- or cyclohexylpyrimidines, phenyl- or cyclohexylpyridines, phenyl- or cyclohexyl-dioxanes, phenyl- or cyclohexyltetrahydropyranes, phenyl- or cyclohexyl-1,3-dithianes, 1,2-diphenylethanes, 1,2-dicyclohexylethanes, 1-phenyl-2-cyclohexyl-ethanes, 1-cyclohexyl-2-(4-phenyl-cyclohexyl)ethanes, 1-cyclohexyl-2-biphenylyl-ethanes, 1-phenyl-2-cyclohexylphenylethanes, optionally halogenated stilbenes, benzyl phenyl ethers, tolans and substituted cinnamic acids. The 1,4-phenylene groups in these compounds may also be fluorinated.

The most important compounds suitable as further constituents of media according to the invention can be characterised by the formulae 1, 2, 3, 4 and 5:

| | |
|---|---|
| R'-L-E-R" | 1 |
| R'-L-COO-E-R" | 2 |
| R'-L-CF$_2$O-E-R" | 3 |
| R'-L-CH$_2$CH$_2$-E-R" | 4 |
| R'-L-C≡C-E-R" | 5 |

In the formulae 1, 2, 3, 4 and 5, L and E, which may be identical or different, are each, independently of one another, a divalent radical from the group formed by -Phe-, -Cyc-, -Phe-Phe-, -Phe-Cyc-, -Cyc-Cyc-, -Pyr-, -Dio-, -Py-, -Py-Phe-, -G-Phe- and -G-Cyc- and their mirror images, where Phe is unsubstituted or fluorine-substituted 1,4-phenylene, Cyc is trans-1,4-cyclohexylene or 1,4-cyclo-hexenylene, Pyr is pyrimidine-2,5-diyl or pyridine-2,5-diyl, Dio is 1,3-dioxane-2,5-diyl, G is 2-(trans-1,4-cyclohexyl)ethyl, Pyr pyrimidine-2,5-diyl, Pyd pyridine-2,5-diyl or Py a pyran ring.

One of the radicals L and E is preferably Cyc, Phe or Pyr. E is preferably Cyc, Phe or Phe-Cyc. The media according to the invention preferably comprise one or more components selected from the compounds of the formulae 1, 2, 3, 4 and 5 in which L and E are selected from the group consisting of Cyc, Phe, Py and Pyr and simultaneously one or more components selected from the compounds of the formulae 1, 2, 3, 4 and 5 in which one of the radicals L and E is selected from the group consisting of Cyc, Phe and Pyr and the other radical is selected from the group consisting of -Phe-Phe-, -Phe-Cyc-, -Cyc-Cyc-, -G-Phe- and -G-Cyc-, and optionally one or more components selected from the compounds of the formulae 1, 2, 3, 4 and 5 in which the radicals L and E are selected from the group consisting of -Phe-Cyc-, -Cyc-Cyc-, -G-Phe- and -G-Cyc-.

In a smaller sub-group of the compounds of the formulae 1, 2, 3, 4 and 5, R' and R" are each, independently of one another, alkyl, alkenyl, alkoxy, alkoxyalkyl, alkenyloxy or alkanoyloxy having up to 8 carbon atoms. This smaller sub-group is called group A below, and the compounds are referred to by the sub-formulae 1a, 2a, 3a, 4a and 5a. In most of these compounds, R' and R" are different from one another, one of these radicals usually being alkyl, alkenyl, alkoxy or alkoxyalkyl.

In another smaller sub-group of the compounds of the formulae 1, 2, 3, 4 and 5, which is known as group B, R" is —F, —Cl, —NCS, —(O)$_i$CH$_{3-(k+l)}$F$_k$Cl$_l$, —(SO$_p$)$_i$CH$_{3-(k+l)}$F$_k$Cl$_l$, where i is 0 or 1, p is 0 or 2, and k+l is 1, 2 or 3; the compounds in which R" has this meaning are referred to by the sub-formulae 1b, 2b, 3b, 4b and 5b. Particular preference is given to those compounds of the sub-formulae 1b, 2b, 3b, 4b and 5b in which R" is —F, —Cl, —NCS, —SCF$_3$, —SO$_2$CF$_3$, —CF$_3$, —OCHF$_2$ or —OCF$_3$.

In the compounds of the sub-formulae 1b, 2b, 3b, 4b and 5b, R' is as defined for the compounds of the sub-formulae 1a-5a and is preferably alkyl, alkenyl, alkoxy or alkoxyalkyl.

In a further smaller sub-group of the compounds of the formulae 1, 2, 3, 4 and 5, R" is —CN; this sub-group is referred to below as group C, and the compounds of this sub-group are correspondingly described by sub-formulae 1c, 2c, 3c, 4c and 5c. In the compounds of the sub-formulae 1c, 2c, 3c, 4c and 5c, R' is as defined for the compounds of the sub-formulae 1a-5a and is preferably alkyl, alkoxy or alkenyl.

Besides the preferred compounds of groups A, B and C, other compounds of the formulae 1, 2, 3, 4 and 5 having other variants of the proposed substituents are also customary. All these substances are obtainable by methods which are known from the literature or analogously thereto.

Besides the compounds of the formula I according to the invention, the media according to the invention preferably comprise one or more compounds selected from group A and/or group B and/or group C. The proportions by weight of the compounds from these groups in the media according to the invention are preferably group A: from 0 to 90%, preferably from 20 to 90%, in particular from 30 to 90% group B: from 0 to 80%, preferably from 10 to 80%, in particular from 10 to 65% group C: from 0 to 80%, preferably from 5 to 80%, in particular from 5 to 50%, where the sum of the proportions by weight of the group A and/or B and/or C compounds present in the respective media according to the invention is preferably from 5 to 90% and in particular from 10 to 90%.

The media according to the invention preferably comprise from 1 to 40%, particularly preferably from 5 to 30%, of the compounds according to the invention. Preference is furthermore given to media comprising more than 40%, in particular from 45 to 90%, of compounds according to the invention. The media preferably comprise three, four or five compounds according to the invention.

The media according to the invention are prepared in a manner conventional per se. In general, the components are dissolved in one another, advantageously at elevated temperature. By means of suitable additives, the liquid-crystalline phases in accordance with the invention can be modified in such a way that they can be used in all types of liquid crystal display elements that have been disclosed hitherto. Additives of this type are known to the person skilled in the art and are described in detail in the literature (H. Kelker/R. Hatz, Handbook of Liquid Crystals, Verlag Chemie, Weinheim, 1980). For example, pleochroic dyes can be added for the preparation of coloured guest-host systems or substances can be added in order to modify the dielectric anisotropy, the viscosity and/or the alignment of the nematic phases. Furthermore, stabilisers and antioxidants can be added.

The mixtures according to the invention are suitable for TN, STN, ECB and IPS applications, in particular for TFT applications. Hence, there use in an electro-optical device and an electro-optical device containing liquid crystal media comprising at least one compound according to the invention are subject matters of the present invention.

Another subject matter of the present invention is the use of compounds according to the invention in a mesogenic medium for use in an electro-optical device whereby said device is operated or operable in an optically isotropic state. The compounds of the invention are surprisingly found to be highly suitable for the respective use.

Electro-optical devices that are operated or operable in an optically isotropic state recently have become of interest with respect to video, TV, and multi-media applications. This is because conventional liquid crystal displays utilizing electro-optical effects based on the physical properties of liquid crystals exhibit a rather high switching time which is undesired for said applications. Further most of the conventional displays show a significant viewing angle dependence of contrast that in turn makes necessary measures to compensate this undesired property.

With regard to devices utilizing electro-optical effects in an isotropic state the German Patent Application DE 102 17 273 A1 discloses light controlling (light modulation) elements in which the mesogenic controlling medium for modulation is in the isotropic phase at the operating temperature. These light controlling elements have a very short switching time and a good viewing angle dependence of contrast. However, the driving or operating voltages of said elements are very often unsuitably high for some applications.

German Patent Application DE 102 41 301.0 yet unpublished describes specific structures of electrodes allowing a significant reduction of the driving voltages. However, these electrodes make the process of manufacturing the light controlling elements more complicated.

Furthermore, the light controlling elements disclosed in both DE 102 17 273 A1 and DE 102 41 301.0 show a significant temperature dependence. The electro-optical effect that can be induced by the electrical field in the controlling medium being in the isotropic state is most pronounced at temperatures close to the clearing point of the controlling medium. In this range the light controlling elements have the lowest values of their characteristic voltages and, thus, require the lowest operating voltages. As temperature increases the characteristic voltages and hence the operating voltages increase remarkably.

Typical values of the temperature dependence are in the range from about a few volts per centigrade up to about ten or more volts per centigrade. While DE 102 41 301.0 describes various structures of electrodes for devices operable or operated in the isotropic state, DE 102 17 273 A1 discloses isotropic media of varying composition that are useful in light controlling elements operable or operated in the isotropic state. The relative temperature dependence of the threshold voltage in these light controlling elements is at a temperature of 1 centigrade above the clearing point in the range of about 50%/centigrade. That temperature dependence decreases with increasing temperature so that it is at a temperature of 5 centigrade above the clearing point of about 10%/centigrade. However, for many practical applications of displays utilizing said light controlling elements the temperature dependence of the electro-optical effect is too high. To the contrary, for practical uses it is desired that the operating voltages are independent from the operating temperature over a temperature range of at least some centigrades, preferably of about 5 centigrades or more, even more preferably of about 10 centigrades or more and especially of about 20 centigrades or more.

Now it has been found that the use of the compounds of general formula I in mesogenic media useful as controlling media in the light controlling elements as described above and in DE 102 17 273 A1, DE 102 41 301.0 and DE 102 536

06.6 broadens significantly the temperature range in which the operating voltages of said electro-optical devices operable or operated in the optically isotropic state are almost completely or completely independent from the operating temperature. In the context of the present invention the term "optically isotropic state" or "optically isotropic phase" refers to a phase, which exhibits essentially no transmission of light in the visible region of wavelengths in an electro-optical cell having a cell thickness usual for liquid crystal displays of about 10 μm or less when observed between two crossed polarisers.

This effect is even more distinct if the mesogenic controlling media exhibit at least one so-called "blue phase" as described in yet unpublished DE 103 13 979.6. Liquid crystals having an extremely high chiral twist may have one or more optically isotropic phases. If they have a respective cholesteric pitch, these phases might appear bluish in a cell having a sufficiently large cell gap. Those phases are therefore also called "blue phases" (Gray and Goodby, "Smectic Liquid Crystals, Textures and Structures", Leonhard Hill, USA, Canada (1984)). Effects of electrical fields on liquid crystals existing in a blue phase are described for instance in H. S. Kitzerow, "The Effect of Electric Fields on Blue Phases", Mol. Cryst. Liq. Cryst. (1991), Vol. 202, p. 51-83, as well as the three types of blue phases identified so far, namely BP I, BP II, and BP III, that may be observed in field-free liquid crystals. It is noteworthy, that if the liquid crystal exhibiting a blue phase or blue phases is subjected to an electrical field, further blue phases or other phases different from the blue phases I, II and III might appear.

The compounds of formula I can be included in one of the components of the controlling medium of an electro-optical light controlling element said element comprises
- one or more, especially two substrates;
- an assembly of electrodes;
- one or more elements for polarizing the light; and
- said controlling medium;

whereby said light controlling element is operated (or operable) by a temperature at which the controlling medium is in an optically isotropic phase when it is in a non-driven state and said controlling medium has at least one blue phase and/or is a mesogenic medium and comprises besides a chiral component (A) an achiral component (B). If the compound of formula I included in the controlling medium is chiral, it is comprised in chiral component (A). If the compound of formula I is achiral, which is preferred, it is comprised in achiral component (B). Preferably component (B) comprises additionally one or more further achiral compounds. It is also preferred that the mesogenic medium is in one of its blue phases at the operating temperature.

The chiral component (A) induces usually a pitch of less than about 400 nm. The chiral component (A) comprises one or more chiral compounds which have a mesogenic structure und exhibit preferably one or more mesophases themselves, particularly at least one cholesteric phase. Preferred chiral compounds being comprised in the chiral component (A) are, inter alia, well known chiral dopants like cholesteryl-nonanoate, R/S-811, R/S-1001, R/S-2001, R/S-3001, R/S-4001, B(OC)2C*H—C-3 or CB-15 (Merck KGaA, Darmstadt, Germany). Preferred are chiral dopants having one or more chiral moieties and one or more mesogenic groups or having one or more aromatic or alicyclic moieties forming, together with the chiral moiety, a mesogenic group. More preferred are chiral moieties and mesogenic chiral compounds disclosed in DE 34 25 503, DE 35 34 777, DE 35 34 778, DE 35 34 779, DE 35 34 780, DE 43 42 280, EP 01 038 941 and DE 195 41 820 that disclosure is incorporated herewithin by way of reference. Particular preference is given to chiral binaphthyl derivatives as disclosed in EP 01 111 954.2, chiral binaphtol derivatives as disclosed in WO 02/34739, chiral TADDOL derivatives as disclosed in WO 02/06265 as well as chiral dopants having at least one fluorinated linker and one end chiral moiety or one central chiral moiety as disclosed in WO 02/06196 and WO 02/06195. Furthermore, chiral component (A) may also comprise a chiral compound of formula I.

The controlling medium comprising at least one compound of formula I has a characteristic temperature, preferably a clearing point, in the range from about −30° C. to about 80° C., especially up to about 55° C.

The operating temperature of the light controlling elements is preferably above the characteristic temperature of the controlling medium said temperature being usually the transition temperature of the controlling medium to the blue phase; generally the operating temperature is in the range of about 0.1° to about 50°, preferably in the range of about 0.1° to about 10° above said characteristic temperature. It is highly preferred that the operating temperature is in the range from the transition temperature of the controlling medium to the blue phase up to the transition temperature of the controlling medium to the isotropic phase which is the clearing point. The light controlling elements, however, may also be operated at temperatures at which the controlling medium is in the isotropic phase.

(For the purposes of the present invention the term "characteristic temperature" is defined as follows:

If the characteristic voltage as a function of temperature has a minimum, the temperature at this minimum is denoted as characteristic temperature;

If the characteristic voltage as a function of temperature has no minimum and if the controlling medium has one or more blue phases, the transistion temperature to the blue phase is denoted as characteristic temperature; in case there are more than one blue phase, the lowest transition temperature to a blue phase is denoted as characteristic temperature;

If the characteristic voltage as a function of temperature has no minimum and if the controlling medium has no blue phase, the transistion temperature to the isotropic phase is denoted as characteristic temperature.

In this context the term "characteristic voltage" refers to a specific voltage, e.g. the threshold voltage $V_{10}$ at which a light transmission of 10% is observed or the saturation voltage $V_{90}$ at which a transmission of 90% is observed)

The achiral component (B) of the mesogenic controlling medium with preferably positive dielectric anisotropy comprising at least one compound of general formula I may include
- a component (B-A) consisting of one or more compounds having a very large positive dielectric anisotropy of +30 or more;
- optionally a component (B-B) consisting of one or more compounds having a large positive dielectric anisotropy in the range from about +10 to about ≦30;
- optionally a component (B-C) consisting of one or more compounds having a moderately positive dielectric anisotropy in the range from about >1.5 to about <10;
- optionally a component (B-D) consisting of one or more dielectrically neutral compounds having a dielectric anisotropy in the range from about −1.5 to about +1.5; and
- optionally a component (B-E) consisting of one or more compounds having a negative dielectric anisotropy of less than about −1.5.

It is preferred that component (B-A) comprises one or more compounds of formula I especially those in which at least one of $R^{11}$, $L^{11}$ and $L^{12}$ denotes an alkoxy or alkenyloxy or —O-alkylene-O-alkyl radical. Usually, compounds of formula I are contained in the mesogenic controlling medium in an amount from about 1% to about 60%, preferably from about 2% to about 40%, more preferably from about 2.5% to 25%. However, different amounts may also be used depending on specific requirements.

In the context of the present invention the term "alkyl" means—as long as it is not defined in a different manner elsewhere in this description or in the claims—straight-chain and branched hydrocarbon (aliphatic) radicals with 1 to 15 carbon atoms. The hydrocarbon radicals may be unsubstituted or substituted with one or more substituents being independently selected from the group consisting of F, Cl, Br, I or CN.

The subclass of "alkyl" containing aliphatic saturated radicals may also be designated as "alkanyl". Furthermore, "alkyl" is also meant to comprise unsubstituted or likewise substituted hydrocarbon radicals in which one or more of the $CH_2$ (methylene) groups are such replaced by —O— ("alkoxy", "oxaalkyl"), —S— ("thioalkyl"), —CH=CH— ("alkenyl"), —C≡C— ("alkinyl"), —CO—O— or —O—CO— that there are no adjacent hetero atoms (O, S). Preferably, alkyl is a straight-chain or branched saturated hydrocarbon having 1, 2, 3, 4, 5, 6, 7 or 8 carbon atoms and being unsubstituted or mono- or poly-substituted with F. In this context the term "perfluoroalkyl" means an alkyl moiety in which all hydrogen atoms are replaced by fluorine atoms. More preferably, alkyl is meant to be methyl, ethyl, n-propyl, i-propyl, n-butyl, i-butyl, t-butyl, n-pentyl, neopentyl, n-hexyl, n-heptyl, n-octyl; $CF_3$, $CHF_2$, $CH_2F$; $CF_2CF_3$. Most preferably, alkyl is a straight-chain hydrocarbon of up to 8 carbon atoms.

Since one or more $CH_2$ groups of an alkyl radical may be replaced by —O— as described above, the term "alkyl" also comprises "alkoxy" and "oxaalkyl" moieties. "Alkoxy" means "O-alkyl" in which the oxygen atom is directly linked to the group or ring being substituted with alkoxy and alkyl is defined as above. In particular, "alkyl" in "O-alkyl" means methyl, ethyl, n-propyl, i-propyl, n-butyl, i-butyl, t-butyl, n-pentyl, neopentyl, n-hexyl, n-heptyl or n-octyl, whereby alkyl is optionally substituted with F. It is highly preferred that alkoxy comprises methoxy, ethoxy, propoxy, butoxy, pentoxy, hexoxy, heptoxy and octoxy that all may be substituted with one or more F atoms. Most preferably, alkoxy is —$OCH_3$, —$OC_2H_5$, —O-n-$C_3H_7$, —O-n-$C_4H_9$, —O-t-$C_4H_9$, —$OCF_3$, —$OCHF_2$, —OCHF or —$OCHFCHF_2$.

In the context of the present invention the term "oxaalkyl" comprises alkyl moieties in which at least one non-terminal $CH_2$ group is replaced by O in such a way that there are no adjacent oxygen atoms. Preferably, oxaalkyl comprises straight-chain radicals of the formula $C_tH_{2t+1}$—O—$(CH_2)_u$— in which t and u are independently of each other 1, 2, 3, 4, 5 or 6; especially t is 1 or 2 and u is an integer from 1 to 6.

The term "—O-alkylene-O-alkyl" is meant to comprise an alkyl moiety in which a first oxygen atom is directly linked to the atom, group and ring, respectively, that is substituted with —O-alkylene-O-alkyl, and in which said first oxygen atom is linked to an O-alkyl group via an alkylene linker, i.e. an divalent aliphatic hydrocarbon moiety such as —$CH_2$—, —$CH_2$—$CH_2$—, —$CH_2$—$CH_2$—$CH_2$— or —$CH_2$—$CH_2$—$CH_2$—$CH_2$—.

If one or more of the methylene groups of alkyl are replaced by sulphur a "thioalkyl" radical is obtained. Thioalkyl comprises alkyl moieties in which at least one terminal or non-terminal $CH_2$ group is replaced by S (sulphur) in such a way that there are no adjacent sulphur atoms. Preferably, thioalkyl comprises straight-chain radicals of the formula $C_tH_{2t+1}$—S—$(CH_2)_u$— in which t is 1, 2, 3, 4, 5 or 6 and u is 0, 1, 2, 3, 4, 5 or 6; especially t is 1 or 2 and u is zero or an integer from 1 to 6.

In the context of the present invention the term "alkenyl" means an alkyl radical in which one or more —CH=CH— moieties are present. When two —CH=CH— moieties are present the radical may also be designated as "alkadienyl". An alkenyl radical may comprise 2 to 15 carbon atoms and may be straight-chain or branched. It can be unsubstituted or mono- or polysubstituted with F, Cl, Br, I or CN; one or more of its $CH_2$ groups may be replaced independently of each other by —O—, —S—, —C≡C—, —CO—O—, —OC—O— such that there are no hetero atoms adjacent to each other. If the alkenyl CH=CH moiety is not a terminal $CH_2$=CH— group it may exist in two configurations, namely the E-isomer and the Z-isomer. In general, the E-isomer (trans) is preferred. Preferably, alkenyl contains 2, 3, 4, 5, 6 or 7 carbon atoms and means vinyl, 1E-propenyl, 1E-butenyl, 1E-pentenyl, 1E-hexenyl, 1E-heptenyl, 2-propenyl, 2E-butenyl, 2E-pentenyl, 2E-hexenyl, 2E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl and 6-heptenyl. More preferred alkenyl is vinyl, 1E-propenyl, 3E-butenyl.

In the context of the present invention the term "alkenyloxy" means an "—O-alkenyl" radical in which an alkenyl moiety that is as defined above is linked to an atom, group or ring to be substituted via an oxygen atom; one or more of the hydrogen atoms of the alkenyl moiety may be replaced by halogen, preferably fluorine. It is preferred that the carbon-carbon double bond of the alkenyloxy radical is a terminal double bond. Alkenyloxy may have 2 to 15 carbon atoms, preferably 2 to 10 carbon atoms and more preferably 3, 4, 5, 6, 7 or 8 carbon atoms. Preferably; alkenyloxy is —O—$CH_2CH$=$CH_2$, O—$CH_2CH_2CH$=$CH_2$, O—$CH_2CH_2CH_2CH$=$CH_2$ or O—$CH_2CH$=$CH$—$CH_3$.

In the case one or more $CH_2$ alkyl groups are replaced by —C≡C— an alkinyl radical is obtained. Also the replacement of one or more $CH_2$ alkyl groups by —CO—O— or —O—CO— is possible. The following of these radicals are preferred: acetyloxy, propionyloxy, butyryloxy, pentanoyloxy, hexanoyloxy, acetyloxymethyl, propionyloxymethyl, butyryloxymethyl, pentanoyloxymethyl, 2-acetyloxyethyl, 2-propionyloxyethyl, 2-butyryloxyethyl, 2-acetyloxypropyl, 3-propionyloxypropyl, 4-acetyloxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)-ethyl, 3-(methoxycarbonyl)-propyl, 3-(ethoxy-carbonyl)-propyl or 4-(methoxycarbonyl)-butyl.

Compounds of the formula I containing branched wing groups $R^{11}$, $L^{11}$, $L^{12}$, $L^{13}$, $L^{14}$, $Y^{11}$, $Y^{12}$, $Y^{13}$ and/or $Y^{14}$ may occasionally be of importance owing to better solubility in the conventional liquid-crystalline base materials, but in particular as chiral dopants if they are optically active. Smectic compounds of this type are suitable as components of ferroelectric materials.

It goes without saying that if a compound of formula I contains one or more asymmetric centers within the molecule the compound might be present as one of the possible stereoisomers in stereochemically pure form or as mixture of two or more stereoisomers in any possible ratio.

In the context of the present invention halogen denotes F, Cl, Br and/or I, preferably F.

C denotes a crystalline phase, S a smectic phase, $S_C$ a smectic C phase, $S_B$ a smectic B phase, N a nematic phase and I the isotropic phase.

$V_{xx}$ denotes the voltage for xx % transmission (viewing angle perpendicular to the plate surface), e.g. $V_{10}$ denotes the voltage at for 10% transmission. $t_{on}$ denotes the switch-on time and $t_{off}$ the switch-off time at an operating voltage corresponding to the value of $V_{100}$. $\Delta n$ denotes the optical anisotropy and $n_o$ the refractive index. $\Delta \epsilon$ denotes the dielectric anisotropy ($\Delta \epsilon = \epsilon_\| - \epsilon_\bot$, where $\epsilon_\|$ denotes the dielectric constant parallel to the longitudinal molecular axes and $\epsilon_{195}$ denotes the dielectric constant perpendicular thereto). All physical properties have been and are determined according to "Merck Liquid Crystals, Physical Properties of Liquid Crystals", Status November 1997, Merck KGaA, Germany and are given for a temperature of 20° C., unless explicitly stated otherwise. The optical anisotropy ($\Delta n$) is determined at a wavelength of 589.3 nm. The dielectric anisotropy ($\Delta \epsilon$) is determined at a frequency of 1 kHz. The threshold voltages, as well as all other electro-optical properties have been determined with test cells prepared at Merck KGaA, Germany. The test cells for the determination of $\Delta \epsilon$ had a cell gap of 22 μm. The electrode was a circular ITO electrode with an area of 1.13 cm² and a guard ring. The orientation layers were lecithin for homeotropic orientation ($\epsilon_\|$) and polyimide AL-1054 from Japan Synthetic Rubber for homogeneuous orientation ($\epsilon_\bot$). The capacities were determined with a frequency response analyser Solatron 1260 using a sine wave with a voltage of 0.3 $V_{rms}$. The light used in the electro-optical measurements was white light. The set up used was a commercially available equipment of Otsuka, Japan. The characteristic voltages have been determined under perpendicular observation. The threshold ($V_{10}$)—mid grey ($V_{50}$)—and saturation ($V_{90}$) voltages have been determined for 10%, 50% and 90% relative contrast, respectively.

In the present application and in the examples below, the structures of the liquid crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n and m carbon atoms respectively; n and m are in each case, independently of one another, 1, 2, 3, 4, 5, 6, 7, 8, 9, 10, 11, 12, 13, 14 or 15. The coding in Table B is self-evident. In Table A, only the acronym for the parent structure is indicated. In individual cases, the acronym for the parent structure is followed, separated by a dash, by a code for the substituents $R^1$, $R^2$, $L^1$ and $L^2$:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | H | F |
| nN.F.F | $C_nH_{2n+1}$ | CN | F | F |
| nF | $C_nH_{2n+1}$ | F | H | H |
| nF.F | $C_nH_{2n+1}$ | F | H | F |
| nF.F.F | $C_nH_{2n+1}$ | F | F | F |
| nOF | $OC_nH_{2n+1}$ | F | H | H |
| nCl | $C_nH_{2n+1}$ | Cl | H | H |
| nCl.F | $C_nH_{2n+1}$ | Cl | H | F |
| nCl.F.F | $C_nH_{2n+1}$ | Cl | F | F |
| nCF₃ | $C_nH_{2n+1}$ | CF₃ | H | H |

-continued

| Code for $R^1$, $R^2$, $L^1$, $L^2$ | $R^1$ | $R^2$ | $L^1$ | $L^2$ |
|---|---|---|---|---|
| nOCF₃ | $C_nH_{2n+1}$ | OCF₃ | H | H |
| nOCF₃.F | $C_nH_{2n+1}$ | OCF₃ | H | F |
| nOCF₃.F.F | $C_nH_{2n+1}$ | OCF₃ | F | F |
| nOCF₂ | $C_nH_{2n+1}$ | OCHF₂ | H | H |
| nOCF₂.F | $C_nH_{2n+1}$ | OCHF₂ | H | F |
| nOCF₂.F.F | $C_nH_{2n+1}$ | OCHF₂ | F | F |
| nS | $C_nH_{2n+1}$ | NCS | H | H |
| nS.F | $C_nH_{2n+1}$ | NCS | H | F |
| nS.F.F | $C_nH_{2n+1}$ | NCS | F | F |
| rVsN | $C_rH_{2r+1}$—CH=CH—$C_sH_{2s}$— | CN | H | H |
| rEsN | $C_rH_{2r+1}$—O—$C_sH_{2s}$— | CN | H | H |
| nAm | $C_nH_{2n+1}$ | $COOC_mH_{2m+1}$ | H | H |
| nF.Cl | $C_nH_{2n+1}$ | Cl | H | F |

TABLE A

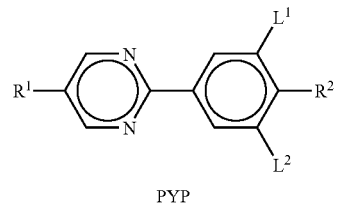

PYP

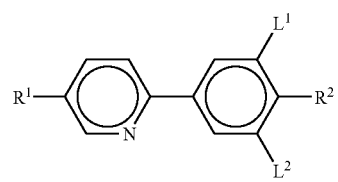

PYRP

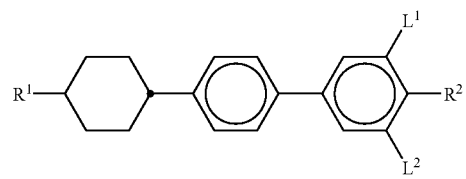

BCH

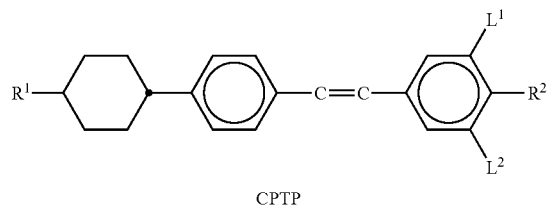

CPTP

TABLE A-continued
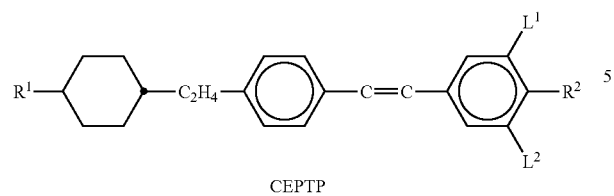
CEPTP
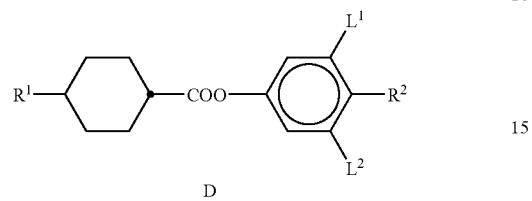
D
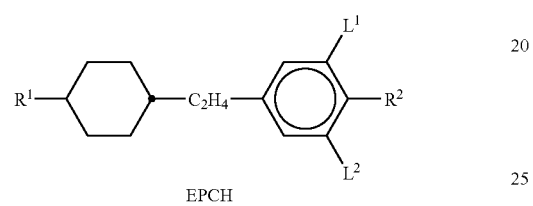
EPCH
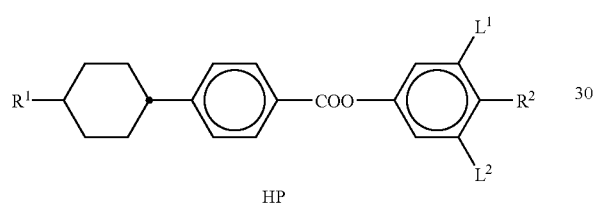
HP
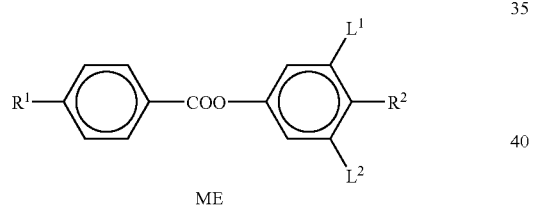
ME
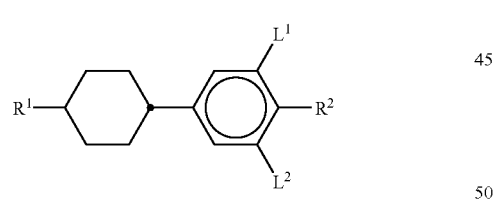
PCH
TABLE A-continued
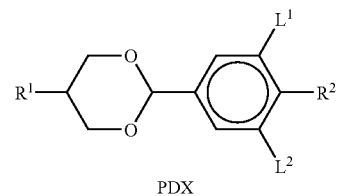
PDX
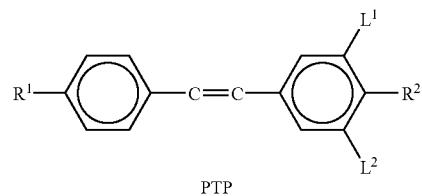
PTP
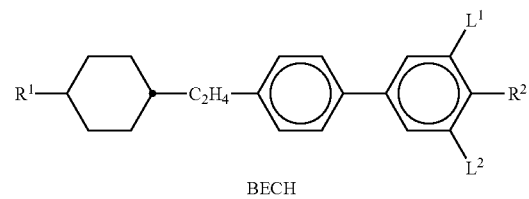
BECH
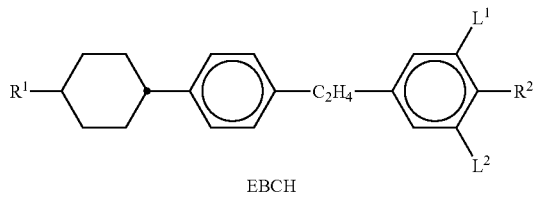
EBCH
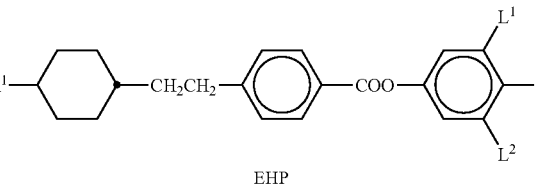
EHP
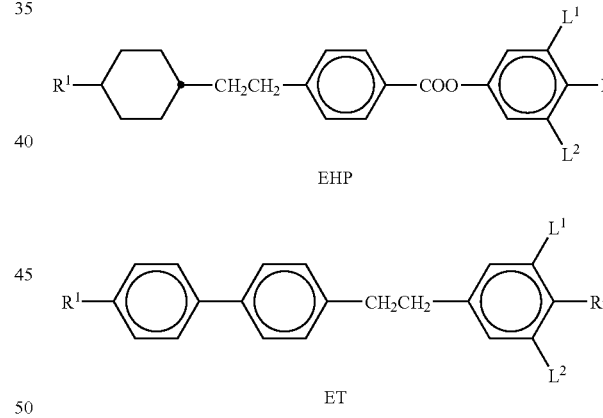
ET
TABLE B
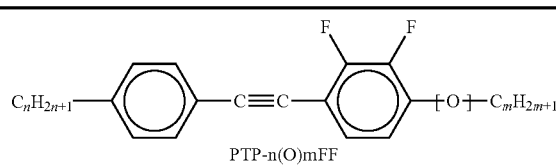
PTP-n(O)mFF
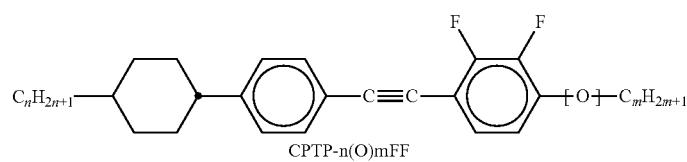
CPTP-n(O)mFF TABLE B-continued
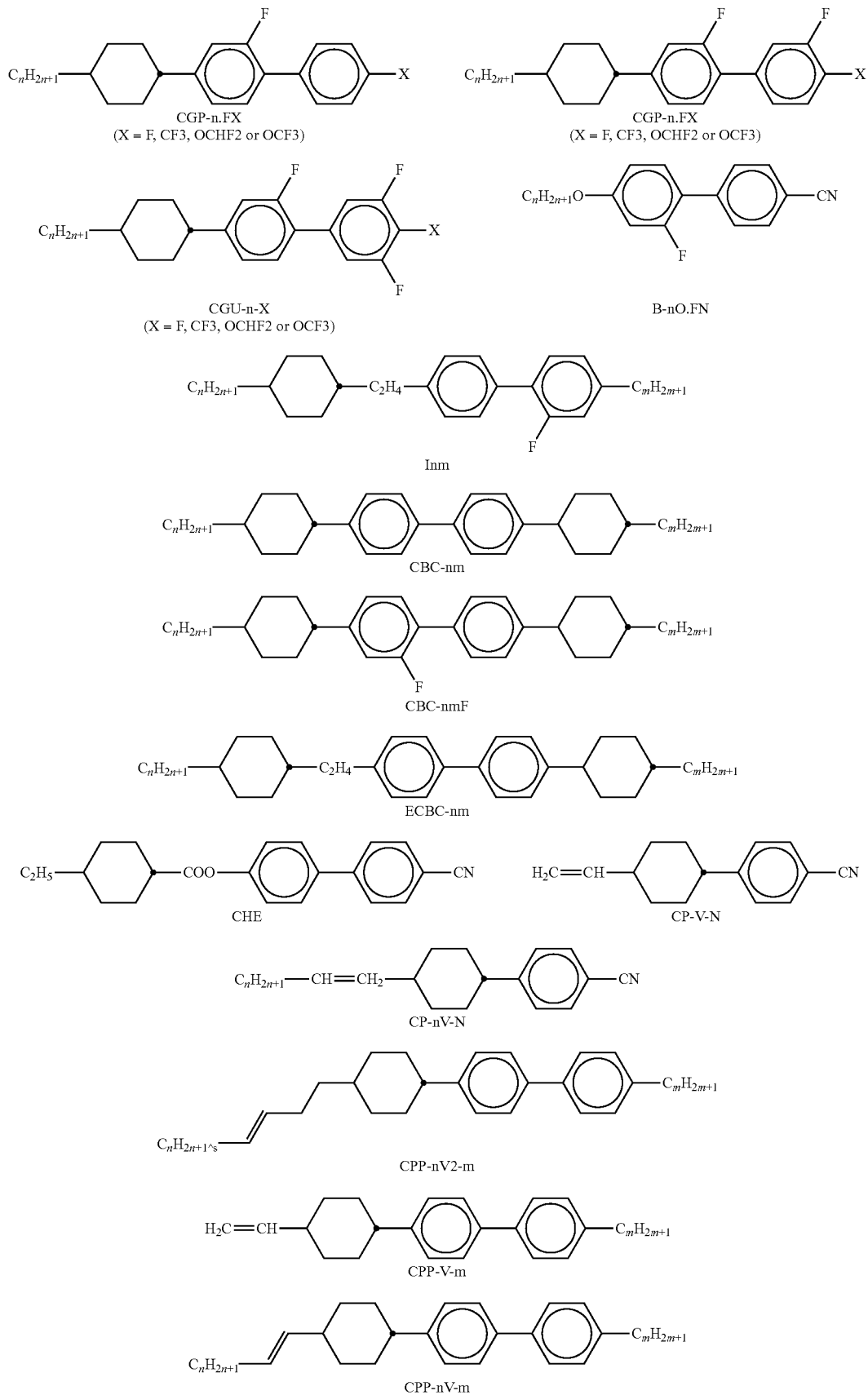

TABLE B-continued
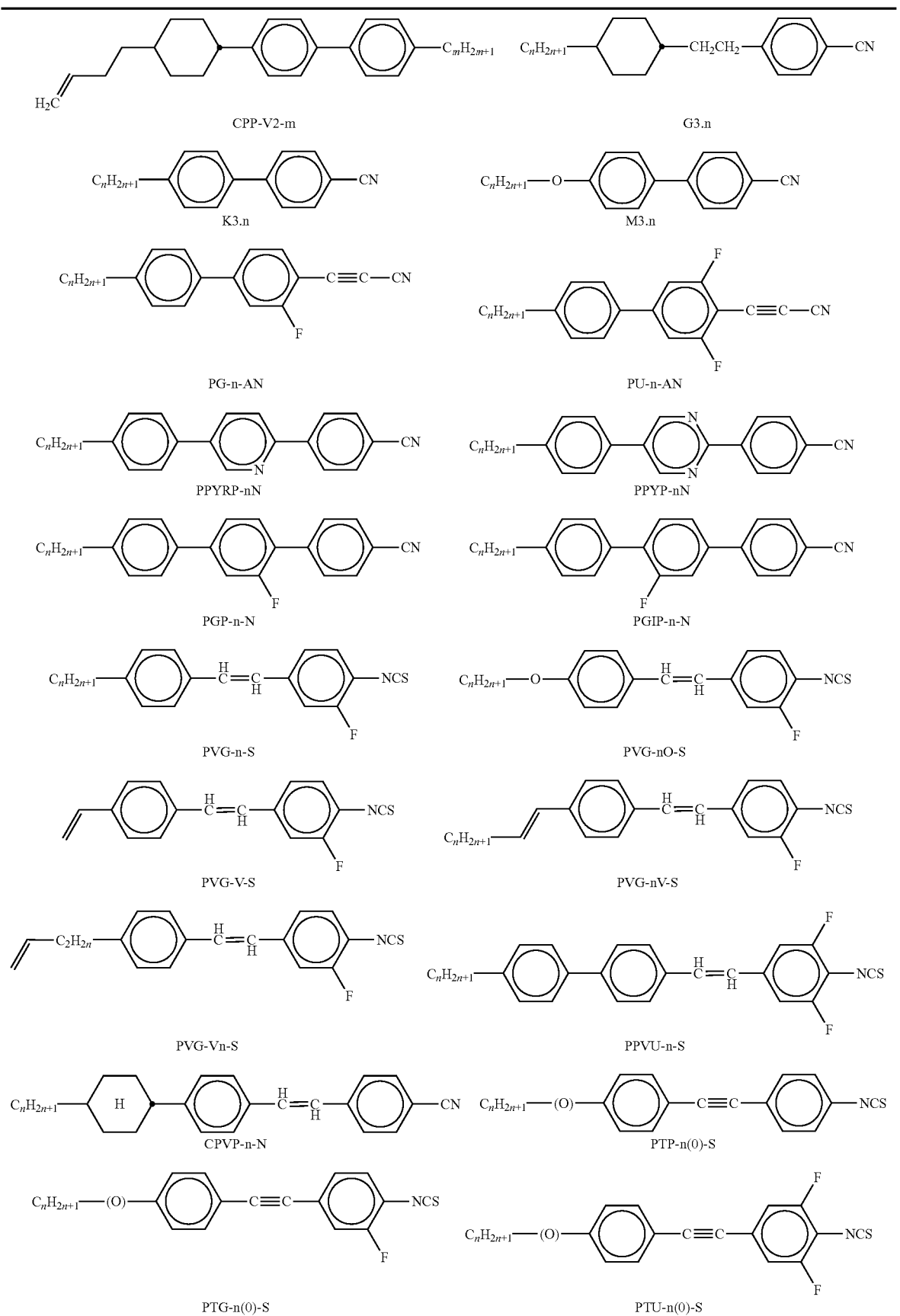

TABLE B-continued
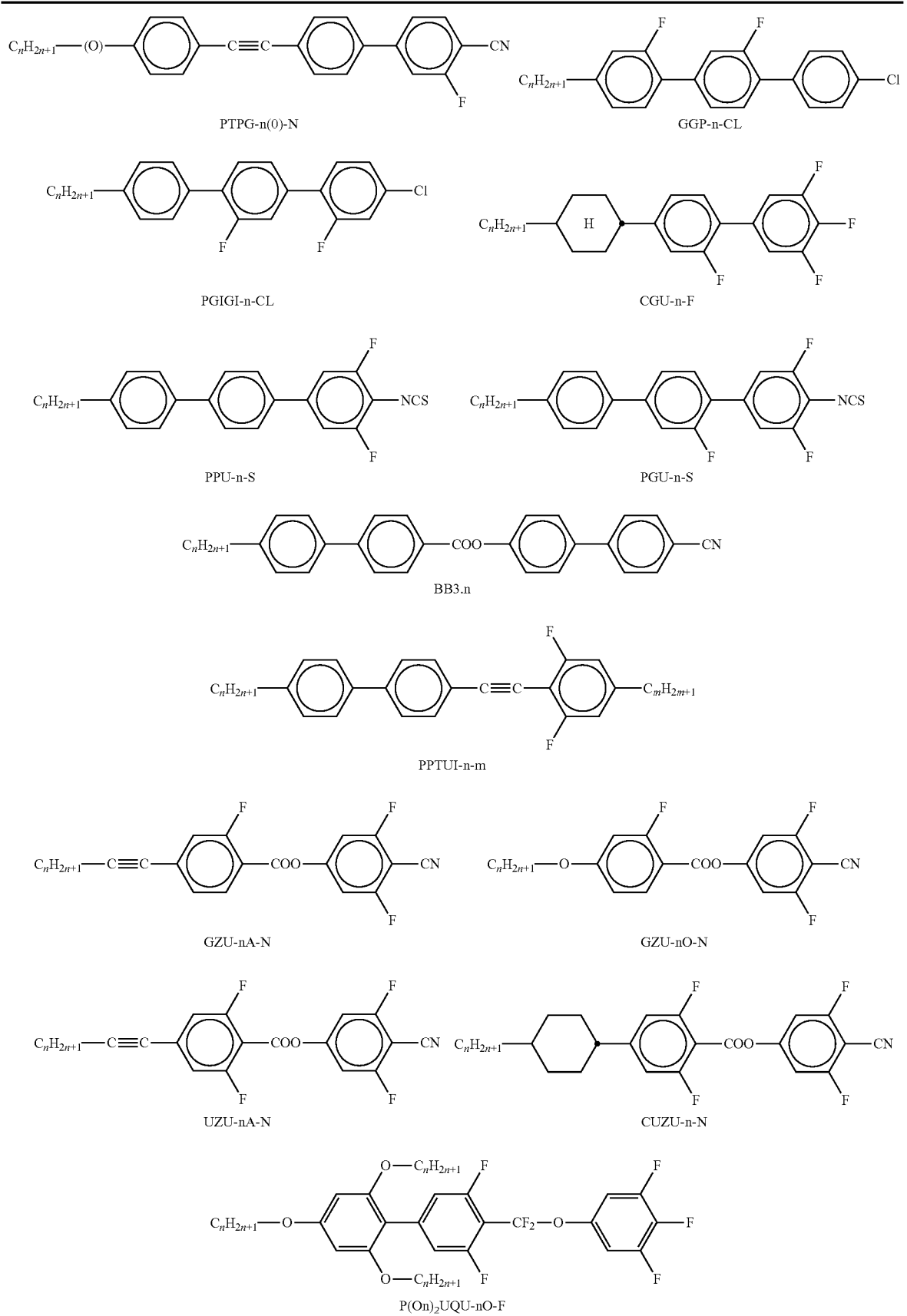

TABLE B-continued
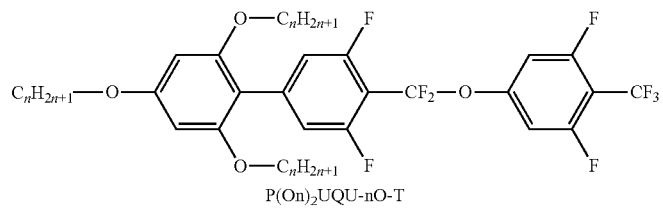
P(On)₂UQU-nO-T
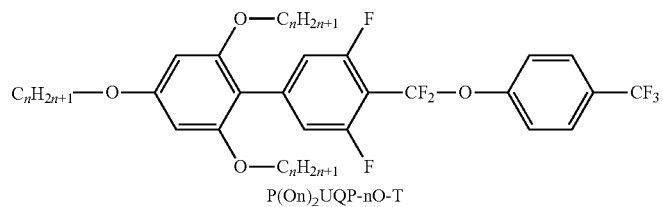
P(On)₂UQP-nO-T
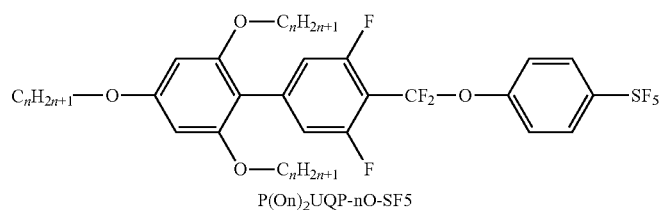
P(On)₂UQP-nO-SF5
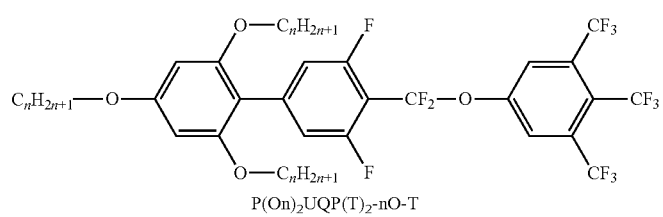
P(On)₂UQP(T)₂-nO-T
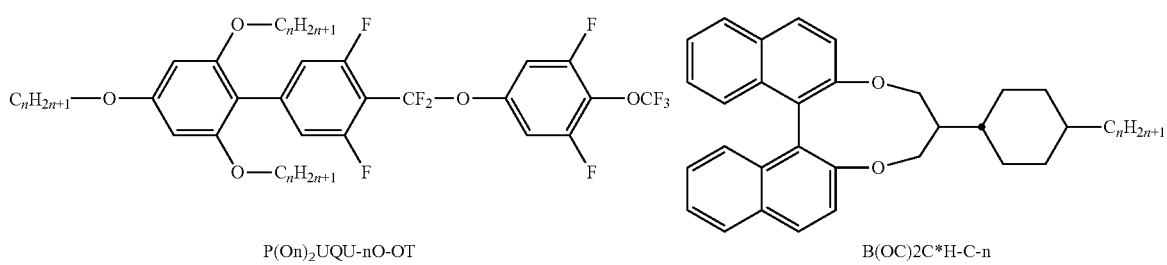
P(On)₂UQU-nO-OT    B(OC)2C*H-C-n
z. B:
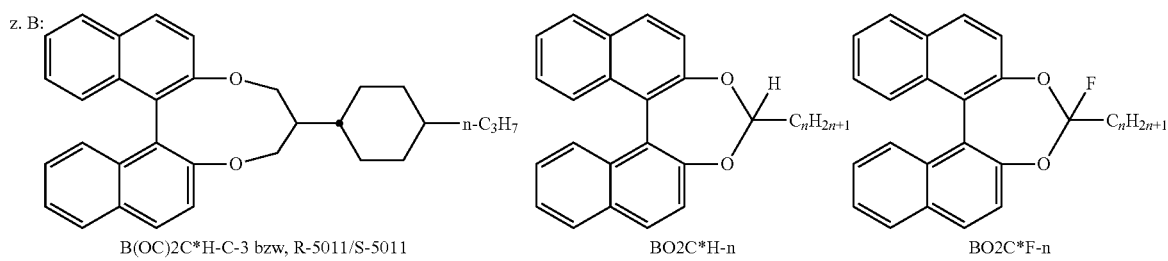
B(OC)2C*H-C-3 bzw, R-5011/S-5011    BO2C*H-n    BO2C*F-n
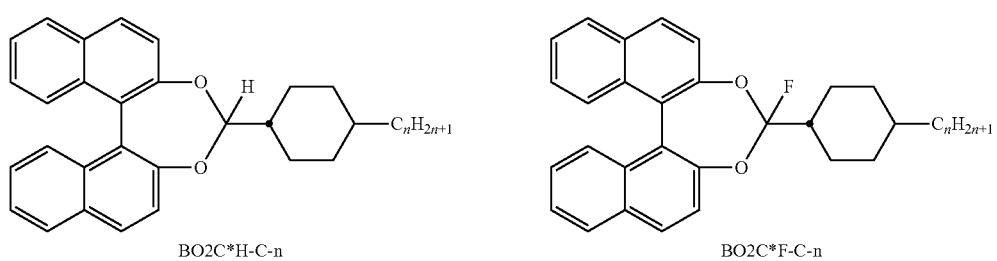
BO2C*H-C-n    BO2C*F-C-n TABLE B-continued
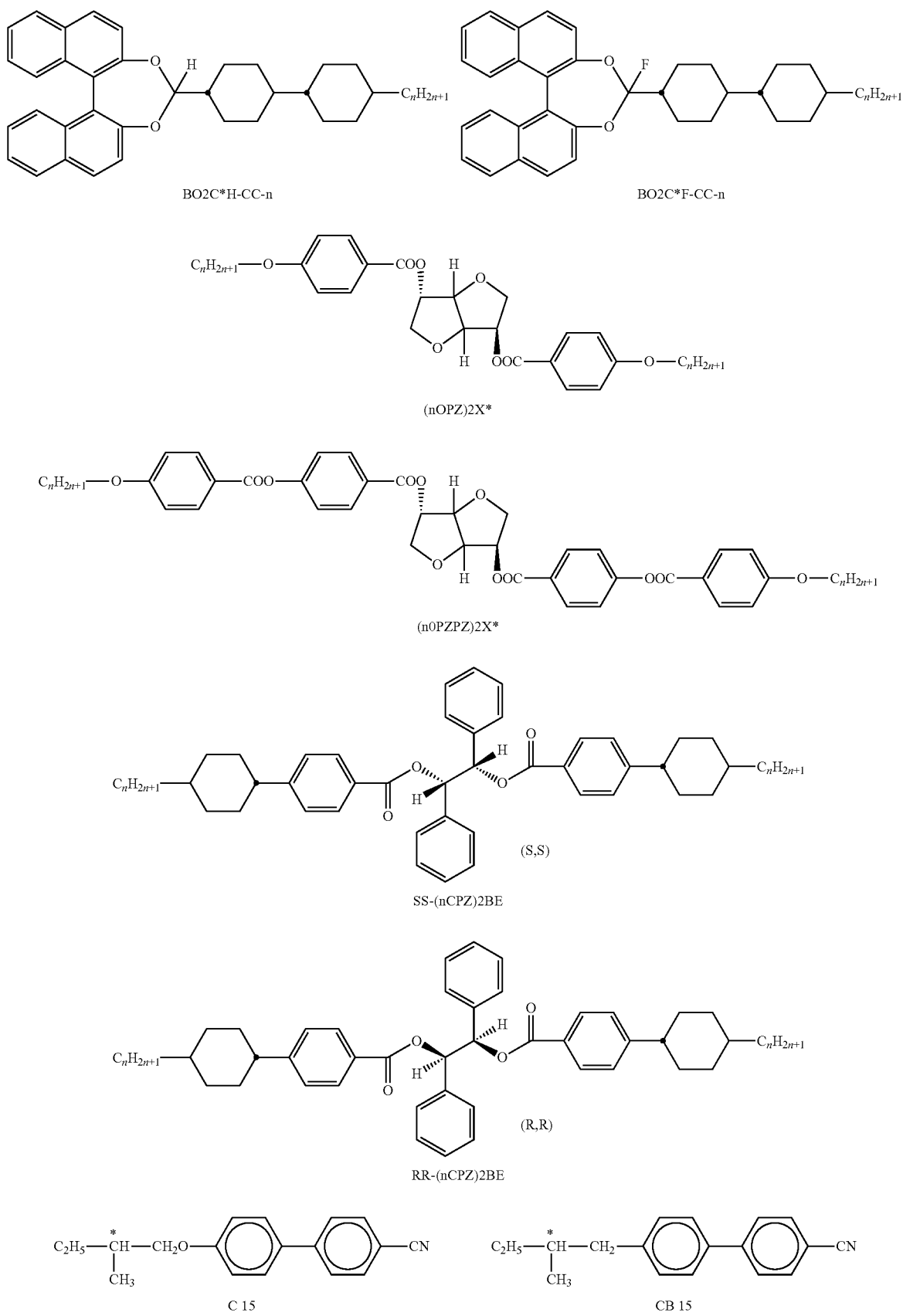

TABLE B-continued
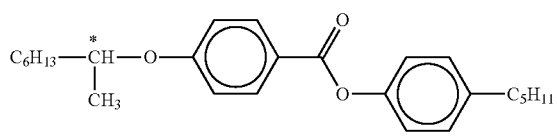
CM 21
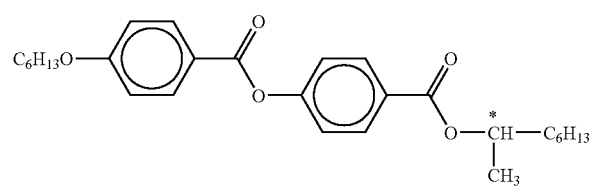
R/S-811
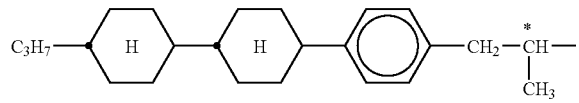
CM 44
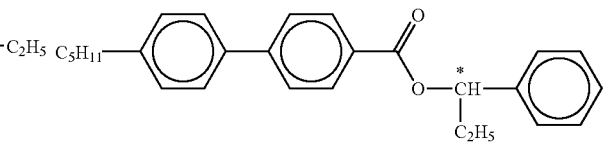
CM 45
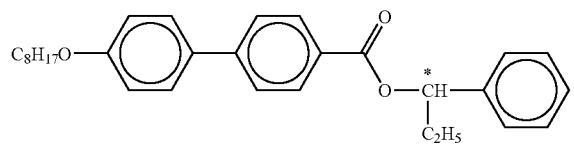
CM 47
CN
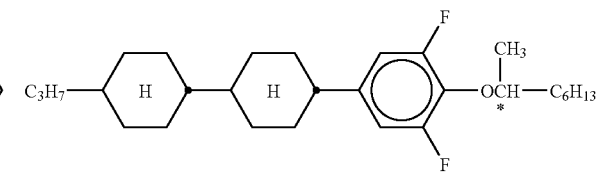
R/S-2011
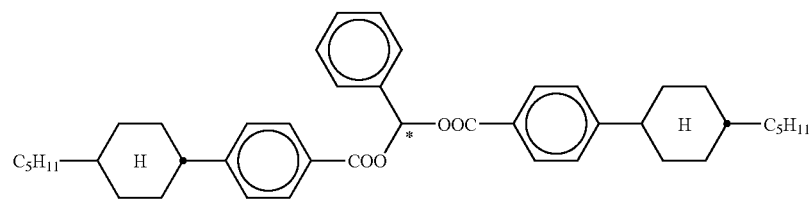
R/S-1011
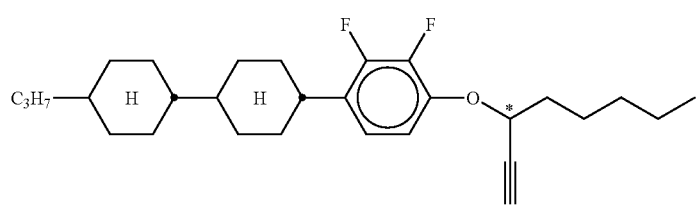
R/S-3011
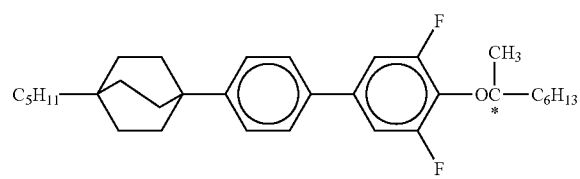
R/S-4011
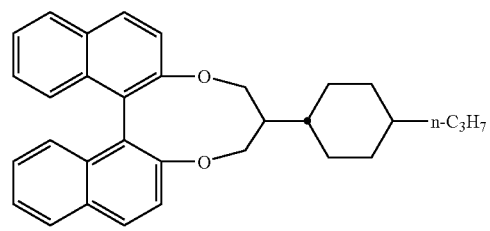
R-5011/S-5011

EXAMPLES

Hereinafter the present invention will further be illustrated by way of examples that are, however, not meant to limit the scope of the invention as set forth in the description above and in the claims below in any way. The examples given illustrate the present invention without limiting it in any way. They, however, illustrate both the preferably used moieties of the compounds and their preferable combinations with each other.

Example 1

Example 1.1

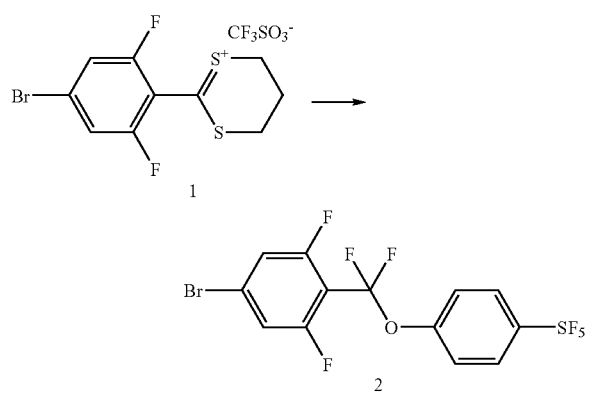

A suspension of 0.1 mol of 1 (prepared according to the procedures given in WO 01/64667) in 300 ml methylenechloride was cooled to −70° C. and treated dropwise with a mixture of 0.15 mol 4-pentafluorosulfuranylphenol, 0.17 mol triethylamine and 100 ml methylenechloride. After 5 min a first portion of 0.5 mol NEt$_3$.3HF was added dropwise, and after additional 5 min 0.5 mol bromine were added. After stirring for 1 h at −70° C., the mixture was allowed to warm up to room temperature and poured into ice-cold 0.1N NaOH. The mixture was extracted three times with methylenechloride, the combined organic extracts were dried over Na$_2$SO$_4$ and evaporated to dryness. The crude product was dissolved in heptane, passed through a pad of silica gel and crystallized from heptane. Yield (not optimized): 75% 2.

Example 1.2

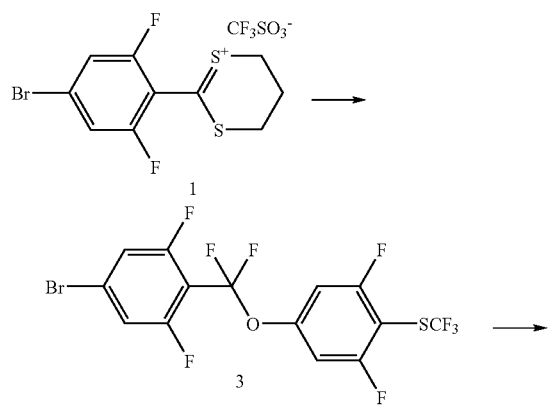

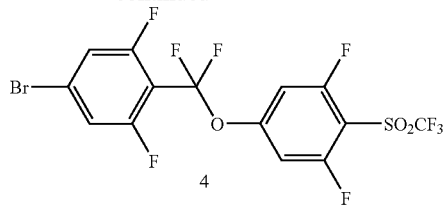

Compound 3 was synthesized analogously to example 1 using 3,5-difluoro-4-trifluoromethylthiophenol instead of 4-pentafluorosulfuranylphenol. Yield (not optimized): 66% 3.

A mixture of 21 mmol of 3, 65 mmol NaIO$_4$, 1 mmol RuCl$_3$, 40 ml acetonitrile, 40 ml CCl$_4$ and 80 ml water was stirred for 4 h at room temperature. Usual aqueous work-up, subsequent chromatography, on silica gel (heptane/methyl-tert.-butylether as solvent) and crystallization from heptane yield 42% (not optimized) of 4.

Example 1.3

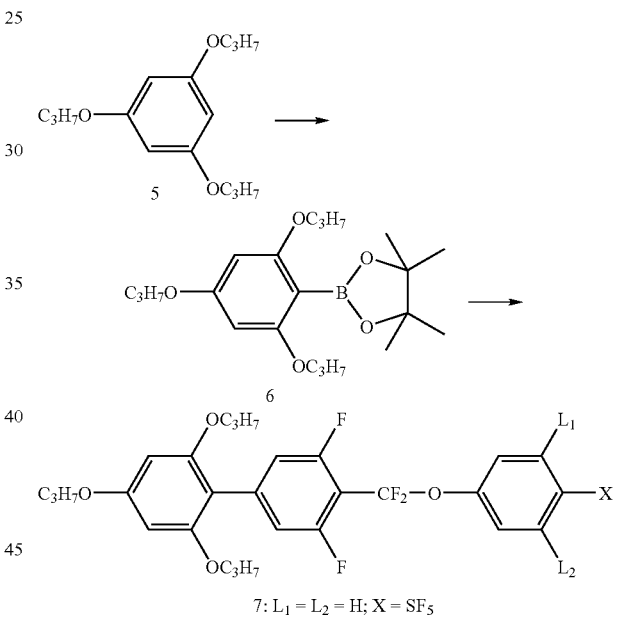

7: L$_1$ = L$_2$ = H; X = SF$_5$
8: L$_1$ = L$_2$ = F; X = SO$_2$CF$_3$ 30 mmol of 5 were dissolved in 31 ml diethylether and treated at room temperature first with 30 mmol N,N'-tetramethylethylendiamine (TMEDA) and then with 36 mmol 15% n-butyllithium in hexane. After 20 min the reaction mixture was cooled to −78° C. and 60 mmol of 2-isopropoxy-4,4,5,5-tetramethyl-1,3,2-dioxaborolane were added. The resulting mixture was stirred at −78° C. for 1 h and then allowed to warm up to room temperature. The mixture was poured onto ice-water, and the pH was adjusted to about 5 by careful addition of 10% HCl. Usual aqueous work-up yielded 32% (not optimized) of the boronic ester 6 which was subsequently used without further purification. A mixture of 40 mmol of 6, 40 mmol of bromide 2 (example 1) or 4 (example 2), 1.1 mmol Pd(PPh$_3$)$_4$, 120 ml of dioxane and 80 mmol of K$_3$PO$_4$.H$_2$O was stirred at 100° C. under nitrogen for 18 h. Usual aqueous work-up yielded 63% (not optimized) of 7 and 49% (not optimized) of 8, respectively. M.p. of 7: 76° C. Glass-transition temperature (Tg) of 8: −22° C.

Examples 2 to 50

Analogously to example 1 the following compounds were prepared:

| Ex. # | Structure of Compound | Properties |
|---|---|---|
| 2 | | Tg = −5° C., M.P. = 79° C.; |
| 3 | | M.P. = 79° C.; |
| 4 | | Tg = 12° C., M.P. = 76° C.; |
| 5 | | M.P. = 114° C.; |
| 6 | | Tg = −11° C., M.P. = 78° C.; |
| 7 | | Tg = 6° C., M.P. = 73° C.; |
| 8 | | Tg = −9° C., M.P. = 81° C.; |

-continued

| Ex. # | Structure of Compound | Properties |
|---|---|---|
| 9 | | M.P. = 53° C., Δn = −0.082, Δε = 7.3; |
| 10 | | Tg = −3° C., M.P. = 109° C.; |
| 11 | | M.P. = 111° C., Δn = 0.045, Δε = 14.4; |
| 12 | | M.P. = 34° C.; |
| 13 | | M.P. = 16° C.; |
| 14 | | Tg = −35° C., M.P. = 65° C.; |
| 15 | | |

-continued

| Ex. # | Structure of Compound | Properties |
|---|---|---|
| 16 | (structure) | |
| 17 | (structure) | Δn = 0.057, Δε = 12.9, Tg = −37, M.P. = 43° C.; |
| 18 | (structure) | Δn = 0.135, Δε = 32.4; |
| 19 | (structure) | Δn = 0.057, Δε = 16.7, Tg = −31, M.P. = 47° C.; |
| 20 | (structure) | Δn = 0.103, Δε = 15.2, Tg = −18, M.P. = 65° C.; |
| 21 | (structure) | Δn = 0.047, Δε = 27.5, M.P. = 79° C.; |
| 22 | (structure) | Δn = 0.046, Δε = 21.3, M.P. = 63° C.; |

| Ex. # | Structure of Compound | Properties |
|---|---|---|
| 23 | | Tg = −16° C., M.P. = 67° C.; |
| 24 | | Δn = 0.034, Δε = 19.0, Tg = −15° C., M.P. = 87° C.; |
| 25 | | M.P. = 124° C.; |
| 26 | | Tg = −1° C., M.P. = 120° C.; |

-continued

| Ex. # | Structure of Compound | Properties |
|---|---|---|
| 27 | | Δn = −0.024, Δε = 14.7; |
| 28 | | Δn = 0.032, Δε = 26.1; |
| 29 | | HTP = −22.8 μm$^{-1}$, M.P. = 95° C.; |
| 30 | | HTP = +22.7 μm$^{-1}$, M.P. = 95° C.; |
| 31 | | |

-continued

| Ex. # | Structure of Compound | Properties |
|---|---|---|
| 32 | (structure: 3,4,5-triethoxybenzoate ester of 3,5-difluoro-4-cyanophenol) | M.P. = 137; |
| 33 | (structure: propoxy-dimethylphenyl-difluorophenyl-CF₂O-trifluorophenyl) | Δn = 0.039, Δε = 11.8, M.P. = 76° C.; |
| 34 | (structure: propoxy-dimethylphenyl-difluorophenyl-CF₂O-trifluorophenyl) | Δn = 0.086, Δε = 14.9, M.P. = 72° C.; |
| 35 | (structure: propoxy-dimethylphenyl-difluorophenyl-CF₂O-difluoro-CF₃-phenyl) | Δn = 0.037, Δε = 17.1; |
| 36 | (structure: propoxy-dimethylphenyl-difluorophenyl-CF₂O-difluoro-CF₃-phenyl) | Δn = 0.081, Δε = 21.3, M.P. = 74° C.; |
| 37 | (structure: 2,4,6-triisopropylbenzoate ester of 3,5-difluoro-4-cyanophenol) | |
| 38 | (structure: propyl-tetrahydropyran-propoxy-fluorophenyl-difluorophenyl-CF₂O-trifluorophenyl) | Δn = 0.079, Δε = 31.8, Tg = −24° C., M.P. = 69° C.; |
| 39 | (structure: 3,4,5-tripropoxybenzoate ester of 3,5-difluoro-4-cyanophenol) | M.P. = 123° C.; |

| Ex. # | Structure of Compound | Properties |
|---|---|---|
| 40 | [structure: 3,4,5-tri(propoxy)benzoate ester linked to biphenyl with 3,5-difluoro-4-cyano terminal] | |
| 41 | [structure: 3,4,5-tri(propoxy)phenyl - 3,5-difluorophenyl - CF₂-O - 3,4,5-trifluorophenyl] | M.P. = 62° C.; |
| 42 | [structure: 3,5-bis(hexyloxy)phenyl - phenyl - CF₂-O - 3,4,5-trifluorophenyl] | Δn = 0.000, Δε = 3.0, Tg = −51° C., |
| 43 | [structure: 3,5-bis(hexyloxy)phenyl - naphthyl - CF₂-O - 3,4,5-trifluorophenyl] | Δn = 0.049, Δε = 6.0, Tg = −36° C., M.P. = 44° C.; |
| 44 | [structure: 4-hexyloxy-2,6-dimethylphenyl - phenyl - CF₂-O - 5,6,7,8-tetrafluoronaphthyl] | Δn = 0.121, Δε = 9.3, Tg = −23° C., T(K,S$_x$) = 90° C., M.P. = (−5)° C.; |
| 45 | [structure: 3,5-bis(hexyloxy)phenyl - phenyl - CF₂-O - 5,6,7,8-tetrafluoronaphthyl] | Δn = 0.046, Δε = 4.9, Tg = −35° C., |
| 46 | [structure: 4-hexyloxy-2,6-dimethylphenyl - naphthyl - CF₂-O - 5,6,7,8-tetrafluoronaphthyl] | Δn = 0.168, Δε = 9.3, Tg = −9° C., T(K,N) = 104° C., T(N,I) = 41.9° C.; |

| Ex. # | Structure of Compound | Properties |
|---|---|---|
| 47 | 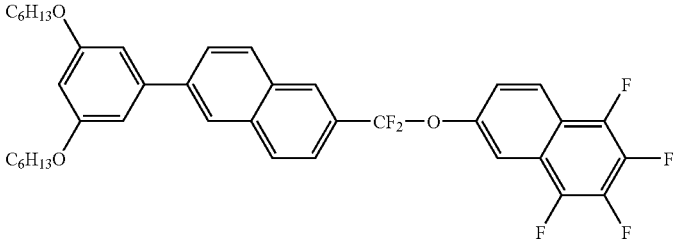 | Δn = 0.090, Δε = 6.6, Tg = −319 C., M.P. = 67° C.; |
| 48 | 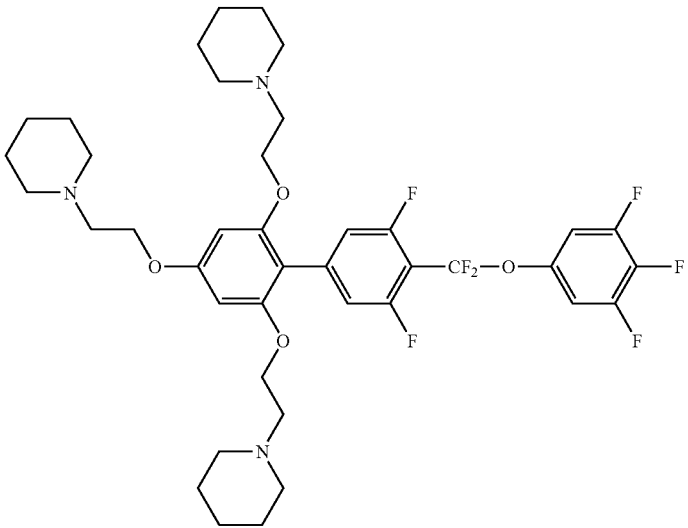 | Δn = −050, Δε = 10.8; |
| 49 | 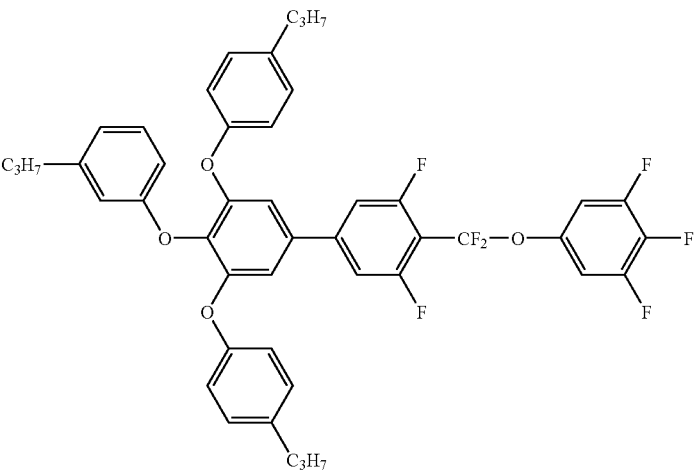 | Tg = −15° C.; |
| 50 | 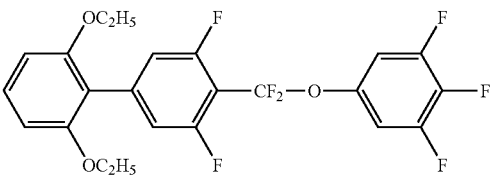 | |

-continued

| Ex. # | Structure of Compound | Properties |
|---|---|---|
| 51 | C₆H₁₃O–[ring(CH₃,CH₃)]–[ring]–CF₂–O–[ring]–[ring(F,F)]–CF₃ | Δn = 0.137<br>Δε = 15.2;<br>M.P. = 120° C. |
| 471 | [acrylate-O-(CH₂)₄-O]–[ring(O(CH₂)₄-O-acrylate)]–[ring(F,F)]–CF₂–O–[ring(F,F,F)] with C₃H₇O substituent | Tg = −36° C.,<br>M.P. = 39° C.; |

Remarks: Δn and Δε extrapolated from 10% solution in ZLI-4792 and HTP in MLC-6260, both mixtures from Merck KGaA, all data except transition temperatures given at 20° C.

Use—Examples 1 to 51

A liquid crystal mixture, host mixture A, is realised consisting of:

| Mixture A | |
|---|---|
| Compound Abbreviation | Concentration/mass-% |
| GZU-3A-N | 15.0 |
| GZU-4A-N | 15.0 |
| GZU-4O-N | 15.0 |
| UZU-3A-N | 8.0 |
| CUZU-2-N | 9.0 |
| CUZU-3-N | 9.0 |
| CUZU-4-N | 9.0 |
| HP-3N.F | 6.0 |
| HP-4N.F | 6.0 |
| HP-5N.F | 8.0 |
| Σ | 100.0 |

This mixture has the following properties:
Clearing point (T(N,I))/° C.: 56.8
To 85.0% of this mixture 5% of the chiral dopant R-5011 and 10% of the compound of interest are added and the properties of the resulting mixture are determined.

The data are compiled in table 1.

$T_g$, T (K,I) and T(g,I) given in Tables 1a, 1b below are determined by means of DSC (differential scanning calorimetry) and microscopy.

Further electro-optical data given in Tables 1a, 1b, 2, 3, 4, 5 below are measured in a test cell as described hereinafter: This test cell is an electro-optical cell with interdigital electrodes having a distance of electrodes of 10 μm, a width of electrodes of 10 μm, and a cell thickness of 10 μm. The height of the electrodes—that are made out of chromium and without a polyimid layer—can be ignored in comparison to the cell thickness. Experimental values are determined by using the standard apparatus as used in DE 102 41 301.0.

$T_{trans}$ is the characteristic temperature which is defined as follows:

If the characteristic voltage as a function of temperature has a minimum, the temperature at this minimum is denoted as characteristic temperature;

If the characteristic voltage as a function of temperature has no minimum and if the controlling medium has one or more blue phases, the transistion temperature to the blue phase is denoted as characteristic temperature; in case there are more than one blue phase, the lowest transition temperature to a blue phase is denoted as characteristic temperature;

If the characteristic voltage as a function of temperature has no minimum and if the controlling medium has no blue phase, the transistion temperature to the isotropic phase is denoted as characteristic temperature.

In this context the term "characteristic voltage" refers to a specific voltage, e.g. the threshold voltage $V_{10}$ at which a light transmission of 10% is observed or the saturation voltage $V_{90}$ at which a transmission of 90% is observed.

$$\frac{dV^*}{dT} := \frac{\frac{dV}{dT}(T_{trans}+2)}{V(T_{trans}+2)}$$

In each case 10% of the respective compound of interest have been dissolved together with 5% of the chiral dopant R-5011 in the host mixture A, both available from Merck KGaA, Germany.

The results are shown in the following tables (Tables 1a to 1m).

TABLE 1a

| Use example | 1.1a | 1.1b | 1.2 | 1.3 |
|---|---|---|---|---|
| Compound of example | 1: cpd.(7) | 1: cpd.(8) | 2 | 3 |
| $T_{trans.}/°C$ | 0 | 4 | n.d. | 7.5 |
| T trans. − Iso/deg. | 12 | 11 | n.d. | 18 |
| ΔT/deg. | 12 | 7 | n.d. | 10.5 |
| $V_{100}$(Ttrans. + 2)/V | 36 | 38 | n.d. | 39.5 |
| dV/dT(T trans. + 2)/V/deg. | 0 | 1 | n.d. | 4.5 |
| dV*/dT(T trans. + 2)/deg.$^{-1}$ | 0 | 0.03 | n.d. | 0.12 |

TABLE 1b

| Use example | 1.4 | 1.5 | 1.6 | 1.7 |
|---|---|---|---|---|
| Compound of example | 5 | 5 | 6 | 7 |
| $T_{trans.}/°C$ | 5 | n.d. | 5 | n.d. |
| T trans. − Iso/deg. | 14 | n.d. | 15.5 | n.d. |
| ΔT/deg. | 9 | n.d. | 10.5 | n.d. |
| $V_{100}$(Ttrans. + 2)/V | 37 | n.d. | 37 | n.d. |
| dV/dT(T trans. + 2)/V/deg. | 1 | n.d. | 1 | n.d. |
| dV*/dT(T trans. + 2)/deg.$^{-1}$ | 0.02 | n.d. | 0.03 | n.d. |

TABLE 1c

| Use example | 1.8 | 1.9 | 1.10 | 1.11 |
|---|---|---|---|---|
| Compound of example | 8 | 9 | 10 | 11 |
| $T_{trans.}/°C$ | n.d | n.d. | −5.6 | −3.1 |
| T trans. − Iso/deg. | n.d. | n.d. | 9.3 | 8.9 |
| ΔT/deg. | n.d. | n.d. | 14.8 | 12 |
| $V_{100}$(Ttrans. + 2)/V | n.d. | n.d. | 39 | 36 |
| dV/dT(T trans. + 2)/V/deg. | n.d. | n.d. | 0 | 0 |
| dV*/dT(T trans. + 2)/deg.$^{-1}$ | n.d. | n.d. | 0 | 0 |

Remarks:
n.d.: not determined.

TABLE 1d

| Use example | 1.12 | 1.13 | 1.14 | 1.15 |
|---|---|---|---|---|
| Compound of example | 12 | 13 | 14 | 15 |
| $T_{trans.}/°C$ | −0.9 | 10.5 | 4.1 | 5 |
| T trans. − Iso/deg. | 11.4 | 19.5 | 15.3 | 16.5 |
| ΔT/deg. | 12.3 | 9 | 11.2 | 11.5 |
| $V_{100}$(Ttrans. + 2)/V | 39.5 | 40 | 35.5 | 42 |
| dV/dT(T trans. + 2)/V/deg. | 1.15 | 3 | 2 | 1 |
| dV*/dT(T trans. + 2)/deg.$^{-1}$ | 0.04 | 0.06 | 0.05 | 0.02 |

TABLE 1e

| Use example | 1.16 | 1.17 | 1.18 | 1.19 |
|---|---|---|---|---|
| Compound of example | 16 | 17 | 18 | 19 |
| $T_{trans.}/°C$ | 24 | 7.5 | 14 | n.d. |
| T trans. − Iso/deg. | 30.5 | 18.7 | 23.1 | n.d. |
| ΔT/deg. | 6.5 | 11.2 | 9.1 | n.d. |
| $V_{100}$(Ttrans. + 2)/V | 36 | 37.5 | 32 | n.d. |
| dV/dT(T trans. + 2)/V/deg. | 2 | 1.35 | 2 | n.d. |
| dV*/dT(T trans. + 2)/deg.$^{-1}$ | 0.06 | 0.04 | 0.06 | n.d. |

TABLE 1f

| Use example | 1.20 | 1.21 | 1.22 | 1.23 |
|---|---|---|---|---|
| Compound of example | 20 | 21 | 22 | 23 |
| $T_{trans.}/°C$ | 12.6 | n.d. | n.d. | 9 |
| T trans. − Iso/deg. | 21.9 | n.d. | n.d. | 19.3 |
| ΔT/deg. | 9.3 | n.d. | n.d. | 9 |
| $V_{100}$(Ttrans. + 2)/V | 39.5 | n.d. | n.d. | 37 |
| dV/dT(T trans. + 2)/V/deg. | 2.3 | n.d. | n.d. | 2.5 |
| dV*/dT(T trans. + 2)/deg.$^{-1}$ | 0.04 | n.d. | n.d. | 0.07 |

Remarks:
n.d.: not determined.

TABLE 1g

| Use example | 1.24 | 1.25 | 1.26 | 1.27 |
|---|---|---|---|---|
| Compound of example | 24 | 25 | 26 | 27 |
| $T_{trans.}/°C$ | 9.4 | n.d. | 6.9 | 0.4 |
| T trans. − Iso/deg. | 19.5 | n.d. | 18.4 | 10.2 |
| ΔT/deg. | 10.1 | n.d. | 11.5 | 9.8 |
| $V_{100}$(Ttrans. + 2)/V | 38 | n.d. | 35.5 | 35.5 |
| dV/dT(T trans. + 2)/V/deg. | 1.1 | n.d. | 0.9 | 1 |
| dV*/dT(T trans. + 2)/deg.$^{-1}$ | 0.03 | n.d. | 0.03 | 0.03 |

TABLE 1h

| Use example | 1.28 | 1.29 | 1.30 | 1.31 |
|---|---|---|---|---|
| Compound of example | 28 | 29 | 30 | 31 |
| $T_{trans.}/°C$ | 5.5 | n.d. | n.d. | 25.4 |
| T trans. − Iso/deg. | 15.8 | n.d. | n.d. | 32.6 |
| ΔT/deg. | 10.3 | n.d. | n.d. | 7.2 |
| $V_{100}$(Ttrans. + 2)/V | 38.5 | n.d. | n.d. | 42.5 |
| dV/dT(T trans. + 2)/V/deg. | 1 | n.d. | n.d. | 1.5 |
| dV*/dT(T trans. + 2)/deg.$^{-1}$ | 0.02 | n.d. | n.d. | 0.03 |

TABLE 1i

| Use example | 1.32 | 1.33 | 1.34 | 1.35 |
|---|---|---|---|---|
| Compound of example | 32 | 33 | 34 | 35 |
| $T_{trans.}/°C$ | n.d. | 6.5 | 15 | 7.5 |
| T trans. − Iso/deg. | n.d. | 17 | 23 | 18 |
| ΔT/deg. | n.d. | 10.5 | 8 | 10.5 |
| $V_{100}$(Ttrans. + 2)/V | n.d. | 39 | 40 | 42 |
| dV/dT(T trans. + 2)/V/deg. | n.d. | 2 | 2 | 2 |
| dV*/dT(T trans. + 2)/deg.$^{-1}$ | n.d. | 0.05 | 0.04 | 0.06 |

Remarks:
n.d.: not determined.

TABLE 1j

| Use example | 1.36 | 1.37 | 1.38 | 1.39 |
|---|---|---|---|---|
| Compound of example | 36 | 37 | 38 | 39 |
| $T_{trans.}/°C$ | 14.5 | 11.5 | 23.5 | 15 |
| T trans. − Iso/deg. | 22.5 | 20.5 | 31 | 25.3 |
| ΔT/deg. | 8 | 9 | 7.5 | 10.3 |
| $V_{100}$(Ttrans. + 2)/V | 43 | 40 | 37 | 39.5 |
| dV/dT(T trans. + 2)/V/deg. | 2 | 1.5 | 3 | 4.5 |
| dV*/dT(T trans. + 2)/deg.$^{-1}$ | 0.04 | 0.04 | 0.08 | 0.12 |

TABLE 1k

| Use example | 1.40 | 1.41 | 1.42 | 1.43 |
|---|---|---|---|---|
| Compound of example | 40 | 41 | 42 | 43 |
| $T_{trans.}/°C$ | 9 | 3.3 | −2.6 | 1.9 |
| T trans. − Iso/deg. | 18.8 | 14.3 | 9.4 | 12.9 |
| ΔT/deg. | 9.8 | 11 | 12 | 11 |
| $V_{100}$(Ttrans. + 2)/V | 41 | 43.5 | 42.5 | 39.5 |
| dV/dT(T trans. + 2)/V/deg. | 3 | −1.5 | 1.5 | 1. |
| dV*/dT(T trans. + 2)/deg.$^{-1}$ | 0.07 | −0.05 | 0.05 | 0.03 |

TABLE 1l

| Use example | 1.44 | 1.45 | 1.46 | 1.47 |
|---|---|---|---|---|
| Compound of example | 44 | 45 | 46 | 47 |

TABLE 1l-continued

| | | | | |
|---|---|---|---|---|
| $T_{trans.}/°C.$ | 22.1 | 3.9 | 26.9 | 11.7 |
| T trans. – Iso/deg. | 29 | 15.1 | 33.4 | 20.2 |
| ΔT/deg. | 6.9 | 11.2 | 6.5 | 8.5 |
| $V_{100}$(Ttrans. + 2)/V | 41 | 43.5 | 46 | 40 |
| dV/dT(T trans. + 2)/V/deg. | 0.8 | 0.9 | 1.5 | 1 |
| dV*/dT(T trans. + 2)/deg.$^{-1}$ | 0.02 | 0.03 | 0.03 | 0.02 |

Remarks:
n.d.: not determined.

TABLE 1m

| | | | | |
|---|---|---|---|---|
| Use example | 1.48 | 1.49 | 1.50 | 1.51 |
| Compound of example | 48 | 49 | 50 | 51 |
| $T_{trans.}/°C.$ | –1.1 | n.d. | n.d. | 28.1 |
| T trans. – Iso/deg. | 8 | n.d. | n.d. | 34 |
| ΔT/deg. | 9.1 | n.d. | n.d. | 5.9 |
| $V_{100}$(Ttrans. + 2)/V | n.d. | n.d. | n.d. | 45 |
| dV/dT(T trans. + 2)/V/deg. | n.d. | n.d. | n.d. | 1.6 |
| dV*/dT(T trans. + 2)/deg.$^{-1}$ | n.d. | n.d. | n.d. | 0.03 |

Remarks:
n.d.: not determined.

The invention claimed is:

1. A liquid crystal medium, comprising at least one compound according to general formula I

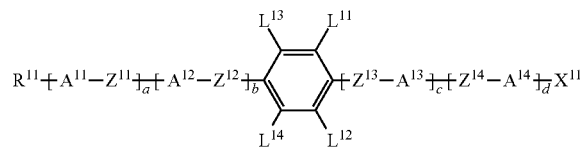

I wherein
a, b, c and d are independently of each other 0, 1 or 2, whereby a+b+c+d≦4;
$R^{11}$ is an alkoxy radical having from 1 to 15 carbon atoms, wherein one or more —CH$_2$— groups of said alkoxy radical may be replaced independently of each other by —O—, —S—, —SiR$^x$R$^y$—, —CH═CH—, —C≡C—, —CO—O— and/or —O—CO— such that oxygen and/or sulfur atoms are not linked directly to each other, said alkoxy radical being unsubstituted or mono-substituted with a —CN group or mono- or poly-substituted with halogen; or $R^{11}$ is aryl, aryloxy, alkylaryl, alkylaryloxy, alkylarylalkyl, alkylarylalkoxy, cycloalkyl, cycloalkyloxy, cycloalkylalkenyloxy, alkylcycloalkyl, alkylcycloalkyloxy or alkylcycloalkylalkenyloxy, each with up to 15 carbon atoms, wherein said in radicals being unsubstituted or mono-substituted with a —CN group or mono- or poly-substituted with halogen one or more ═CH— groups may be replaced independently of each other by ═N— and/or one more —CH$_2$— groups may be replaced independently of each other by —O—, —S—, —SiR$^x$R$^y$—, —CH═CH—, —C≡C—, —CO—O— and/or —O—CO— such that nitrogen and oxygen and/or sulfur atoms are not linked directly to each other,
$L^{11}$, $L^{12}$, $L^{13}$ and $L^{14}$ are independently of each other hydrogen, halogen, a CN group, an alkyl or alkoxy radical having from 1 to 15 carbon atoms wherein one or more methylene groups of said alkyl or alkoxy radical may be replaced independently of each other by —O—, —S—, —SiR$^x$R$^y$—, —CH═CH—, —C≡C—, —CO—O— and/or —O—CO— such that oxygen and/or sulfur atoms are not linked directly to each other, said alkyl or alkoxy radical being unsubstituted or mono-substituted with a —CN group or mono- or poly-substituted with halogen; or aryl, aryloxy, alkylaryl, alkylaryloxy, alkylarylalkyl, alkylarylalkoxy, cycloalkyl, cycloalkyloxy, cycloalkylalkenyloxy, alkylcycloalkyl, alkylcycloalkyloxy or alkylcycloalkylalkenyloxy, each with up to 15 carbon atoms, wherein said in radicals being unsubstituted or mono-substituted with a —CN group or mono- or poly-substituted with halogen one or more ═CH— groups may be replaced independently of each other by ═N— and/or one more —CH$_2$— groups may be replaced independently of each other by —O—, —S—, —SiR$^x$R$^y$—, —CH═CH—, —C≡C—, —CO—O— and/or —O—CO— such that nitrogen and oxygen and/or sulfur atoms are not linked directly to each other,
whereby
$L^{11}$ and $L^{12}$ are both alkoxy, or $L^{13}$ and $L^{14}$ are both alkoxy, or $L^{11}$, $L^{12}$, $L^{13}$ and $L^{14}$ are all alkoxy;
$X^{11}$ is H, halogen, —CN, —NCS, —SF$_5$, —S—R$^z$, —SO$_2$—R$^z$, an alkyl or alkoxy radical having from 1 to 15 carbon atoms, wherein one or more methylene groups of said alkyl or alkoxy radical may be replaced independently of each other by —O—, —S—, —SiR$^x$R$^y$—, —CH═CH—, —C≡C—, —CO—O— and/or —O—CO— such that oxygen and/or sulfur atoms are not linked directly to each other, said alkyl or alkoxy radical being unsubstituted or mono-substituted with a —CN group or mono- or poly-substituted with halogen;
$R^x$ and $R^y$ are independently of each other hydrogen or an alkyl radical having from 1 to 7 carbon atoms;
$R^z$ is an alkyl radical having from 1 to 7 carbon atoms, said alkyl radical being unsubstituted or mono- or poly-substituted with halogen;
$A^{11}$, $A^{12}$, $A^{13}$ and $A^{14}$ are independently of each other a ring of one of the following formulas:

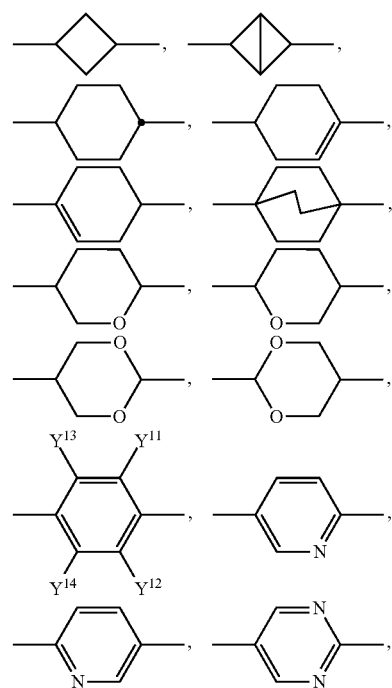

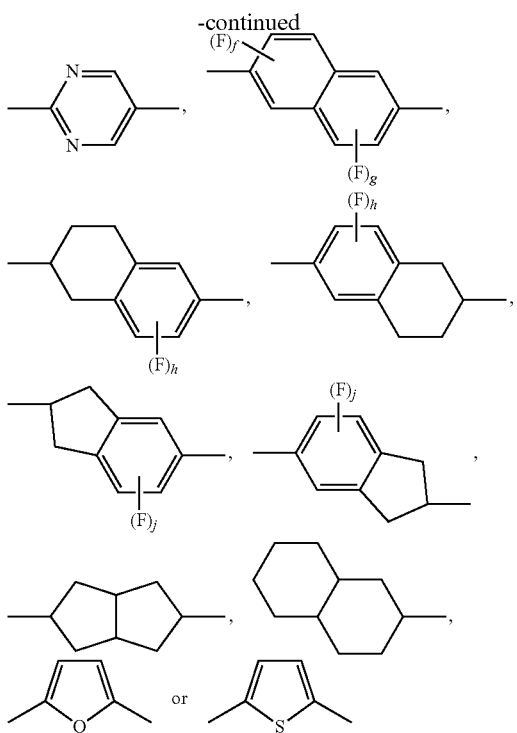

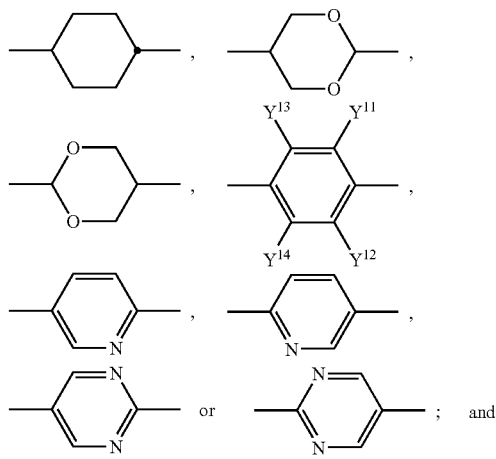

whereby each of $A^{11}$, $A^{12}$, $A^{13}$ and $A^{14}$ may be the same ring or two different rings if present more than once;

$Y^{11}$, $Y^{12}$, $Y^{13}$ and $Y^{14}$ are independently of each other hydrogen, halogen, an alkyl or alkoxy radical having from 1 to 15 carbon atoms wherein one or more methylene groups of said alkyl or alkoxy radical may be replaced independently of each other by —O—, —S—, —SiR$^x$R$^y$—, —CH═CH—, —C≡C—, —CO—O— and/or —O—CO— such that oxygen and/or sulfur atoms are not linked directly to each other, said alkyl or alkoxy radical being unsubstituted or mono- or poly-substituted with halogen; or aryl, aryloxy, alkylaryl, alkylaryloxy, alkylarylalkyl, alkylarylalkoxy, cycloalkyl, cycloalkyloxy, cycloalkylalkenyloxy, alkylcycloalkyl, alkylcycloalkyloxy or alkylcycloalkylalkenyloxy, each with up to 15 carbon atoms, wherein said in radicals being unsubstituted or mono-substituted with a —CN group or mono- or poly-substituted with halogen one or more ═CH— groups may be replaced independently of each other by ═N— and/or one more —CH$_2$— groups may be replaced independently of each other by —O—, —S—, —SiR$^x$R$^y$—, —CH═CH—, —C≡C—, —CO—O— and/or —O—CO— such that nitrogen and oxygen and/or sulfur atoms are not linked directly to each other, f, g, h and j are independently of each other 0, 1, 2 or 3;

$Z^{11}$, $Z^{12}$, $Z^{13}$ and $Z^{14}$ are independently of each other a single bond, —CH$_2$CH$_2$—, (—CH$_2$CH$_2$—)$_2$, —CF$_2$CF$_2$—, —CF$_2$—CH$_2$—, —CH$_2$—CF$_2$—, —CH═CH—, —CF═CF—, —CF═CH—, —CH═CF—, —C≡C—, —CH$_2$O—, —OCH$_2$—, —CF$_2$O—, —OCF$_2$—, —CO—O— or —O—CO— whereby each of $Z^{11}$, $Z^{12}$, $Z^{13}$ and $Z^{14}$ may have the same or a different meaning if present more than once; whereby if, at the same time, a+b+c+d≦3; and $L^{11}$ is an alkoxy radical having from 1 to 10 carbon atoms wherein one or more methylene groups of said alkoxy radical may be replaced independently of each other by —O—, —S—, —SiH$_2$—, —CH═CH— and/or —C≡C— such that oxygen and/or sulfur atoms are not linked directly to each other, said alkoxy radical being unsubstituted or mono- or poly-substituted with halogen; and $L^{12}$ is halogen or an alkoxy radical having from 1 to 10 carbon atoms wherein one or more methylene groups of said alkoxy radical may be replaced independently of each other by —O—, —S—, —SiH$_2$—, —CH═CH— and/or —C≡C— such that oxygen and/or sulfur atoms are not linked directly to each other, said alkoxy radical being unsubstituted or mono- or poly-substituted with halogen; and $A^{11}$, $A^{12}$, $A^{13}$ and $A^{14}$ are all independently of each other a ring of one of the following formulas:

$Y^{11}$, $Y^{12}$, $Y^{13}$ and $Y^{14}$ are all independently of each other H or F; and $Z^{11}$, $Z^{12}$, $Z^{13}$ and $Z^{14}$ are all independently of each other —CH$_2$CH$_2$—, (—CH$_2$CH$_2$—)$_2$, —CH═CH—, —C≡C—, —CH$_2$O—, —OCH$_2$—, —CF$_2$O—, —OCF$_2$—, —CO—O— or —O—CO—; and $X^{11}$ is halogen, —CN, an alkyl or alkoxy having 1 to 10 carbon atoms, wherein one or more methylene groups of said alkyl or alkoxy radical independently of each other may be replaced by —O—, —S—, —SiH$_2$—, —CH═CH— and/or —C≡C— such that oxygen and/or sulfur atoms are not linked directly to each other, said alkyl or alkoxy radical being unsubstituted or mono-substituted with a —CN group or mono- or poly-substituted with halogen, then $R^{11}$ is not an alkoxy radical having from 1 to 10 carbon atoms, wherein one or more methylene groups of said alkoxy radical may be replaced independently of each other by a moiety or moieties exclusively selected from the group of biradicals —O—, —S—, —SiH$_2$—, —CH═CH— and/or —C≡C— such that oxygen and/or sulfur atoms are not linked directly to each other, said alkyl or alkoxy radical being unsubstituted or mono-substituted with a —CN group or mono- or poly-substituted with halogen, wherein said liquid crystal medium exhibits at least one blue phase.

2. A liquid crystal medium according to claim 1, wherein a+b+c+d≦3.

3. A liquid crystal medium according to claim 1, wherein $R^{11}$ is an alkoxy radical having from 1 to 10 carbon atoms, wherein one or more methylene groups of said alkoxy radical may be replaced independently of each other by —O—, —SiR$^x$R$^y$— and/or —CH═CH— such that oxygen atoms are not linked directly to each other, said alkyl or alkoxy radical being unsubstituted or mono- or poly-substituted with fluorine; and R$^x$ and R$^y$ are independently of each other straight-chain alkyl radicals with 1 to 5 carbon atoms.

4. A liquid crystal medium according to claim 1, wherein
L$^{11}$ is an alkyl or alkoxy radical having from 1 to 10 carbon atoms wherein one or more methylene groups of said alkyl or alkoxy radical may be replaced independently of each other by —O—, —SiR$^x$R$^y$— and/or —CH═CH— such that oxygen atoms are not linked directly to each other, said alkyl or alkoxy radical being unsubstituted or mono- or poly-substituted with fluorine;

L$^{12}$ is F, an alkyl or alkoxy radical having from 1 to 10 carbon atoms wherein one or more methylene groups of said alkyl or alkoxy radical may be replaced independently of each other by —O—, —S—, —SiR$^x$R$^y$— and/or —CH═CH— such that oxygen atoms are not linked directly to each other, said alkyl or alkoxy radical being unsubstituted or mono- or poly-substituted with fluorine; and R$^x$ and R$^y$ are independently of each other straight-chain alkyl radicals with 1 to 5 carbon atoms.

5. A liquid crystal medium according to claim 1, wherein X$^{11}$ is —NCS, —SF$_5$, —S—R$^z$, —SO$_2$—R$^z$, F, Cl, an alkyl or alkoxy radical having from 1 to 10 carbon atoms, wherein one or more methylene groups of said alkyl or alkoxy radical may be replaced independently of each other by —O—, —S—, SiR$^x$R$^y$— or —CH═CH— such that oxygen and/or sulfur atoms are not linked directly to each other, said alkyl radical being mono- or poly-substituted with fluorine and said alkoxy radical being unsubstituted or mono- or poly-substituted with fluorine;

R$^x$ and R$^y$ are independently of each other straight-chain alkyl radicals with 1 to 5 carbon atoms; and R$^z$ is a straight-chain alkyl radical being mono- or poly-substituted with fluorine.

6. A liquid crystal medium according to claim 1, wherein at least one of A$^{11}$, A$^{12}$, A$^{13}$ and A$^{14}$ is a ring of one of the following formulas:

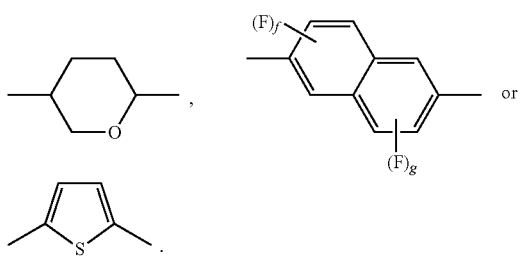

7. A liquid crystalline medium according to claim 1, wherein at least one of A$^{11}$ and A$^{12}$ is of the following formula:

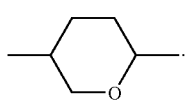

8. A liquid crystalline medium according to claim 1, wherein at least one of A$^{13}$ and A$^{14}$ is of the following formula:

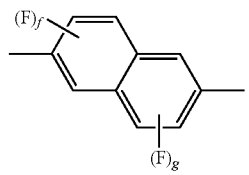

with f and g being defined as in claim 1.

9. A liquid crystal medium according to claim 1, wherein Y$^{11}$ is H, F, an alkyl, alkoxy, alkenyloxy or —O-alkylene-O-alkyl radical or a —O-alkylene-Si(alkyl')$_2$—O—Si (alkyl')$_3$ radical with up to 10 carbon atoms which radicals may be additionally substituted with fluorine whereby alkyl' is an alkanyl radical with 1, 2, 3 or 4 carbon atoms; and Y$^{12}$ is H.

10. A liquid crystal medium according to claim 1, wherein Z$^{11}$, Z$^{12}$, Z$^{13}$ and Z$^{14}$ are independently of each other a single bond, —CF$_2$—CF$_2$—, —CF$_2$—CH$_2$—, —CH$_2$—CF$_2$—, —CF═CF—, —CF═CH—, —CH═CF—, —C≡C—, —CF$_2$O— or —CO—O—.

11. A liquid crystal medium according to claim 1, wherein one of Z$^{13}$ and Z$^{14}$ is —CF$_2$O—.

12. A liquid crystal medium according to claim 1, wherein a=1 and b=0.

13. A liquid crystal medium according to claim 1, wherein c=0 and d=1.

14. A liquid crystal medium according to claim 1, wherein c=1 and d=1.

15. A liquid crystal medium according to claim 1, wherein A$^{14}$-X$^{11}$ is of one of the following formulas:

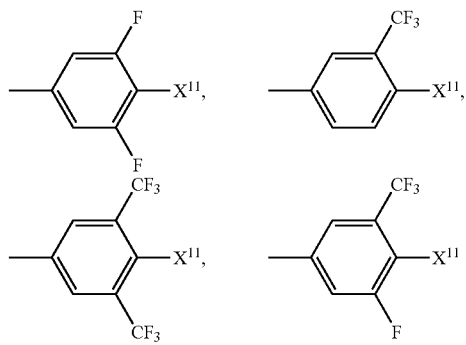

with X$^{11}$ being defined as in claim 1.

16. A liquid crystal medium according to claim 1, of formula IA:

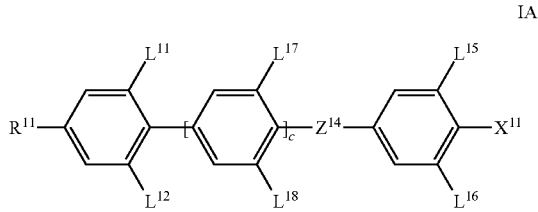

wherein c is 0 or 1;

R$^{11}$ is H, an alkyl or alkoxy radical having from 1 to 15 carbon atoms or an alkenyl or alkenyloxy or an —O- alkylene-O-alkyl radical having from 2 to 15 carbon atoms, wherein one or more methylene groups of each of said radicals may be replaced independently of each other by —S—, —SiR$^x$R$^y$—, —C≡C—, —CO—O— and/or —O—CO— such that oxygen and/or sulfur atoms are not linked directly to each other, said radicals being unsubstituted or mono-substituted with a —CN group or mono- or poly-substituted with halogen;

$L^{11}$ and $L^{12}$ are both alkoxy, $L^{15}$, $L^{16}$, $L^{17}$ and $L^{18}$ are independently of each other H, CF$_3$ or F;

$Z^{14}$ is a single bond, —CH$_2$CH$_2$—, (—CH$_2$CH$_2$—)$_2$, —CF$_2$—CF$_2$—, —CF$_2$—CH$_2$—, —CH$_2$—CF$_2$—, —CH=CH—, —CF=CF—, —CF=CH—, —CH=CF—, —C≡C—, —CH$_2$O—, —OCH$_2$—, —CF$_2$O—, —OCF$_2$—, —CO—O— or —O—CO—;

$X^{11}$ is —NCS, CF$_3$, —SF$_5$, —S—R$^z$ or —SO$_2$—R$^z$;

R$^x$ and R$^y$ are independently of each other hydrogen or an alkyl radical having from 1 to 7 carbon atoms; and R$^z$ is an alkyl radical having from 1 to 7 carbon atoms, said alkyl radical being unsubstituted or mono- or poly-substituted with halogen.

17. A liquid crystal medium according to the claim 16, wherein

R$^{11}$ is a straight-chain alkyl, alkoxy, alkenyl, alkenyloxy or —O-alkylene-O-alkyl radical with up to 10 carbon atoms, said radicals being unsubstituted or mono- or poly-substituted with halogen;

$L^{15}$ is F or CF$_3$;

$Z^{14}$ is a single bond, —C≡C—, —CF$_2$O— or —CO$_2$—; $X^{11}$ is NCS, CF$_3$, SF$_5$, —S—R$^z$ or —SO$_2$—R$^z$; and R$^z$ is CF$_3$, C$_2$F$_5$ or n-C$_4$F$_9$.

18. A liquid crystal medium according to claim 1, of formula IB:

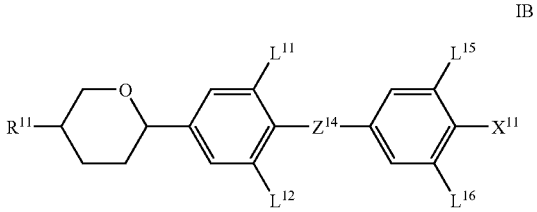

IB wherein R$^{11}$ is H, an alkyl or alkoxy radical having from 1 to 15 carbon atoms or an alkenyl or alkenyloxy radical or an —O-alkylene-O-alkyl radical having from 2 to 15 carbon atoms, wherein one or more methylene groups of each of said radicals may be replaced independently of each other by —S—, —SiR$^x$R$^y$—, —C≡C—, —CO—O— and/or —O—CO— such that oxygen and/or sulfur atoms are not linked directly to each other, said radicals being unsubstituted or mono-substituted with a —CN group or mono- or poly-substituted with halogen;

$L^{11}$ and $L^{12}$ are both alkoxy;

$L^{15}$ and $L^{16}$ are independently of each other H, CF$_3$ or F;

$Z^{14}$ is a single bond, —CH$_2$CH$_2$—, (—CH$_2$CH$_2$—)$_2$, —CF$_2$—CF$_2$—, —CF$_2$—CH$_2$—, —CH$_2$—CF$_2$—, —CH=CH—, —CF=CF—, —CF=CH—, —CH=CF—, —C≡C—, —CH$_2$O—, —OCH$_2$—, —CF$_2$O—, —OCF$_2$—, —CO—O— or —O—CO—;

$X^{11}$ is F, Cl, —CN, —NCS, —SF$_5$, —S—R$^z$, —SO$_2$—R$^z$, an alkyl or alkoxy radical having from 1 to 15 carbon atoms, wherein one or more methylene groups of said alkyl or alkoxy radical may be replaced independently of each other by —O—, —S—, SiR$^x$R$^y$—, —CH=CH—, —C≡C—, —CO—O— and/or —O—CO— such that oxygen and/or sulfur atoms are not linked directly to each other, said alkyl or alkoxy radical being unsubstituted or mono-substituted with a —CN group or mono- or poly-substituted with halogen;

R$^x$ and R$^y$ are independently of each other hydrogen or an alkyl radical having from 1 to 7 carbon atoms;

R$^z$ is an alkyl radical having from 1 to 7 carbon atoms, said alkyl radical being unsubstituted or mono- or poly-substituted with halogen.

19. A liquid crystal medium according to claim 18, wherein

R$^{11}$ is a straight-chain alkyl, alkoxy, alkenyl, alkenyloxy or —O-alkylene-O-alkyl radical with up to 10 carbon atoms, said radicals being unsubstituted or mono- or poly-substituted with halogen;

$L^{15}$ is F or CF$_3$;

$Z^{14}$ is a single bond, —CF$_2$O— or —CO$_2$—; $X^{11}$ is F, Cl, CF$_3$, OCF$_3$, OCHF$_2$, NCS, SF$_5$, —S—R$^z$ or —SO$_2$—R$^z$; and R$^z$ is CF$_3$, C$_2$F$_5$ or n-C$_4$F$_9$.

20. A liquid crystal medium according to claim 1, of formulas IC or ID:

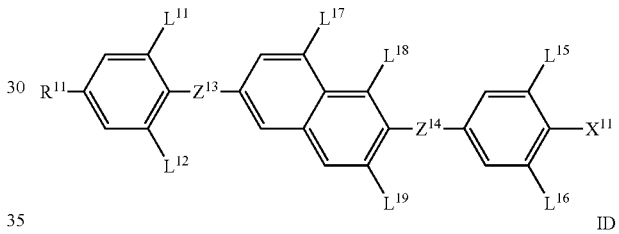

IC

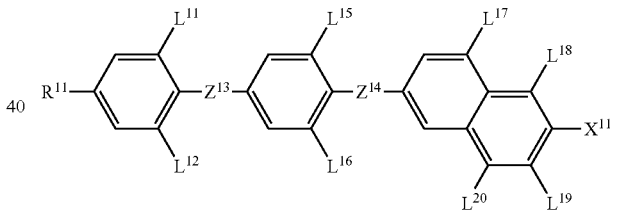

ID wherein R$^{11}$ is H, an alkyl or alkoxy radical having from 1 to 15 carbon atoms or an alkenyl or alkenyloxy or an —O-alkylene-O-alkyl radical having from 2 to 15 carbon atoms, wherein one or more methylene groups of each of said radicals may be replaced independently of each other by —S—, —SiR$^x$R$^y$—, —C≡C—, —CO—O— and/or —O—CO— such that oxygen and/or sulfur atoms are not linked directly to each other, said radicals being unsubstituted or mono-substituted with a —CN group or mono- or poly-substituted with halogen; L$^{11}$ and L$^{12}$ are both alkoxy;

$L^{15}$, $L^{16}$, $L^{17}$, $L^{18}$, $L^{19}$ and $L^{20}$ are independently of each other H, CF$_3$ or F;

$Z^{13}$ and $Z^{14}$ are independently of each other a single bond, —CH$_2$CH$_2$—, (—CH$_2$CH$_2$—)$_2$, —CF$_2$—CF$_2$—, —CF$_2$—CH$_2$—, —CH$_2$—CF$_2$—, —CH=CH—, —CF=CF—, —CF=CH—, —CH=CF—, —C≡C—, —CH$_2$O—, —OCH$_2$—, —CF$_2$O—, —OCF$_2$—, —CO—O— or —O—CO— whereby at least one of Z$^{13}$ and Z$^{14}$ is a single bond;

$X^{11}$ is F, Cl, —CN, —NCS, —SF$_5$, —S—R$^z$, —SO$_2$—R$^z$, an alkyl or alkoxy radical having from 1 to 15 carbon atoms, wherein one or more methylene groups of said alkyl or alkoxy radical may be replaced independently of each other by —O—, —S—, SiR$^x$R$^y$—, —CH=CH—, —C≡C—, —CO—O— and/or —O—CO— such that oxygen and/or sulfur atoms are not linked directly to each other, said alkyl or alkoxy radical being unsubstituted or mono-substituted with a —CN group or mono- or poly-substituted with halogen;

R$^x$ and R$^y$ are independently of each other hydrogen or an alkyl radical having from 1 to 7 carbon atoms;

R$^z$ is an alkyl radical having from 1 to 7 carbon atoms, said alkyl radical being unsubstituted or mono- or poly-substituted with halogen.

21. A liquid crystal medium according to claim 20, wherein R$^{11}$

L$^{15}$ and L$^{18}$ are both F;

Z$^{13}$ and Z$^{14}$ are independently of each other a single bond, —CF$_2$O— or —CO$_2$— whereby at least one of Z$^{13}$ and Z$^{14}$ is a single bond;

X$^{11}$ is F, Cl, CF$_3$, OCF$_3$, OCHF$_2$, NCS, SF$_5$, —S—R$^z$ or —SO$_2$—R$^z$; and R$^z$ is CF$_3$, C$_2$F$_5$ or n-C$_4$F$_9$.

22. A liquid crystal medium according to claim 1, of formulas IE or IF:

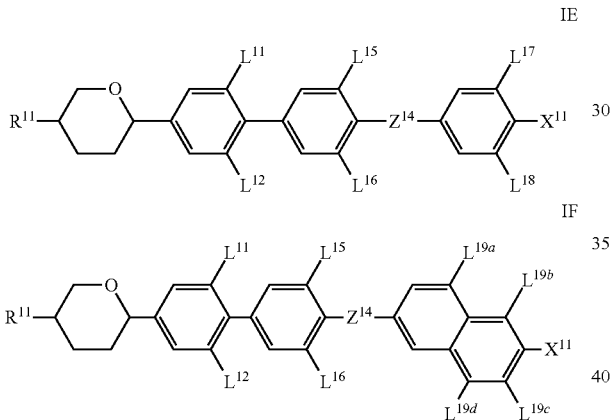

wherein

R$^{11}$ is H, an alkyl or alkoxy radical having from 1 to 15 carbon atoms or an alkenyl or alkenyloxy or an —O-alkylene-O-alkyl radical having from 2 to 15 carbon atoms, wherein one or more methylene groups of each of said radicals may be replaced independently of each other by —S—, —SiR$^x$R$^y$—, —C≡C—, —CO—O— and/or —O—CO— such that oxygen and/or sulfur atoms are not linked directly to each other, said radicals being unsubstituted or mono-substituted with a —CN group or mono- or poly-substituted with halogen;

L$^{11}$ and L$^{12}$ are alkoxy;

L$^{15}$, L$^{16}$, L$^{17}$, L$^{18}$, L$^{19a}$, L$^{19b}$, L$^{19c}$ and L$^{19d}$ are independently of each other H, CF$_3$ or F;

Z$^{14}$ is a single bond, —CH$_2$CH$_2$—, (—CH$_2$CH$_2$—)$_2$, —CF$_2$—CF$_2$—, —CF$_2$—CH$_2$—, —CH$_2$—CF$_2$—, —CH=CH—, —CF=CF—, —CF=CH—, —CH=CF—, —C≡C—, —CH$_2$O—, —OCH$_2$—, —CF$_2$O—, —OCF$_2$—, —CO—O— or —O—CO—;

X$^{11}$ is F, Cl, —CN, —NCS, —SF$_5$, —S—R$^z$, —SO$_2$—R$^z$, an alkyl or alkoxy radical having from 1 to 15 carbon atoms, wherein one or more methylene groups of said alkyl or alkoxy radical may be replaced independently of each other by —O—, —S—, SiR$^x$R$^y$—, —CH=CH—, —C≡C—, —CO—O— and/or —O—CO— such that oxygen and/or sulfur atoms are not linked directly to each other, said alkyl or alkoxy radical being unsubstituted or mono-substituted with a —CN group or mono- or poly-substituted with halogen;

R$^x$ and R$^y$ are independently of each other hydrogen or an alkyl radical having from 1 to 7 carbon atoms;

R$^z$ is an alkyl radical having from 1 to 7 carbon atoms, said alkyl radical being unsubstituted or mono- or poly-substituted with halogen.

23. A liquid crystal medium according to claim 22, wherein R$^{11}$ is a straight-chain alkyl, alkoxy, alkenyl, alkenyloxy or —O-alkylene-O-alkyl radical with up to 10 carbon atoms, said radicals being unsubstituted or mono- or poly-substituted with halogen;

L$^{17}$ and L$^{19b}$ are F or CF$_3$;

Z$^{14}$ is a single bond, —CF$_2$O— or —CO$_2$—;

X$^{11}$ is F, Cl, CF$_3$, OCF$_3$, OCHF$_2$, NCS, SF$_5$, —S—R$^z$ or —SO$_2$—R$^z$; and R$^z$ is CF$_3$, C$_2$F$_5$ or n-C$_4$F$_9$.

24. A liquid crystal medium according to claim 1, of formula IG:

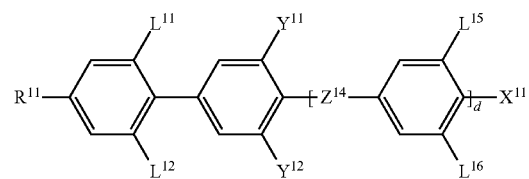

wherein

R$^{11}$ is an alkyl or alkoxy radical having from 1 to 15 carbon atoms or an alkenyl or alkenyloxy or —O-alkylene-O-alkyl radical having from 2 to 15 carbon atoms, wherein one or more methylene groups of each of said radicals may be replaced independently of each other by —S—, —SiR$^x$R$^y$—, —C≡C—, —CO—O— and/or —O—CO— such that oxygen and/or sulfur atoms are not linked directly to each other, said radicals being unsubstituted or mono-substituted with a —CN group or mono- or poly-substituted with halogen;

L$^{11}$ and L$^{12}$ are alkoxy;

Y$^{11}$ is an alkyl or alkoxy radical having from 1 to 15 carbon atoms or an alkenyl or alkenyloxy or —O-alkylene-O-alkyl radical having from 2 to 15 carbon atoms, wherein one or more methylene groups of each of said radicals may be replaced independently of each other by —S—, —SiR$^x$R$^y$—, —C≡C—, —CO—O— and/or —O—CO— such that oxygen and/or sulfur atoms are not linked directly to each other, said radicals being unsubstituted or mono-substituted with a —CN group or mono- or poly-substituted with halogen;

Y$^{12}$ is hydrogen, halogen, an alkyl or alkoxy radical having from 1 to 15 carbon atoms or an alkenyl or alkenyloxy or —O-alkylene-O-alkyl radical having from 2 to 15 carbon atoms, wherein one or more methylene groups of each of said radicals may be replaced independently of each other by —S—, —SiR$^x$R$^y$—, —C≡C—, —CO—O— and/or —O—CO— such that oxygen and/or sulfur atoms are not linked directly to each other, said radicals being unsubstituted or mono-substituted with a —CN group or mono- or poly-substituted with halogen;

d is 0, 1 or 2;

L$^{15}$ and L$^{16}$ are independently of each other H, CF$_3$ or F;

Z$^{14}$ is a single bond, —CH$_2$CH$_2$—, (—CH$_2$CH$_2$—)$_2$, —CF$_2$—CF$_2$—, —CF$_2$—CH$_2$—, —CH$_2$—CF$_2$—, —CH=CH—, —CF=CF—, —CF=CH—, —CH=CF—, —C≡C—, —CH$_2$O—, —OCH$_2$—, —CF$_2$O—, —OCF$_2$—, —CO—O— or —O—CO—;

$X^{11}$ is F, Cl, —CN, —NCS, —SF$_5$, —S—R$^z$, —SO$_2$—R$^z$, an alkyl or alkoxy radical having from 1 to 15 carbon atoms, wherein one or more methylene groups of said alkyl or alkoxy radical may be replaced independently of each other by —O—, —S—, —SiR$^x$R$^y$—, —CH=CH—, —C≡C—, —CO—O— and/or —O—CO— such that oxygen and/or sulfur atoms are not linked directly to each other, said alkyl or alkoxy radical being unsubstituted or mono-substituted with a —CN group or mono- or poly-substituted with halogen;

R$^x$ and R$^y$ are independently of each other hydrogen or an alkyl radical having from 1 to 7 carbon atoms; and R$^z$ is an alkyl radical having from 1 to 7 carbon atoms, said alkyl radical being unsubstituted or mono- or poly-substituted with halogen.

25. A liquid crystal medium according to claim 24, wherein R$^{11}$ is a straight-chain alkyl, alkoxy, alkenyl, alkenyloxy or —O-alkylene-O-alkyl radical with up to 10 carbon atoms, said radicals being unsubstituted or mono- or poly-substituted with halogen;

Y$^{11}$ is an alkoxy, alkenyloxy or —O-alkylene-O-alkyl radical with up to 10 carbon atoms, said radicals being unsubstituted or mono- or poly-substituted with halogen;

Y$^{12}$ H;

d is 0 or 1;

L$^{15}$ and L$^{16}$ are F or CF$_3$;

Z$^{14}$ is a single bond, —CF$_2$O— or —CO$_2$—;

X$^{11}$ is F, Cl, CF$_3$, OCF$_3$, OCHF$_2$, NCS, SF$_5$, —S—R$^z$ or —SO$_2$—R$^z$;

R$^z$ is CF$_3$, C$_2$F$_5$ or n-C$_4$F$_9$.

26. An electro-optical device comprising the liquid crystal medium according to claim 1.

27. An electro-optical device comprising a mesogenic medium according to claim 1, said device being operated or being operable in blue phase.

28. A liquid crystal medium according to claim 1, wherein L$^{11}$ and L$^{12}$ have the same meaning.

29. A liquid crystal medium according to claim 28, wherein L$^{13}$ and L$^{14}$ have the same meaning.

30. A liquid crystal medium according to claim 1, wherein R$^{11}$, L$^{11}$ and L$^{12}$ all have the same meaning.

* * * * *

UNITED STATES PATENT AND TRADEMARK OFFICE
CERTIFICATE OF CORRECTION

| | | |
|---|---|---|
| PATENT NO. | : 8,129,002 B2 | Page 1 of 1 |
| APPLICATION NO. | : 10/569462 | |
| DATED | : March 6, 2012 | |
| INVENTOR(S) | : Peer Kirsch et al. | |

It is certified that error appears in the above-identified patent and that said Letters Patent is hereby corrected as shown below:

Claims

Column 153, line 5 delete "$R^{11}$"

Column 156, line 5 reads "$Y^{12}$ H;" SHOULD READ -- $Y^{12}$ is H; --

Signed and Sealed this
Twenty-seventh Day of October, 2015

Michelle K. Lee
*Director of the United States Patent and Trademark Office*